(12) United States Patent
Shiraishi

(10) Patent No.: US 6,678,693 B1
(45) Date of Patent: Jan. 13, 2004

(54) DATABASE DESIGN SYSTEM, DATABASE DESIGN METHOD AND RECORD MEDIUM

(75) Inventor: Yoshikazu Shiraishi, Tokyo (JP)

(73) Assignee: Toshiko Shiraishi, Tokyo (JP)

( * ) Notice: Subject to any disclaimer, the term of this patent is extended or adjusted under 35 U.S.C. 154(b) by 313 days.

(21) Appl. No.: 09/638,801

(22) Filed: Aug. 10, 2000

(30) Foreign Application Priority Data

Aug. 12, 1999 (JP) .......................... 11-228419
Feb. 17, 2000 (JP) ........................ 2000-040191
Aug. 2, 2000 (JP) ........................ 2000-234663

(51) Int. Cl.$^7$ ............................................. G06F 7/00
(52) U.S. Cl. ..................................................... 707/102
(58) Field of Search .............................. 707/100–102; 705/14

(56) References Cited

U.S. PATENT DOCUMENTS

| | | | |
|---|---|---|---|
| 5,615,112 A | | 3/1997 | Liu Sheng et al. |
| 6,178,407 B1 | * | 1/2001 | Lotvin et al. .................. 705/14 |
| 6,191,811 B1 | * | 2/2001 | Nishimura et al. ........... 348/96 |
| 6,347,400 B1 | * | 2/2002 | Ohkura et al. ................ 725/60 |
| 6,453,318 B1 | * | 9/2002 | Shiina et al. ................ 707/100 |
| 6,460,043 B1 | * | 10/2002 | Tabbara et al. ............. 707/100 |

FOREIGN PATENT DOCUMENTS

| | | | |
|---|---|---|---|
| GB | 2 260 007 | 3/1993 | |
| JP | 09 146805 | 6/1997 | |
| JP | 09-146805 | * 6/1997 | ........... G06F/12/00 |

OTHER PUBLICATIONS

Carlson, E.R. et al., Forms Interfaces and Their View Supportability Properties, The Fourteenth Annual International Computer Software & Applications Conference, vol. Conf. 14, Oct. 31, 1990 pp 448–452.

* cited by examiner

Primary Examiner—Greta Robinson
Assistant Examiner—S R Pannala
(74) Attorney, Agent, or Firm—Thomas, Kayden, Horstemeyer & Risley, LLP

(57) ABSTRACT

Integration and extraction of created E-R diagram, and addition and deletion of screen to be processed, form, functional specification are performed efficiently and accurately. Data items in a screen/form are extracted from a screen/form to be processed, and temporary entities are created. The created entities are aggregated to form a normalized entity. A correspondence matrix table which indicates a correspondence relationship between the normalized entity and each screen/form is created. Based on the correspondence matrix table, a relationship matrix table 30 which indicates a relationship between normalized entities is created for each screen/form. Further, based on the relationship matrix table 30, an E-R diagram is created.

27 Claims, 72 Drawing Sheets

FIG. 4A

FORM ID: 101

| DIVISION | |
|---|---|
| | DIVISION CODE<br>DIVISION NAME |

FIG. 4B

FORM ID: 115

| EXECUTION OF WORKS | |
|---|---|
| | CONSTRUCTION NUMBER<br>NAME OF CONSTRUCTION<br>WORKING OFFICE CODE<br>TERM OF WORKS<br>NET CONSTRUCTION COST<br>ESTIMATED PROFIT<br>CONSTRUCTION EMPLOYEE CODE<br>TELEPHONE NUMBER<br>SETTLEMENT NUMBER |

FIG. 5A

FORM ID: 101 /50

| DIVISION ||
|---|---|
| DIVISION CODE | DIVISION NAME |
|  |  |

FIG. 5B

FORM ID: 115 /50

| EXECUTION OF WORKS ||
|---|---|
| CONSTRUCTION NUMBER | NAME OF CONSTRUCTION<br>TERM OF WORKS<br>NET CONSTRUCTION COST<br>ESTIMATED PROFIT |
| WORKING OFFICE CODE | TELEPHONE NUMBER |
| CONSTRUCTION EMPLOYEE CODE |  |
| SETTLEMENT NUMBER |  |

FIG. 6A

FORM ID: 115     50A

| EXECUTION OF WORKS |
|---|
| CONSTRUCTION NUMBER<br>NAME OF CONSTRUCTION<br>WORKING OFFICE CODE<br>TERM OF WORKS<br>NET CONSTRUCTION COST<br>ESTIMATED PROFIT<br>CONSTRUCTION EMPLOYEE CODE<br>TELEPHONE NUMBER<br>SETTLEMENT NUMBER |

FIG. 6B

FORM ID: 115     50A

| EXECUTION OF WORKS |
|---|
| CONSTRUCTION NUMBER ← KEY DEFINITION DATA |
| NAME OF CONSTRUCTION<br>TERM OF WORKS<br>NET CONSTRUCTION COST<br>ESTIMATED PROFIT ← DATA ITEM |
| WORKING OFFICE CODE ← KEY DEFINITION DATA<br>TELEPHONE NUMBER ← DATA ITEM |
| CONSTRUCTION EMPLOYEE CODE ← KEY DEFINITION DATA |
| SETTLEMENT NUMBER ← KEY DEFINITION DATA |

FIG. 9

| ENTITY NAME | FORM ID | 1011 | 1012 | 1013 | 1014 | 1015 | 1016 | 1017 | 1018 | 1019 | 1110 | 1111 | 1112 | 1113 | 1114 | 1115 | 1116 |
|---|---|---|---|---|---|---|---|---|---|---|---|---|---|---|---|---|---|
| 1: 完了フラグ | | 1 | | | | | | | | | | | | | | | 1 |
| 2: 部門 | [R] | ○ | ○ | | | | | | | | | | | | | | |
| 3: 社員 | [R] | ○ | ○ | | | | | | | | | | | | | | |
| 4: 得意先 | [R] | | | | ○ | | | | | | | | | | | | |
| 5: 設計事務所 | [R] | | | | | | | | ○ | ○ | | | | | | ○ | |
| 6: 発注者 | [R] | | | | | | | | ○ | | | | | | | | |
| 7: 施主 | [E] | | | ○ | | | | | | | | | | | | | |
| 8: 記事連 | [E] | | | | | | | ○ | ○ | ○ | | | | | | | |
| 9: 案件 | [R] | | | | | | | | ○ | ○ | ○ | ○ | ○ | | | | |
| 10: 営業社員 | [E] | | | | | | | | | | ○ | ○ | | | | | |
| 11: 営業活動 | [E] | | | | | | ○ | | | | ○ | ○ | | | | | |
| 12: 年月日 | [R] | | | | | | | | | | | | | | | | |
| 13: 設計事務所 | [E] | | | | | | | | | | | | | ○ | ○ | | |
| 14: 設計社員 | [R] | | | | | | | | | | | | | ○ | ○ | | |
| 15: 見積社員 | [E] | | | | | | | | | | | | | ○ | | | |
| 16: 設計作業工数 | [E] | | | | | | | | | | | | | | ○ | | |
| 17: 見積作業工数 | [R] | | | | | | | | | | | | | | ○ | | |
| 18: 決済 | [E] | | | | | | | | | | | | | | | ○ | |
| 19: 入札 | [R] | | | | | | | | | | | | | | | ○ | |
| 20: 決済者社員 | [E] | | | | | | | | | | | | | | | | |
| 21: 工事 | [R] | | | | | | | | | | | | | | | | ○ |
| 22: 作業所 | [R] | | | | | | | | | | | | | | | | ○ |
| 23: 工事社員 | [R] | | | | | | | | | | | | | | | | ○ |

54 — 28
56 OK  |  60 関係マトリックス RELATIONSHIP MATRIX  |  58 詳細マトリックス DETAILED MATRIX

Labels: COMPLETION FLAG, DIVISION, EMPLOYEE, CUSTOMER, DESIGN OFFICE, ORDERER, CLIENT, ARTICLE SEQUENCE, CASE, BUSINESS EMPLOYEE, BUSINESS ACTIVITIES, DATE, DESIGN OFFICE, DESIGN EMPLOYEE, ESTIMATE EMPLOYEE, MAN-HOUR OF DESIGN, MAN-HOUR OF ESTIMATION, SETTLEMENT, BIDDING, SETTLEMENT EMPLOYEE, CONSTRUCTION, WORKING OFFICE, CONSTRUCTION EMPLOYEE

FIG. 10

ENTITY NAME: DIVISION

| LIST NAME | FORM ID 101 | 102 | 103 | 104 | 105 | 106 | 107 | 108 | 109 | 110 | 111 | 112 | 113 | 114 | 115 | 116 |
|---|---|---|---|---|---|---|---|---|---|---|---|---|---|---|---|---|
| 1: 部門コード | ○ | ○ | | | | | | | | | | | | | | |
| 2: 部門名 | ○ | | | | | | | | | | | | | | | |

DIVISION CODE
DIVISION NAME

"SUM OF ORDER RECEIVED" SCREEN

| | | | | | DATE OF ORDER RECEIVED | | | |
|---|---|---|---|---|---|---|---|---|
| CUSTOMER CODE (ORDER RECEIVED NUMBER) | | | FACILITIES DIVISION | SHOP | 受注計上画面 受注日付 担当者CD | PERSON IN CHARGE CODE | DELIVERY DATE OF ORDER RECEIVED | |
| 受注NO | xxxxxx | xxxxxx | XXX商店 | 設備部 | YYYY/MM/DD | xxx | 受注納期 YYYY/MM/DD | NAME OF WAREHOUSE |
| 得意先CD | xxxxxx | xxxxxx | | | | | 名前~NAME | |
| 納品先CD | xxxxxx | xxxxxx | | | | 倉庫CD xxx | 倉庫名 | |
| DELIVERY DESTINATION CODE | | | STANDARD | UNIT | WAREHOUSE CODE | | | PRICE OF ORDER RECEIVED |
| | | | 規格 | 単位 | 入数 | | | NOTES |
| NO NAME OF GOODS | | | | | NUMBER OF CASES | 受注数量 受注単価 受注金額 備考 | | REPEATING ITEMS |
| 品名 | | | | | | UNIT PRICE OF ORDER RECEIVED | | |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| xxx xxxxxx | XXXXXX | XXXXXX | XXX | XX | XX | xxx,xxx | xxx,xxx | XXX |
| | | | | | 備考1 NOTE 1 | | | |
| | | | | NUMBER OF PIECES IN A PACKAGE | QUANTITY OF ORDER RECEIVED | | 受注伝票合計 xxx,xxx,xxx | |
| | | | | | | | TOTAL AMOUNT OF ORDER SLIPS RECEIVED | |

FIG. 15A

FORM ID: XXX

| SUM OF ORDER RECEIVED | | |
|---|---|---|
| ORDER RECEIVED NUMBER | NOTE 1 DELIVERY DATE OF ORDER RECEIVED DATE OF ORDER RECEIVED TOTAL AMOUNT OF ORDER RECEIVED (b) | |
| WAREHOUSE CODE | NAME OF WAREHOUSE | |
| PERSON IN CHARGE CODE | NAME OF PERSON IN CHARGE | |
| CUSTOMER CODE | CUSTOMER'S NAME | |
| DELIVERY DESTINATION CODE | NAME OF DELIVERY DESTINATION | |
| | STANDARD UNIT PRICE OF ORDER RECEIVED UNIT NAME OF GOODS | |
| RECEIVED-ORDER SPECIFICATION NUMBER | NUMBER OF CASES AMOUNT OF ORDER RECEIVED (b) QUANTITY OF ORDER RECEIVED NUMBER OF PIECES IN A PACKAGE NOTES | |

FIG. 15B

FORM ID: XXX

| SUM OF ORDER RECEIVED | | |
|---|---|---|
| ORDER RECEIVED NUMBER | NOTE 1 DELIVERY DATE OF ORDER RECEIVED DATE OF ORDER RECEIVED TOTAL AMOUNT OF ORDER SLIPS RECEIVED (b) | |
| WAREHOUSE CODE | NAME OF WAREHOUSE | |
| PERSON IN CHARGE CODE | NAME OF PERSON IN CHARGE | |
| CUSTOMER CODE | CUSTOMER'S NAME | |
| DELIVERY DESTINATION CODE | NAME OF DELIVERY DESTINATION | |
| PRODUCT CODE | STANDARD UNIT PRICE OF ORDER RECEIVED UNIT NAME OF GOODS | |
| RECEIVED-ORDER SPECIFICATION NUMBER | NUMBER OF CASES AMOUNT OF ORDER RECEIVED (b) QUANTITY OF ORDER RECEIVED NUMBER OF PIECES IN A PACKAGE NOTES | |

F I G. 16

RECEIPT OF ORDER E
| ORDER RECEIVED NUMBER | NOTE 1 |
| --- | --- |
| | DELIVERY DATE OF ORDER RECEIVED |
| | DATE OF ORDER RECEIVED |
| | TOTAL AMOUNT OF ORDER SLIPS RECEIVED (D) |

WAREHOUSE R
| WAREHOUSE CODE | NAME OF WAREHOUSE |
| --- | --- |

PERSON IN CHARGE R
| PERSON IN CHARGE CODE | NAME OF PERSON IN CHARGE |
| --- | --- |

CUSTOMER R
| CUSTOMER CODE | CUSTOMER'S NAME |
| --- | --- |

53

GOODS R
| GOODS CODE | STANDARD |
| --- | --- |
| | UNIT PRICE OF ORDER RECEIVED |
| | UNIT |
| | NAME OF GOODS |

DELIVERY DESTINATION R
| DELIVERY DESTINATION CODE | NAME OF DELIVERY DESTINATION |
| --- | --- |

SPECIFICATION OF ORDER RECEIVED E
| ORDER-RECEIVED SPECIFICATION NUMBER | NUMBER OF CASES |
| --- | --- |
| | PRICE OF ORDER RECEIVED (D) |
| | QUANTITY OF ORDER RECEIVED |
| | NUMBER OF PIECES IN A PACKAGE |
| | NOTES |

FORM ID: XXX                    50

| SUM OF ORDER RECEIVED ||
|---|---|
| ORDER RECEIVED NUMBER | NOTE 1 |
| | DELIVERY DATE OF ORDER RECEIVED |
| | DATE OF ORDER RECEIVED |
| | TOTAL AMOUNT OF ORDER SLIPS RECEIVED (D) |
| WAREHOUSE CODE | NAME OF WAREHOUSE |
| PERSON IN CHARGE CODE | NAME OF PERSON IN CHARGE |
| CUSTOMER CODE | CUSTOMER'S NAME |
| DELIVERY DESTINATION CODE | DELIVERY DESTINATION'S NAME |
| ORDER-RECEIVED SPECIFICATION NUMBER | STANDARD |
| | PRICE OF ORDER RECEIVED (D) |
| | QUANTITY OF ORDER RECEIVED |
| | NUMBER OF PIECES IN A PACKAGE |
| | NOTES |
| COODS CODE | STANDARD |
| | UNIT PRICE OF ORDER RECEIVED |
| | UNIT |
| | NAME OF GOODS |

HDR / DTL

FIG. 18

FORM ID: XXX

| UPSTREAM ENTITY | | DOWNSTREAM ENTITY | | | | | | |
|---|---|---|---|---|---|---|---|---|
| | | | 1 | 2 | 3 | 4 | 5 | 6 | 7 |
| 1: 受注 | [E] | | | | | | | | |
| 2: 倉庫 | [R] | | RF | | | TS | TS | | |
| 3: 担当者 | [R] | | RF | | | TS | TS | | |
| 4: 得意先 | [R] | | RF | | | | TS | | |
| 5: 納品先 | [R] | | RF | | | | | | |
| 6: 受注明細 | [E] | | | | | | | RF | |
| 7: 商品 | [R] | | | | | | | RF | |

64 → 30

- 1: 受注 — RECEIPT OF ORDER
- 2: 倉庫 — WAREHOUSE
- 3: 担当者 — PERSON IN CHARGE
- 4: 得意先 — CUSTOMER
- 5: 納品先 — DELIVERY DESTINATION
- 6: 受注明細 — ORDER-RECEIVED SPECIFICATION
- 7: 商品 — GOODS

[ OK ]  [ 変更 ] ALTERATION  [ 削除 ] DELETION

FIG. 19

FORM ID: XXX

| UPSTREAM ENTITY | | DOWNSTREAM ENTITY | | | | | | |
|---|---|---|---|---|---|---|---|---|
| | | 1 | 2 | 3 | 4 | 5 | 6 | 7 |
| 1: 受注 | [E] | | | | | | | |
| 2: 倉庫 | [R] | RF | | TS | TS | TS | RF | TS |
| 3: 担当者 | [R] | RF | | | TS | TS | RF | TS |
| 4: 得意先 | [R] | RF | | | | TS | RF | TS |
| 5: 納品先 | [E] | | | | | | RF | TS |
| 6: 受注明細 | [R] | RF | | | | | | |
| 7: 商品 | | | | | | | RF | |

[OK]   [変更] ALTERATION   [削除] DELETION

— 30

↙ 64

RECEIPT OF ORDER
WAREHOUSE
PERSON IN CHARGE
CUSTOMER
DELIVERY DESTINATION
ORDER-RECEIVED SPECIFICATION
GOODS

1: SETTLEMENT
2: BIDDING
3: SETTLEMENT EMPLOYEE
4: DESIGN
5: CONSTRUCTION (A) FORM ID: 113

| | | 1 | 2 | 3 | 4 | 5 |
|---|---|---|---|---|---|---|
| 1: 決済 | [R ] | | RF | TS | RF | RF |
| 2: 入札 | [E ] | . | | . | RF | RF |
| 3: 決済者社員 | [R ] | RF | . | | RF | RF |
| 4: 設計 | [E ] | . | . | . | | RF |
| 5: 工事 | [E ] | . | . | . | . | |

OK　　変更　　削除
66　　70　　68
　　ALTERATION　DELETION

FIG. 21B

1: CONSTRUCTION
2: WORKING OFFICE
3: CONSTRUCTION EMPLOYEE
4: SETTLEMENT
5: OWNER (B) FORM ID: 115

| | | 1 | 2 | 3 | 4 | 5 |
|---|---|---|---|---|---|---|
| 1: 工事 | [E ] | | . | . | . | . |
| 2: 作業所 | [R ] | RF | | TS | TS | TS |
| 3: 工事社員 | [R ] | RF | . | | TS | TS |
| 4: 決済 | [R ] | RF | . | . | | TS |
| 5: 施主 | [R ] | RF | . | . | . | |

OK　　変更　　削除
66　　70　　68
　ALTERATION　DELETION

FIG. 22A

1: SETTLEMENT
2: BIDDING
3: SETTLEMENT EMPLOYEE
4: DESIGN
5: CONSTRUCTION (A) FORM ID: 113

| | | | 1 | 2 | 3 | 4 | 5 |
|---|---|---|---|---|---|---|---|
| 1: 決済 | [ E ] | | | | RF | . | RF | RF |
| 2: 入札 | [ E ] | | | | | . | RF | RF |
| 3: 決済者社員 | [ R ] | | RF | RF | | RF | RF |
| 4: 設計 | [ E ] | | | | . | | RF |
| 5: 工事 | [ E ] | | | | . | | |

OK  変更  削除
     ALTERATION  DELETION

FIG. 22B

1: CONSTRUCTION
2: WORKING OFFICE
3: CONSTRUCTION EMPLOYEE
4: SETTLEMENT
5: OWNER (B) FORM ID: 115

| | | | 1 | 2 | 3 | 4 | 5 |
|---|---|---|---|---|---|---|---|
| 1: 工事 | [ E ] | | | . | . | RF | . |
| 2: 作業所 | [ R ] | | RF | | TS | RF | TS |
| 3: 工事社員 | [ R ] | | RF | | | RF | TS |
| 4: 決済 | [ E ] | | | | . | | . |
| 5: 施主 | [ R ] | | RF | | | RF | |

OK  変更  削除
     ALTERATION  DELETION

FIG. 25 "SUM OF ORDERING" SCREEN

発注計上画面

|  |  |  |  | DATE OF ORDERING | | | DELIVERY DATE OF ORDERING |
|---|---|---|---|---|---|---|---|
| SUPPLIER CODE | | | | | | PERSON IN CHARGE CODE | |
| ORDERING NUMBER | | | | | | | |

| | | | | | | | | MANUFACTURER'S NAME | | SHOP | | | | | |
|---|---|---|---|---|---|---|---|---|---|---|---|---|---|---|---|
| 発注NO | xxxxxx | | | 発注日付 | YYYY/MM/DD | 発注納期 | YYYY/MM/DD |
| 仕入先CD | xxxxxx | | | 担当者CD | xxx | 名前〜 | NAME |
| メーカCD | xxxxxx | メーカ名 | XXX商店 | 倉庫CD | xxx | 倉庫名〜 | NAME OF WAREHOUSE |
| MANUFACTURER CODE | | | | WAREHOUSE CODE | | | |

| | | | STANDARD | UNIT | NUMBER OF CASES | | UNIT PRICE OF ORDERING | PRICE OF ORDERING |
|---|---|---|---|---|---|---|---|---|
| GOODS CODE | NAME OF GOODS | 規格 | 単位 | 入数 | 発注数量 | 発注単価 | 発注金額 | 備考 NOTES |
| NO 商品CD | 品名 | | | | | | | |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |
| xxx | XXXXXX | XXXXX | XXX | XX | XX | xxx | xxx,xxx | xxx,xxx XXX |

NUMBER REQUIRED
備考1 XXXXXXXXXXX
NOTE 1

QUANTITY OF ORDERING
発注伝票合計 xxx,xxx,xxx
TOTAL AMOUNT OF ORDER SLIPS

FIG. 27

FORM ID: 117

/ 50

| SUM OF ORDERING ||
| --- | --- |
| ORDERING NUMBER | NOTE 1 |
| | DATE OF DELIVERY OF ORDERING |
| | TOTAL AMOUNT OF ORDER SLIPS |
| | DATE OF ORDERING |
| WAREHOUSE CODE | NAME OF WAREHOUSE |
| PERSON IN CHARGE CODE | NAME OF PERSON IN CHARGE |
| MANUFACTURER CODE | MANUFACTURER'S NAME |
| SUPPLIER CODE | SUPPLIER'S NAME |
| ORDERING SPECIFICATION NUMBER | NUMBER OF CASES |
| | QUANTITY OF ORDERS |
| | NUMBER OF PIECES IN A PACKAGE |
| | PRICE OF ORDERING (D) |
| | NOTES |
| GOODS CODE | NAME OF GOODS |
| | UNIT |
| | UNIT PRICE OF ORDERING |
| | STANDARD |

FIG. 28

| FORM ID | 1 1 7 | | | | | | |
|---|---|---|---|---|---|---|---|
| ENTITY NAME | 完了フラグ | 発注 | 倉庫 | 担当者 | メーカ | 仕入先 | 発注明細 | 商品 |
| 1: 完了フラグ | [E] | ○ | | | | | | |
| 2: 発注 | [R] | ○ | | | | | | |
| 3: 倉庫 | [R] | ○ | | | | | | |
| 4: 担当者 | [R] | ○ | | | | | | |
| 5: 仕入先 | [R] | ○ | | | | | | |
| 6: 発注明細 | [E] | ○ | | | | | | |
| 7: 商品 | [R] | ○ | | | | | | |

- COMPLETION FLAG
- ORDERING
- WAREHOUSE
- PERSON IN CHARGE
- MANUFACTURER
- SUPPLIER
- ORDERING SPECIFICATION
- GOODS

54

28

OK  関係マトリックス  詳細マトリックス

56  60   RELATIONSHIP MATRIX   58 DETAILED MATRIX

F I G. 29

FORM ID: 117

| UPSTREAM ENTITY | | DOWNSTREAM ENTITY | | | | | | | |
|---|---|---|---|---|---|---|---|---|---|
| | | 1 | 2 | 3 | 4 | 5 | 6 | 7 | |
| 1: 発注 | [E] | | | | | | | | ORDERING |
| 2: 倉庫 | [R] | RF | | | | | RF | | WAREHOUSE |
| 3: 担当者 | [R] | RF | | | TS | TS | | | PERSON IN CHARGE |
| 4: メーカ | [R] | RF | | | TS | TS | | | MANUFACTURER |
| 5: 仕入先 | [R] | RF | | | | | | | SUPPLIER |
| 6: 発注明細 | [E] | | | | | | | | ORDERING SPECIFICATION |
| 7: 商品 | [R] | | | | | | RF | | GOODS |

64

30

| 66 | 70 | 68 |
|---|---|---|
| OK | 変更 | 削除 |
| | ALTERATION | DELETION |

FIG. 30A
FORM ID: 118

| SUM OF ORDER RECEIVED | |
|---|---|
| | DELIVERY DATE OF ORDER RECEIVED<br>DATE OF ORDER RECEIVED<br>ORDER RECEIVED NUMBER<br>WAREHOUSE CODE<br>NAME OF WAREHOUSE<br>PERSON IN CHARGE CODE<br>NAME OF PERSON IN CHARGE<br>TOTAL AMOUNT OF ORDER SLIPS RECEIVED (D)<br>CUSTOMER CODE<br>CUSTOMER'S NAME<br>DELIVERY DESTINATION CODE<br>DELIVERY DESTINATION'S NAME<br>NOTE 1 |
| | NUMBER OF CASES<br>STANDARD<br>AMOUNT OF ORDER RECEIVED (D)<br>UNIT PRICE OF ORDER RECEIVED<br>ORDER-RECEIVED SPECIFICATION NUMBER<br>CODE OF GOODS<br>QUANTITY OF ORDER RECEIVED<br>UNIT<br>NUMBER OF PIECES IN A PACKAGE<br>NOTES<br>NAME OF GOODS |

FIG. 30B
FORM ID: 118

| SUM OF ORDER RECEIVED | |
|---|---|
| ORDER RECEIVING NUMBER | NOTE 1<br>DELIVERY DATE OF ORDER RECEIVED<br>DATE OF ORDER RECEIVED<br>TOTAL AMOUNT OF ORDER SLIPS RECEIVED (D) |
| WAREHOUSE CODE | NAME OF WAREHOUSE |
| PERSON IN CHARGE CODE | NAME OF PERSON IN CHARGE |
| CUSTOMER CODE | CUSTOMER |
| DELIVERY DESTINATION CODE | NAME OF DELIVERY DESTINATION |
| ORDER-RECEIVED SPECIFICATION NUMBER | NUMBER OF CASES<br>AMOUNT OF ORDER RECEIVED (D)<br>QUANTITY OF ORDER RECEIVED<br>NUMBER OF PIECES IN A PACKAGE<br>NOTES |
| GOODS CODE | STANDARD<br>UNIT PRICE OF ORDER RECEIVED<br>UNIT<br>NAME OF GOODS |

FIG. 32

FORM ID: 118

UPSTREAM ENTITY

| | | DOWNSTREAM ENTITY | | | | | | |
|---|---|---|---|---|---|---|---|---|
| | | 1 | 2 | 3 | 4 | 5 | 6 | 7 |
| 1: 受注 | [E] | | | | | | RF | |
| 2: 倉庫 | [R] | RF | | | | | | |
| 3: 担当者 | [R] | RF | | | TS | TS | | |
| 4: 得意先 | [R] | RF | | | | TS | | |
| 5: 納品先 | [R] | RF | | | | | | |
| 6: 受注明細 | [E] | | | | | | | |
| 7: 商品 | [R] | | | | | | RF | |

- 受注 — RECEIPT OF ORDER
- 倉庫 — WAREHOUSE
- 担当者 — PERSON IN CHARGE
- 得意先 — CUSTOMER
- 納品先 — DELIVERY DESTINATION
- 受注明細 — ORDER-RECEIVED SPECIFICATION
- 商品 — GOODS

66 — OK
70 — 変更 ALTERATION
68 — 削除 DELETION

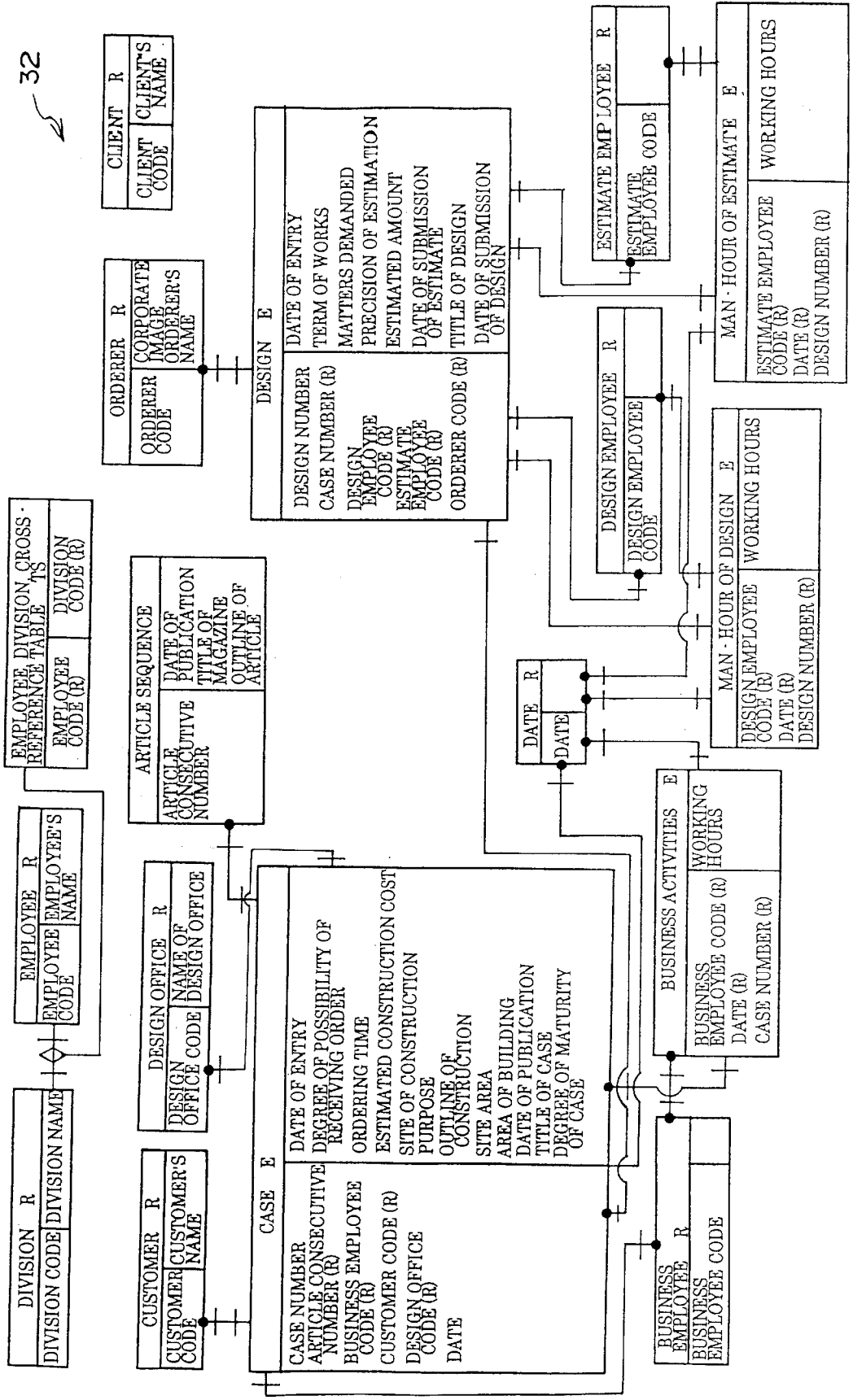
F I G. 3 6

FIG. 37

| | 1:完了フラグ | 2:部門 | 3:社員 | 4:得意先 | 5:設計事務所 | 6:発注者 | 7:施主 | 8:記事連 | 9:案件 | 10:営業社員 | 11:営業活動 | 12:年月日 | 13:設計事務所 | 14:設計社員 | 15:見積社員 | 16:見積作業工数 | 17:設計作業工数 |

(Column headers with labels: COMPLETION FLAG, DIVISION, EMPLOYEE, CUSTOMER, DESIGN OFFICE, ORDERER, CLIENT, ARTICLE SEQUENCE, CASE, BUSINESS EMPLOYEE, BUSINESS ACTIVITIES, DATE, DESIGN OFFICE, DESIGN EMPLOYEE, ESTIMATE EMPLOYEE, MAN-HOUR OF DESIGN, MAN-HOUR OF ESTIMATE)

Buttons: OK (56), 関係マトリックス RELATIONSHIP MATRIX (60), 詳細マトリックス DETAILED MATRIX (58)

FORM ID: 102

FIG. 41B

FORM ID: 110

ESTIMATE EMPLOYEE R

| ESTIMATE EMPLOYEE CODE |
|---|

DESIGN EMPLOYEE R

| DESIGN EMPLOYEE CODE |
|---|

ORDERER R

| ORDERER CODE | CORPORATE IMAGE | ORDERER'S NAME |
|---|---|---|

DESIGN E

| DESIGN NUMBER | CASE NUMBER (R) | DESIGN EMPLOYEE CODE (R) | ESTIMATE EMPLOYEE CODE (R) | ORDERER CODE (R) | DATE OF ENTRY | TERM OF WORKS | MATTERS DEMANDED | PRECISION OF ESTIMATION | ESTIMATED AMOUNT | DATE OF SUBMISSION OF ESTIMATE | TITLE OF DESIGN | DATE OF SUBMISSION OF DESIGN |
|---|---|---|---|---|---|---|---|---|---|---|---|---|

CASE E

| CASE NUMBER | DATE OF ENTRY | DEGREE OF POSSIBILITY OF RECEIVING ORDER | ORDERING TIME | ESTIMATED CONSTRUCTION COST | SITE OF CONSTRUCTION | PURPOSE | OUTLINE OF CONSTRUCTION | SITE AREA | AREA OF BUILDING | DATE OF PUBLICATION | TITLE OF CASE | DEGREE OF MATURITY OF CASE |
|---|---|---|---|---|---|---|---|---|---|---|---|---|

FIG. 42

TRUST FEE DEDUCTION AMOUNT (1) CALCULATION OF NUMBER OF CANCELLED CONTRACT
  a. NUMBER OF CANCELLED CONTRACT (SECURITIES) = NUMBER OF UNIT TYPE-SETTING CANCELLATION RECORD 1
  b. NUMBER OF CANCELLED CONTRACT (SALES) = NUMBER OF UNIT TYPE-SETTING CANCELLATION RECORD 2

(2) CALCULATION OF CONSIGNEE RETURN
  a. UNIT PRICE OF UNPAID CONSIGNEE RETURN = AMOUNT OF UNIT TYPE-SETTING CANCELLATION RECORD
  b. CONSIGNEE RETURN (SECURITIES, INCLUDING TAX) = NUMBER OF CANCELLED CONTRACT (SECURITIES) * UNIT PRICE OF UNPAID CONSIGNEE RETURN [OMISSION OF FRACTIONS LESS THAN A YEN]
  c. CONSIGNEE RETURN (SALES, INCLUDING TAX) = NUMBER OF CANCELLED CONTRACT (SALES) * UNIT PRICE OF UNPAID CONSIGNEE RETURN [OMISSION OF FRACTIONS LESS THAN A YEN]
  d. CONSIGNEE RETURN (INCLUDING TAX) = CONSIGNEE RETURN (SECURITIES, INCLUDING TAX) + CONSIGNEE RETURN (SALES, INCLUDING TAX)

(3) CALCULATION OF CONSIGNOR RETURN
  a. UNIT PRICE OF UNPAID CONSIGNOR RETURN = AMOUNT OF UNIT TYPE-SETTING CANCELLATION RECORD
  b. CONSIGNOR RETURN (SECURITIES, INCLUDING TAX) = NUMBER OF CANCELLED CONTRACT (SECURITIES) * UNIT PRICE OF UNPAID CONSIGNOR RETURN [OMISSION OF FRACTIONS LESS THAN A YEN]
  c. CONSIGNOR RETURN (SALES, INCLUDING TAX) = NUMBER OF CANCELLED CONTRACT (SALES) * UNIT PRICE OF UNPAID CONSIGNOR RETURN [OMISSION OF FRACTIONS LESS THAN A YEN]
  d. CONSIGNOR RETURN (INCLUDING TAX) = CONSIGNOR RETURN (SECURITIES, INCLUDING TAX) + CONSIGNOR RETURN (SALES, INCLUDING TAX)

(4) CALCULATION OF CONSUMPTION TAX
  a. AGENT COMMISSION (NET OF TAX) = AMOUNT OF UNIT TYPE-SETTING CANCELLATION RECORD
    a) SHARE RATE OF CONSIGNOR COMPANY = NUMERATOR OF SHARE RATE OF CONSIGNOR COMPANY / DENOMINATOR OF SHARE RATE OF CONSIGNOR COMPANY [OMISSION OF THE FOURTH DECIMAL PLACE]
    b) RATE OF AGENT COMMISSION = NUMERATOR OF RATE OF AGENT COMMISSION / DENOMINATOR OF RATE OF AGENT COMMISSION [OMISSION OF THE FOURTH DECIMAL PLACE]
    c) RATE OF CONSIGNOR RETURN = SHARE RATE OF CONSIGNOR COMPANY + RATE OF AGENT COMMISSION
    d) UNIT PRICE OF AGENT COMMISSION (NET OF TAX) = UNIT PRICE OF UNPAID CONSIGNOR RETURN * RATE OF AGENT COMMISSION / (RATE OF CONSIGNOR RETURN * (1 + CONSUMPTION TAX)) [OMISSION OF THE EIGHTH DECIMAL PLACE]
    e) AGENT COMMISSION (SECURITIES, NET OF TAX) = NUMBER OF CANCELLED CONTRACT (SECURITIES) * UNIT PRICE OF AGENT COMMISSION (NET OF TAX) [OMISSION OF FRACTIONS LESS THAN A YEN]
    f) AGENT COMMISSION (SALES, NET OF TAX) = NUMBER OF CANCELLED CONTRACT (SALES) * UNIT PRICE OF AGENT COMMISSION (NET OF TAX) [OMISSION OF FRACTIONS LESS THAN A YEN]
  b. CONSIGNEE RETURN CONSUMPTION TAX (SECURITIES) = CONSIGNEE RETURN (SECURITIES, INCLUDING TAX) * (CONSUMPTION TAX) * (1 + CONSUMPTION TAX)) [OMISSION OF FRACTIONS LESS THAN A YEN]
  c. CONSIGNEE RETURN CONSUMPTION TAX (SALES) = CONSIGNEE RETURN (SALES, INCLUDING TAX) * (CONSUMPTION TAX) * (1 + CONSUMPTION TAX)) [OMISSION OF FRACTIONS LESS THAN A YEN]
  d. CONSIGNOR RETURN CONSUMPTION TAX = CONSIGNEE RETURN CONSUMPTION TAX (SECURITIES) + CONSIGNEE RETURN CONSUMPTION TAX (SALES)
  e. CONSIGNOR RETURN CONSUMPTION TAX (SECURITIES) = CONSIGNOR RETURN (SECURITIES, INCLUDING TAX) * (CONSUMPTION TAX) * (1 + CONSUMPTION TAX)) [OMISSION OF FRACTIONS LESS THAN A YEN]
  f. CONSIGNOR RETURN CONSUMPTION TAX (SALES) = CONSIGNOR RETURN (SALES, INCLUDING TAX) * (CONSUMPTION TAX) * (1 + CONSUMPTION TAX)) [OMISSION OF FRACTIONS LESS THAN A YEN]
  g. CONSIGNOR RETURN CONSUMPTION TAX = CONSIGNOR RETURN CONSUMPTION TAX (SECURITIES) + CONSIGNOR RETURN CONSUMPTION TAX (SALES)
  h. AGENT COMMISSION CONSUMPTION TAX (SECURITIES) = AGENT COMMISSION (SECURITIES, NET OF TAX) * CONSUMPTION TAX [OMISSION OF FRACTIONS LESS THAN A YEN]
  i. AGENT COMMISSION CONSUMPTION TAX (SALES) = AGENT COMMISSION (SALES, NET OF TAX) * CONSUMPTION TAX [OMISSION OF FRACTIONS LESS THAN A YEN]
  j. AGENT COMMISSION CONSUMPTION TAX = AGENT COMMISSION CONSUMPTION TAX (SECURITIES) + AGENT COMMISSION CONSUMPTION TAX (SALES)
  k. REFERENCE RETURN CONSUMPTION TAX = CONSIGNEE RETURN CONSUMPTION TAX + CONSIGNOR RETURN CONSUMPTION TAX

FIG. 43

FORM ID: XXX                                              50

| TRUST FEE DEDUCTION AMOUNT |
|---|
| NUMBER OF CANCELLED CONTRACT (SECURITIES) |
| NUMBER OF CANCELLED CONTRACT (SALES) |
| UNPAID CONSIGNEE RETURN UNIT PRICE |
| UNPAID CONSIGNOR RETURN UNIT PRICE |
| CONSIGNEE RETURN (SECURITIES, INCLUDING TAX) |
| CONSIGNEE RETURN (SALES, INCLUDING TAX) |
| CONSIGNEE RETURN (INCLUDING TAX) |
| CONSIGNOR RETURN (SECURITIES, INCLUDING TAX) |
| CONSIGNOR RETURN (SALES, INCLUDING TAX) |
| CONSIGNOR RETURN (INCLUDING TAX) |
| SHARE RATE OF CONSIGNOR COMPANY |
| RATE OF CONSIGNOR RETURN |
| NUMERATOR OF SHARE RATE OF CONSIGNOR COMPANY |
| DENOMINATOR OF SHARE RATE OF CONSIGNOR COMPANY |
| RATE OF AGENT COMMISSION |
| AGENT COMMISSION (NET OF TAX) |
| NUMERATOR OF RATE OF AGENT COMMISSION |
| DENOMINATOR OF RATE OF AGENT COMMISSION |
| UNIT PRICE OF AGENT COMMISSION (NET OF TAX) |
| CONSUMPTION TAX |
| AGENT COMMISSION (SECURITIES, NET OF TAX) |
| AGENT COMMISSION (SALES, NET OF TAX) |
| |
| CONSIGNEE RETURN CONSUMPTION TAX (SALES) |
| CONSIGNEE RETURN CONSUMPTION TAX (SECURITIES) |
| CONSIGNEE RETURN CONSUMPTION TAX |
| CONSIGNOR RETURN CONSUMPTION TAX (SALES) |
| CONSIGNOR RETURN CONSUMPTION TAX (SECURITIES) |
| CONSIGNOR RETURN CONSUMPTION TAX |
| |
| AGENT COMMISSION (SECURITIES, INCLUDING TAX) |
| AGENT COMMISSION (SALES, INCLUDING TAX) |
| AGENT COMMISSION CONSUMPTION TAX |
| AGENT COMMISSION CONSUMPTION TAX (SECURITIES) |
| AGENT COMMISSION CONSUMPTION TAX (SALES) |
| REFERENCE RETURN CONSUMPTION TAX |

FIG. 44A

FORM ID: XXX  /50

| SALES DAILY JOURNAL | |
|---|---|
| | /DATE OF RECEIVING ORDER START |
| | /DATE OF RECEIVING ORDER END |
| | /CUSTOMER CODE ... |
| | /SALES SLIP NUMBER |
| | /DATE OF SETTLEMENT NUMBER |
| | TOTAL AMOUNT OF SLIPS |
| | GRAND TOTAL |
| | TAX DIVISION |
| | ADDITIONAL - TYPE TAX SALES |
| | CONSUMPTION TAX OF ADDITIONAL - TYPE TAX |
| | INCLUSIVE - TYPE TAX SALES |
| | CONSUMPTION TAX OF INCLUSIVE - TYPE TAX |
| | TOTAL AMOUNT OF CONSUMPTION TAX |
| | TOTAL AMOUNT OF CONSUMPTION TAX SLIP |
| SALES SLIP NUMBER | DATE OF SALES |
| | FORM END |
| | NUMBER OF CASES |
| CUSTOMER CODE | CUSTOMER'S NAME |
| PERSON IN CHARGE CODE | CODE OF PERSON IN CHARGE |
| CONSIGNEE CODE | DELIVERY DESTINATION'S NAME |
| /CUSTOMER START CODE | |
| /SLIP START CODE | |

FORM ID: XXX  /50

| SALES DAILY ACCOUNT | |
|---|---|
| | /DATE OF ORDER RECEIVED START |
| | /DATE OF ORDER RECEIVED END |
| | /CUSTOMER CODE ... |
| | /DATE OF SETTLEMENT |
| | GRAND TOTAL |
| | CONSUMPTION TAX SLIP TOTAL |
| /CUSTOMER START CODE | AMOUNT OF RETURNED GOODS |
| | RATE OF DISCOUNT |
| | AMOUNT OF SALES MARGIN |
| /CUSTOMER CODE | CUSTOMER'S NAME |

AUTOMATIC SIZE ADJUSTMENT FUNCTION "OFF"

FIG. 44B

FORM ID: XXX  50

| SALES DAILY JOURNAL | |
|---|---|
| | /DATE OF RECEIVING ORDER START |
| | /DATE OF RECEIVING ORDER END |
| | /CUSTOMER CODE ... |
| | /SALES SLIP NUMBER |
| | /DATE OF SETTLEMENT |
| | NUMBER |
| | TOTAL AMOUNT OF SLIPS |
| | GRAND TOTAL |
| | TAX DIVISION |
| | ADDITIONAL · TYPE TAX SALES |
| | CONSUMPTION TAX OF ADDITIONAL · TYPE TAX |
| | INCLUSIVE · TYPE TAX SALES |
| | CONSUMPTION TAX OF INCLUSIVE · TYPE TAX |
| | TOTAL AMOUNT OF CONSUMPTION TAX |
| | TOTAL AMOUNT OF CONSUMPTION TAX SLIP |
| SALES SLIP NUMBER | DATE OF SALES |
| | FORM END |
| | NUMBER OF CASES |
| CUSTOMER CODE | CUSTOMER'S NAME |
| PERSON IN CHARGE CODE | CODE OF PERSON IN CHARGE |
| DELIVERY DESTINATION CODE | DELIVERY DESTINATION'S NAME |
| /CUSTOMER START CODE | |
| /SLIP START CODE | |
| /CUSTOMER END CODE | |
| SHIPPING SLIP NUMBER | |
| | QUANTITY OF SALES |
| | SALES UNIT PRICE |
| | AMOUNT OF SALES |
| | CONSUMPTION TAX |
| GOODS CODE | NAME OF GOODS |
| | STANDARD |
| | UNIT |

FORM ID: XXX  50

| SALES DAILY ACCOUNT | |
|---|---|
| | //DATE OF ORDER RECEIVED START |
| | /DATE OF ORDER RECEIVED END |
| | /CUSTOMER CODE RANGE |
| | /DATE OF SETTLEMENT |
| | GRAND TOTAL |
| | CONSUMPTION TAX SLIP TOTAL |
| /CUSTOMER START CODE | AMOUNT OF RETURNED GOODS |
| | RATE OF DISCOUNT |
| | AMOUNT OF SALES MARGIN |
| /CUSTOMER CODE | CUSTOMER'S NAME |

AUTOMATIC SIZE ADJUSTMENT FUNCTION "ON"

FORM ID: 110

FIG. 47A

ITEM MASTER (50)

| ITEM CODE | STANDARD/SPECIAL DIVISION<br>PARTS RANK<br>QUALITY/STANDARD/SIZE<br>COMMON PARTS DIVISION<br>"USE/DISUSE OF PARTS DEVELOPMENT" DIVISION<br>WAREHOUSING CONVERSION FACTOR<br>DURING SHIPPING/STYLE OF PACKING<br>ITEM INDEX<br>KANA-CHARACTER<br>ITEM NAME<br>ABBREVIATED NAME OF ITEM<br>ITEM DIVISION |
|---|---|
| MATERIAL CODE<br>PROCUREMENT UNIT CODE<br>WAREHOUSING UNIT CODE | |

FIG. 47B

MANUFACTURER R (53)

| MANUFACTURER CODE | MANUFACTURER'S NAME<br>x MODE |
|---|---|

FIG. 48A

| ESTIMATE BASIC FILE ||
|---|---|
| ESTIMATION NUMBER | PURPOSE<br>MANAGEMENT COST<br>TOTAL AMOUNT OF BODY PRICE<br>NUMBER OF PROCESSES OF DESIGN<br>DESIGN COST<br>NUMBER OF PROCESSES OF ASSEMBLING<br>ASSEMBLING COST<br>PROCESSING COST<br>MATERIAL COST<br>OUTSIDE-ORDER PROCESSING COST<br>TOTAL AMOUNT OF SUPPLEMENTARY PRICE<br>COST OF AUXILIARY EQUIPMENT<br>PAYMENT INSPECTION FEE<br>PACKING AND TRANSPORTATION COST<br>ON-SITE PROCESSING COST<br>OTHER EXPENSES<br>DATE OF DELIVERY<br><br>"ESTIMATION CALCULATION" DIVISION<br>REQUIREMENTS FOR ESTIMATION<br>TOTAL ESTIMATED AMOUNT<br>FIRST ESTIMATED COST<br>ESTIMATED VARIABLE COST<br>DATE OF ESTIMATION |
| EMPLOYEE IN CHARGE OF ESTIMATE CODE | |
| PRECEDENT/ANALOGUE ESTIMATION NUMBER | |
| PRECEDENT/ANALOGUE ORDER RECEIVED NUMBER | |
| EMPLOYEE IN CHARGE OF BUSINESS CODE | |
| SPECIFIED ORDER RECEIVED NUMBER | |

50

PRIOR TO INPUT OF OK

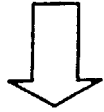

FIG. 48B

PRIOR TO INPUT OF OK

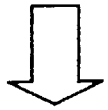

| ESTIMATE BASIC FILE | |
|---|---|
| ESTIMATION NUMBER | "ESTIMATION CALCULATION" DIVISION<br>REQUIREMENTS FOR ESTIMATION<br>TOTAL ESTIMATED AMOUNT<br>FIRST ESTIMATED COST<br>ESTIMATED VARIABLE COST<br>DATE OF ESTIMATION<br>ESTIMATE/PURPOSE<br>ESTIMATE/MANAGEMENT COST<br>ESTIMATE/TOTAL AMOUNT OF BODY PRICE<br>ESTIMATE/NUMBER OF PROCESSES OF DESIGN<br>ESTIMATE/DESIGN COST<br>ESTIMATE/NUMBER OF PROCESSES OF ASSEMBLING<br>ESTIMATE/ASSEMBLING COST<br>ESTIMATE/PROCESSING COST<br>ESTIMATE/MATERIAL COST<br>ESTIMATE/OUTSIDE-ORDER PROCESSING COST<br>ESTIMATE/TOTAL AMOUNT OF SUPPLEMENTARY PRICE<br>ESTIMATE/COST OF AUXILIARY EQUIPMENT<br>ESTIMATE/PAYMENT INSPECTION FEE<br>ESTIMATE/PACKING AND TRANSPORTATION COST<br>ESTIMATE/ON-SITE PROCESSING COST<br>ESTIMATE/OTHER EXPENSES<br>ESTIMATE/DATE OF DELIVERY |
| EMPLOYEE IN CHARGE OF ESTIMATE CODE | |
| PRECEDENT/ANALOGUE ESTIMATION NUMBER | |
| PRECEDENT/ANALOGUE ORDER RECEIVING NUMBER | |
| EMPLOYEE IN CHARGE OF BUSINESS CODE | |
| ORDER RECEIVING NUMBER | |

AFTER INPUT OF OK

| (1) ESTIMATION E | |
|---|---|
| ESTIMATION NUMBER | "ESTIMATION CALCULATION" DIVISION<br>REQUIREMENTS FOR ESTIMATION<br>TOTAL ESTIMATED AMOUNT<br>FIRST ESTIMATED COST<br>ESTIMATED VARIABLE COST<br>DATE OF ESTIMATION<br>ESTIMATE/PURPOSE<br>ESTIMATE/MANAGEMENT COST<br>ESTIMATE/TOTAL AMOUNT OF BODY PRICE<br>ESTIMATE/NUMBER OF PROCESSES OF DESIGN<br>ESTIMATE/DESIGN COST<br>ESTIMATE/NUMBER OF PROCESSES OF ASSEMBLING<br>ESTIMATE/ASSEMBLING COST<br>ESTIMATE/PROCESSING COST<br>ESTIMATE/MATERIAL COST<br>ESTIMATE/OUTSIDE -ORDER PROCESSING COST<br>ESTIMATE/TOTAL AMOUNT OF SUPPLEMENTARY PRICE<br>ESTIMATE/COST OF AUXILIARY EQUIPMENT<br>ESTIMATE/PAYMENT INSPECTION FEE<br>ESTIMATE/PACKING AND TRANSPORTATION COST<br>ESTIMATE/ON -SITE PROCESSING COST<br>ESTIMATE/OTHER EXPENSES<br>ESTIMATE/DATE OF DELIVERY<br>ESTIMATE/DIVISION OF RECEIPT OF ORDER<br>ESTIMATE/DATE OF ORDER RECEIVED<br>ESTIMATE/TOTAL AMOUNT OF ORDER RECEIVED<br>TOTAL AMOUNT OF ESTIMAT ED COST |

ENTITY TO BE REGISTERED

FIG. 49A

| SUM OF ORDER-RECEIVED ||
|---|---|
| ORDER RECEIVING NUMBER | NOTE 1<br>AMOUNT OF RETURNED GOODS<br>AMOUNT OF DISCOUNT<br>BALANCE OF ACCOUNTS OF CREDIT SALES OF CUSTOMER<br>DELIVERY DATE OF ORDER RECEIVED<br>DATE OF RECEIVED ORDER<br>TOTAL OF SLIPS OF ORDER RECEIVED (D)<br>QUANTITY OF ORDER RECEIVED<br>AMOUNT OF CREDIT LIMIT |
| CUSTOMER CODE | CUSTOMER'S NAME |
| WAREHOUSE CODE | NAME OF WAREHOUSE |
| PERSON IN CHARGE CODE | NAME OF PERSON IN CHARGE |
| DELIVERY DESTINATION CODE | CONSIGNEE'S NAME |
| ORDER-RECEIVED SPECIFICATION NUMBER | NUMBER OF CASES<br>AMOUNT OF ORDER RECEIVED<br>QUANTITY OF ORDER RECEIVED<br>NOTES |
| GOODS CODE | STANDARD<br>UNIT PRICE OF ORDER RECEIVED<br>UNIT<br>NUMBER<br>NAME OF GOODS |

HDR ↕

DTL

PRIOR TO NON-NORMALIZATION

FIG. 49B

| | SUM OF ORDER RECEIVED | |
|---|---|---|
| ORDER RECEIVING CONSECUTIVE NUMBER | DELIVERY DATE OF ORDER RECEIVED<br>DATE OF RECEIVING ORDER<br>TOTAL OF SLIPS OF ORDER RECEIVED (D)<br>NOTE 1<br>BALANCE OF ACCOUNTS OF<br>    CREDIT SALES OF CUSTOMER<br>QUANTITY OF ORDER RECEIVED<br>AMOUNT OF RETURNED GOODS<br>AMOUNT OF DISCOUNT<br>AMOUNT OF CREDIT LIMIT | |
| | CUSTOMER CODE<br>CUSTOMER'S NAME | |
| | WAREHOUSE CODE<br>NAME OF WAREHOUSE | |
| | PERSON IN CHARGE CODE<br>NAME OF PERSON IN CHARGE | |
| | CONSIGNEE CODE<br>CONSIGNEE'S NAME | |
| ORDER-RECEIVED SPECIFICATION CONSECUTIVE NUMBER | NUMBER OF CASES<br>AMOUNT OF ORDER RECEIVED (D)<br>QUANTITY OF ORDER RECEIVED<br>NOTES | |
| | GOODS CODE<br>STANDARD<br>UNIT PRICE OF ORDER RECEIVED<br>UNIT<br>NUMBER<br>NAME OF GOODS | |

AFTER NON-NORMALIZATION

FIG. 49C

| RECEIPT OF ORDER-CONSECUTIVE R | |
|---|---|
| ORDER RECEIVING CONSECUTIVE NUMBER | DELIVERY DATE OF ORDER RECEIVED<br>DATE OF RECEIVING ORDER<br>TOTAL OF SLIPS OF ORDER RECEIVED (D)<br>NOTE 1<br>BALANCE OF ACCOUNTS OF CREDIT SALES OF CUSTOMER<br>QUANTITY OF ORDER RECEIVED<br>AMOUNT OF RETURNED GOODS<br>AMOUNT OF DISCOUNT<br>CUSTOMER CODE<br>AMOUNT OF CREDIT LIMIT<br>CUSTOMER'S NAME<br>WAREHOUSE CODE<br>NAME OF WAREHOUSE<br>PERSON IN CHARGE CODE<br>NAME OF PERSON IN CHARGE<br>DELIVERY DESTINATION CODE<br>DELIVERY DESTINATION'S NAME |

53

| ORDER-RECEIVED SPECIFICATION-CONSECUTIVE R | |
|---|---|
| ORDER RECEIVED SPECIFICATION CONSECUTIVE NUMBER | NUMBER OF CASES<br>AMOUNT OF ORDER RECEIVED (D)<br>QUANTITY OF ORDER RECEIVED<br>NOTES<br>GOODS CODE<br>STANDARD<br>UNIT PRICE OF ORDER RECEIVED<br>UNIT<br>NUMBER<br>NAME OF GOODS |

53

NON-NORMALIZED ENTITY

FIG. 50A

| | SUM OF ORDER RECEIVED |
|---|---|
| ORDER RECEIVING CONSECUTIVE NUMBER | DELIVERY DATE OF ORDER RECEIVED<br>DATE OF RECEIVED ORDER<br>TOTAL OF SLIPS OF ORDER RECEIVED (D)<br>NOTE 1<br>BALANCE OF ACCOUNTS OF CREDIT<br>   SALES OF CUSTOMER<br>QUANTITY OF ORDER RECEIVED<br>AMOUNT OF RETURNED GOODS<br>AMOUNT OF DISCOUNT<br>AMOUNT OF CREDIT LIMIT |
| | CUSTOMER CODE<br>CUSTOMER'S NAME |
| | WAREHOUSE CODE<br>NAME OF WAREHOUSE<br>PERSON IN CHARGE CODE<br>NAME OF PERSON IN CHARGE<br>DELIVERY DESTINATION CODE<br>DELIVERY DESTINATION'S NAME |
| ORDER-RECEIVED SPECIFICATION CONSECUTIVE NUMBER | NUMBER OF CASES 1<br>AMOUNT OF ORDER RECEIVED (D) 1<br>QUANTITY OF ORDER RECEIVED 1<br>NOTE 1 |
| | GOODS 1 CODE<br>STANDARD 1<br>UNIT PRICE OF ORDER RECEIVED 1<br>UNIT 1<br>NUMBER 1<br>NAME OF GOODS 1 |
| | NUMBER OF CASES 2<br>AMOUNT OF ORDERRECEIVED 2<br>: |
| | GOODS 2 CODE<br>:<br>NAME OF GOODS 2 |
| | NUMBER OF CASES 3<br>AMOUNT OF ORDER RECEIVED 3<br>: |
| | GOODS 3 CODE<br>:<br>NAME OF GOODS 3 |

AFTER NON-NORMALIZATION

FIG. 50B

| RECEIPT OF ORDER-CONSECUTIVE R | |
|---|---|
| ORDER RECEIVING CONSECUTIVE NUMBER | DELIVERY DATE OF ORDER RECEIVED<br>DATE OF RECEIVING ORDER<br>TOTAL OF SLIPS OF ORDER RECEIVED (D)<br>NOTE 1<br>BALANCE OF ACCOUNTS OF CREDIT SALES OF CUSTOMER<br>QUANTITY OF ORDER RECEIVED<br>AMOUNT OF RETURNED GOODS<br>AMOUNT OF DISCOUNT<br>CUSTOMER CODE<br>AMOUNT OF CREDIT LIMIT<br>CUSTOMER'S NAME<br>WAREHOUSE CODE<br>NAME OF WAREHOUSE<br>PERSON IN CHARGE CODE<br>NAME OF PERSON IN CHARGE<br>DELIVERY DESTINATION CODE<br>DELIVERY DESTINATION'S NAME |

53

| ORDER-RECEIVED SPECIFICATION-CONSECUTIVE R | |
|---|---|
| ORDER RECEIVING SPECIFICATION CONSECUTIVE NUMBER | NUMBER OF CASES 1<br>AMOUNT OF ORDER RECEIVED (D) 1<br>QUANTITY OF ORDER RECEIVED 1<br>NOTE 1<br>GOODS 1 CODE<br>STANDARD 1<br>UNIT PRICE OF ORDER RECEIVED 1<br>UNIT 1<br>NUMBER 1<br>NAME OF GOODS 1<br>NUMBER OF CASES 2<br>AMOUNT OF ORDER RECEIVED 2<br>⋮<br>NAME OF GOODS 2<br>NUMBER OF CASES 3<br>AMOUNT OF ORDER RECEIVED 3<br>⋮<br>NAME OF GOODS 3 |

53

NON-NORMALIZED ENTITY

F I G. 5 1

FORM ID: 113  DOWNSTREAM ENTITY

| UPSTREAM ENTITY | | 1 | 2 | 3 | 4 | 5 |
|---|---|---|---|---|---|---|
| 1: 決済 (SETTLEMENT) | [E] | | | | | |
| 2: 入札 (BIDDING) | [E] | RF | | | RF | TS |
| 3: 決済者社員 (SETTLEMENT EMPLOYEE) | [R] | RF | RF | | RF | TS |
| 4: 設計 (DESIGN) | [E] | RF | | | | RF |
| 5: 工事 (CONSTRUCTION) | [E] | RF | | | | |

66 OK   70 変更 ALTERATION   68 削除 DELETION   80 列削除 DELETE ROWS   82 行削除 DELETE LINES   84 初期化 INITIALIZATION

FIG. 52

```
            "DIVISION" SCREEN

DIVISION CODE   XXXX

NAME OF DIVISION   XXXXXXXX
```

FIG. 53

```
          "PERSON IN CHARGE" SCREEN
  EMPLOYEE CODE   XXX,XXX

EMPLOYEE'S NAME   XXXXXXXXX

DIVISION CODE   XXX
```

F I G. 5 4

```
              "CUSTOMER" SCREEN

CUSTOMER CODE    XXX

CUSTOMER'S NAME    XXXXXXXXX
```

F I G. 5 5

```
              "DESIGN OFFICE" SCREEN

DESIGN OFFICE CODE    XXX

NAME OF DESIGN OFFICE NAME    XXXXXXXX
```

F I G. 5 6

```
                "ORDERER" SCREEN
ORDERER CODE   XXX
   ORDERER'S NAME   XXXXXXXX
   CORPORATE IMAGE   XXXXXX
```

F I G. 5 7

```
                "CLIENT" SCREEN
CLIENT CODE   XXX
   CLIENT'S NAME   XXXXXXXX
```

FIG. 58

"ARTICLE PUBLISHED" SCREEN

CONSECUTIVE NUMBER   XXX,XXX

DATE OF PUBLICATION   YYYY/MM/DD

TITLE OF MAGAZINE   XXXXXXX

OUTLINE OF ARTICLE   XXXXXXXX

CASE NUMBER   XXX,XXX

FIG. 59

"CASE OF BUSINESS" SCREEN

CASE NUMBER   XXX,XXX

TITLE OF CASE   XXXXXX                      ORDERING TIME   YYYY/MM/DD
DATE OF ENTRY   YYYY/MM/DD                  ESTIMATED CONSTRUCTION
DEGREE OF MATURITY OF CASE   XXX            COST   XXX,XXX,XXX
DEGREE OF POSSIBILITY                       SITE OF CONSTRUCTION   XXXXXXX
OF RECEIVING ORDER   XXX                    PURPOSE   XXXXX

OUTLINE OF CONSTRUCTION   XXXXXXXXX
SITE AREA   XXX,XXX
AREA OF BUILDING   XXX,XXX
DATE OF PUBLICATION   YYYY/MM/DD

CONSECUTIVE NUMBER   XXX,XXX
BUSINESS EMPLOYEE CODE   XXX
CUSTOMER CODE   XXX,XXX

F I G. 6 0

```
          "BUSINESS ACTIVITIES" SCREEN
    BUSINESS EMPLOYEE CODE    XXX,XXX

CASE NUMBER    XXX,XXX

DATE    YYYY/MM/DD

WORKING HOURS    XXX,XXX
```

FIG. 61

"DESIGN/ESTIMATION" SCREEN

DESIGN NUMBER XXX,XXX

TITLE OF DESIGN XXXXXX
DATE OF ENTRY YYYY/MM/DD
TERM OF WORKS YYYY/MM/DD
MATTERS DEMANDED XXXXXX

DATE OF SUBMISSION
OF DESIGN YYYY/MM/DD
DATE OF SUBMISSION
OF ESTIMATE YYYY/MM/DD
ESTIMATED AMOUNT XXX,XXX,XXX
PRECISION OF ESTIMATION XXX

DESIGN EMPLOYEE CODE XXX
CASE NUMBER XXX,XXX
ESTIMATE EMPLOYEE CODE XXX,XXX

FIG. 62

```
               "MAN-HOUR OF DESIGN" SCREEN
  DESIGN EMPLOYEE CODE    XXX
   DATE   YYYY/MM/DD
   DESIGN NUMBER   XXX,XXX
    WORKING HOURS   XXX,XXX
```

FIG. 63

```
              "MAN-HOUR OF ESTIMATION" SCREEN
   ESTIMATE EMPLOYEE CODE    XXX
    DATE   YYYY/MM/DD
    DESIGN NUMBER   XXX,XXX
     WORKING HOURS   XXX,XXX
```

FIG. 64

"SETTLEMENT" SCREEN

SETTLEMENT NUMBER   XXX,XXX          DATE OF SETTLEMENT   YYYY/MM/DD

TITLE OF CONSTRUCTION   XXXXXXX      JOINT VENTURE   XXXXXX

BIDDING PRICE   XXX,XXX,XXX

ESTIMATED PROFIT   XXX,XXX,XXX

PAYMENT CONDITION   XXXXX

BIDDING NUMBER   XXX,XXX

SETTLEMENT EMPLOYEE CODE   XXX

DESIGN NUMBER   XXX,XXX

CONSTRUCTION NUMBER   XXX,XXX

F I G. 65

"BID" SCREEN
BIDDING NUMBER   XXX,XXX

DATE OF BIDDING   YYYY/MM/DD
PLACE OF BIDDING   XXXXXXX
OTHER BIDDER COMPANY   XXXXXXX
DOCUMENT FOR SUBMISSION   XXXXXXXX

F I G. 66

"EXECUTION OF WORKS" SCREEN

CONSTRUCTION NUMBER   XXX,XXX

NAME OF CONSTRUCTION   XXXXXXX   ESTIMATED PROFIT   XXX,XXX,XXX

TERM OF WORKS   YYYY/MM/DD   TELEPHONE NUMBER   XXXXXXXXXX

NET CONSTRUCTION COST   XXX,XXX,XXX

CONSTRUCTION EMPLOYEE CODE   XXX

SETTLEMENT NUMBER   XXX,XXX

WORKING OFFICE CODE   XXX,XXX

FIG. 67

```
              "WORKING OFFICE" SCREEN
   WORKING OFFICE CODE    XXX

WORKING OFFICE ADDRESS   XXXXXXXX
       ·TELEPHONE NUMBER   XXXXXXXXXX
```

FIG. 68
REGISTRATION OF MASTER DATA
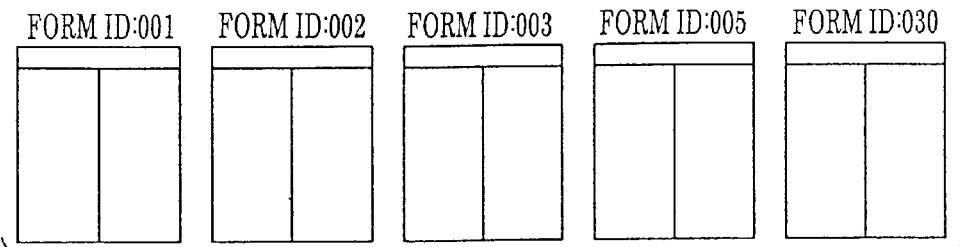
50M
MANAGEMENT OF ORDER RECEIVED
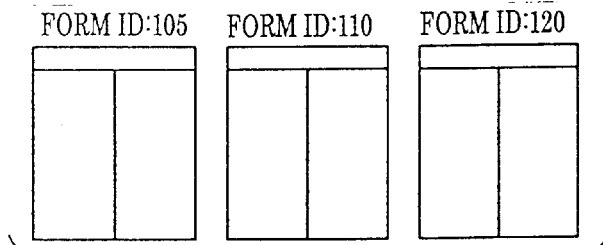
50J
MANACEMENT OF ORDERING
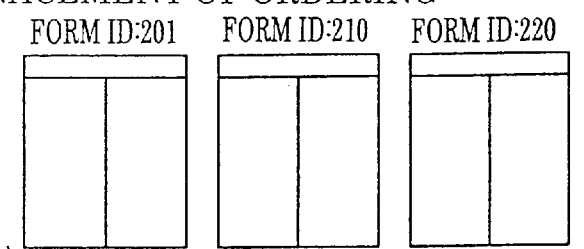
50H
MANAGEMENT OF STOCK
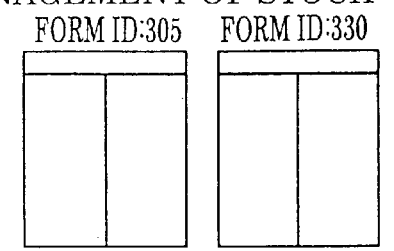
50Z

DATABASE DESIGN SYSTEM, DATABASE DESIGN METHOD AND RECORD MEDIUM

This application claims priority based on Japanese Patent Application No. 11-228419, filed Aug. 12, 1999; Japanese Patent Application No. 2000-40191; filed on Feb. 17, 2000; and on Japanese Patent Application No. 2000-234663, filed on Aug. 2, 2000.

BACKGROUND OF THE INVENTION

1. Field of the Invention

The present invention relates to a database design system, a database design method, a recording medium, and a display method. More precisely, the present invention relates to a database design system, a database design method, a recording medium, and a display method which automatically create an E-R diagram.

2. Description of the Related Art

An E-R (Entity-Relationship) model database creating operation is performed through each phase of preliminary design phase, detail design phase, and E-R diagram creation phase.

In a normalized database design process, which is mainly for an input-output screen (referred to as "screen" hereafter) and for a form, DA (Data Administrators) and SE (Systems Engineers) take charge of the task of designing. The present situation is that the number of screens/forms is more than 100 or 200 in some cases, and DAs and SEs design all of the screens/forms by handwork. The E-R model database design is described in detail in, for example, "Client/Server Database Design Technique" (SRC Handbook, by Masamni Satoh, the fourth edition published on Oct. 20, 1994).

When E-R diagrams are created by handwork, there has been a problem in that working hours are prolonged remarkably following an increase of the number of formats of screens/forms and thus lowers the production efficiency, or that the quality of the created E-R diagram will be dependent on experience of individual designers.

Moreover, when additional screens or additional forms need to be formed after an E-R diagram is created, DAs or SEs have to be engaged in additional processes by handwork. Since the design method is not specified, there has been another problem in that the additional processes are difficult to be performed and that designs differ according to the designers.

In order to solve these problems, the applicant of the present invention has proposed an E-R diagram design system in which normalization design of a database is worked out automatically by utilizing a computer in a database normalization design and development operation for an RDB (Relational Database).

More precisely, the system classifies screen/form data into key definition data and data items, and creates a temporary entity. The system retrieves the key definition data of each temporary entity, aggregates duplicated entities into one, normalizes the entity (i.e., creates a normalized entity), and specifies a type of each normalized entity. Moreover, the system creates a table showing the correspondence between the normalized entity and each screen/form, and creates an E-R model on the basis of the relationship between each entity in the table and/or stored in memory in advance.

By utilizing this system, an accurate normalization design of a database can be worked out without depending on each designer, so that the production efficiency and the quality can be raised.

However, in the prior art, when a plurality of E-R diagrams created for every business or every organization are integrated (an integrated E-R model generation), when the created E-R diagram is split into every business or every organization (or every business or every organization is extracted from the E-R diagram, i.e., an extracted E-R model generation), or when an E-R diagram is created for every screen/form in order to create a program specification, there has been a problem with this system in that whole steps of the normalization design of the database have to be done over again from the very beginning even though E-R diagrams have been created in the past, so that the production efficiency is inferior.

Moreover, in the prior art, when data generated in the process of design of the E-R diagram need to be altered in order to create an E-R diagram after addition or deletion of a screen/form, modification of the contents, or the like, there has been a problem with the above-described system in that generation process of the data has to be done over again from the very beginning, so that the production efficiency is inferior.

Further, when a screen/form needs to be deleted, a user designates entities, which are used only on the screen/form to be deleted, from among the entities used on the screen/form, and then the system deletes the designated entities and the relationship between these entities to create again an E-R diagram. Therefore, there has been a problem with the system in that an accurate normalization design of a database may not be worked out when the user mistakenly designates entities used on other screens.

Further, in the prior art, processing objects are screens/forms, so that the system has not corresponded to a functional specification, in which operations between data items define other data items, frequently used in business. Furthermore, in the prior art, each type of data cannot be effectively displayed during an E-R diagram creation process. Thus, the E-R diagram creation process has been lacking in user-friendliness.

The present invention is provided so as to solve the aforementioned problems, and an object of the present invention is to provide a database design system, a database design method, and a recording medium, in which a normalization design operation for an RDB can be performed corresponding to a functional specification as well as a screen/form, and integration of and extraction from E-R diagrams created after a database normalization design operation, and addition and deletion of targeted screens, forms and/or functional specifications to be processed can be performed efficiently and accurately, so that the production efficiency and quality can be improved. Further, another object of the present invention is to provide a display method that can effectively display each type of data when an E-R diagram is created.

SUMMARY OF THE INVENTION

In order to achieve the aforementioned objects, a first aspect of the present invention is a database design system utilizing an E-R model including: a temporary entity creation section for creating a temporary entity by classifying a plurality of data including key definition data and data items corresponding to the key definition data into the key definition data and the data items corresponding to the key definition data; a normalized entity creation section for creating a normalized entity by aggregating the temporary entities, if any, which have a common key definition data therein, into one entity; a setting section for setting an entity type for the normalized entity; a first table creation section for creating a first matrix table showing the correspondence between the normalized entity created by said normalized entity creation section and the data; a second table creation section for creating, for each of the data, a second matrix table showing the relationship between the normalized entities which belong to the data, on the basis of the first matrix table and the relationship between the normalized entities based on a preset entity type; and an E-R diagram creation section for creating an E-R diagram on the basis of the second matrix table created for each of the data by said second table creation section.

In accordance with the first aspect of the present invention, the temporary entity creation section classifies the plurality of data, which include the key definition data and the data items corresponding to the key definition data and are input by the input section, into the key definition data and the data items corresponding to the key definition data to create a temporary (or unnormalized) entity.

In a second aspect of the invention, the system further includes an input section for inputting a plurality of data which includes key definition data and data items corresponding to the key definition data. Data may be input to the database design system with the input section, directly or via a network or the like. Further, the data may be data for/on a screen, a form or a functional specification. Moreover, when a plurality of identical key definition data or data items are included in the same data such as in a functional specification, for example, the temporary entity creation section may aggregate the identical key definition data or the data items in each of the data into one (i.e., remove duplication), and then create a temporary entity.

The normalized entity creation section performs aggregating operation (so-called normalization operation) to aggregate the temporary entities, if any, which have a common key definition data therein, among the created temporary entities into one entity, and creates a normalized entity. An entity type of the created normalized entity is then set by the setting section.

Moreover, the first table creation section creates a first matrix table showing the correspondence between the normalized entity created by the normalized entity creation section and the data. What can be understood from the first matrix table is that with which data each normalized entity is corresponding (belongs to), in other words, to which data the temporary entities aggregated for each normalized entity have belonged. It can also be understood which normalized entity belongs to each screen.

The second table creation section creates, for every data, a second matrix table showing the relationship between the normalized entities on the basis of the first matrix table and a table which predetermines the relationship between entities according to their entity types. The E-R diagram creation section creates an E-R diagram on the basis of the second matrix table. In such a manner, a so-called database normalization design operation may be performed to generate the relationship between the normalized entities, and then to create E-R diagrams.

At this time, since the second matrix table is created for each of the data, in a third aspect of the present invention, the E-R diagram creation section can easily create an E-R diagram either on the basis of at least one of the data or on the basis of a combination of two or more input data. That is, it is possible to create any of an E-R diagram on the basis of all of the data, an E-R diagram for every input data (a partial/sectional E-R diagram), and an E-R diagram on the basis of any data combination from among all of the data (an extracted E-R diagram).

A fourth aspect of the present invention is a database design system according to the first aspect, wherein when a command to integrate a plurality of E-R diagrams created by the E-R diagram creation section is entered, the normalized entity creation section aggregates the normalized entities, if any, which have a common key definition data therein, into one entity at the time of generation of each E-R model.

In the fourth aspect of the present invention, when a plurality of E-R diagrams created by the E-R diagram creation section are integrated, the normalized entities having a common key definition data among the normalized entities in the plurality of E-R diagrams created by the normalized entity creation section are aggregated into one entity. That is, the normalized entity creation section performs the normalization operation targeted over the normalized entities which have been used in creating different E-R diagrams, and eliminates the duplication of the normalized entities. On the basis of the results, the first matrix table is created by the first table creation section, and the second matrix table is created by the second table creation section on the basis of the created first matrix table. The E-R diagram creation section may integrate a plurality of E-R diagrams to create an integrated E-R diagram by creating an E-R diagram on the basis of the second matrix table.

A fifth aspect of the present invention is a database design system according to the first aspect, further including an altering section for altering at least one of the correspondence between the normalized entity in the first matrix table and the input data, the relationship between the normalized entities in the second matrix table, the entity type of the normalized entity, and the correspondence between the key definition data and the data item which form the normalized entity.

In accordance with the fifth aspect of the present invention, at least one of the correspondence between the normalized entity in the first matrix table and the data, the relationship between the normalized entities in the second matrix table, the entity type of the normalized entity, and the correspondence between the key definition data and the data item which form the normalized entity is altered by the altering section. Accordingly, the system can manage to add and/or delete data, to modify contents, and the like.

For example, the correspondence between the normalized entity and the data (i.e., the first matrix table created by the first table creation section) can be altered by the altering section on the basis of addition and/or deletion of data, contents modification of data, and the like.

The relationship between the normalized entities (i.e., the second matrix table created by the second table creation section) can also be altered by the altering section on the basis of addition and/or deletion of data, contents modification of data, alteration of the entity type of the normalized entity, and the like.

Moreover, when an improper entity type is set by the setting section, the entity type of the normalized entity can be easily altered to the correct entity type by the altering section.

Further, the altering section can alter the correspondence between the key definition data and the data items which form the normalized entity on the basis of addition and/or deletion of data, contents modification of data, and the like.

A sixth aspect of the present invention is a database design system according to the fifth aspect, wherein the altering section includes: a first decision section for deciding, when a command to delete the data is entered, whether deletion of the normalized entity included in the target data to be deleted is possible or not; and a first deleting section for deleting the data when the first decision section decides that deletion of the normalized entity is impossible, and for deleting the data and the normalized entity when the first decision section decides that deletion of the normalized entity is possible; wherein the altering section alters correspondence between the normalized entity in the first matrix table and the data when the data, or the data and the normalized entity are deleted by the first deleting section.

In accordance with the sixth aspect of the present invention, the altering section is provided with the first decision section and the first deleting section. When the command to delete the data is entered, the first decision section decides whether deletion of the normalized entity corresponding to the target data to be deleted (the data designated by the delete command for deletion) is possible or not. The normalized entities corresponding to the target data to be deleted can be extracted from the first matrix table. The first deleting section deletes only the target data to be deleted when deletion of the normalized entity is impossible, and deletes the normalized entity along with the target data to be deleted when deletion of the normalized entity is possible. The altering section alters the correspondence between the normalized entity and the data in the first matrix table on the basis of the results of the deletion, thereby enabling the first matrix table to be altered (modified) easily and efficiently according to deletion of data.

At this time, in a seventh aspect of the present invention, the first decision section may decide that deletion of the normalized entity is possible when the normalized entity corresponding to the target data to be deleted corresponds only to the target data to be deleted. Accordingly, the target data to be deleted as well as the normalized entity associated only with the target data to be deleted can be deleted from the first matrix table.

For example, as in an eighth aspect of the present invention, the system may further include a first storage section for storing the number of data to which the normalized corresponds, wherein when a command to additionally input the data is entered, the first decision section increments the number, stored in the first storage section, of the normalized entity corresponding to the target data to be added, and when a command to delete the data is entered, the first decision section decrements the number, stored in the first storage section, of the normalized entity corresponding to the target data to be deleted, and the first decision section decides that deletion of the normalized entity is possible when the number becomes '0'.

That is, the first storage section stores the number of data (referred to as "the utilization number" hereafter) with which each normalized entity is associated (i.e., utilized). The utilization number is incremented or decremented according to addition or deletion of data by the first decision section, and always updated to the up-to-the-minute value. Accordingly, when the first decision section decrements the utilization number of the normalized entity corresponding to the target data to be deleted according to the deletion of the data and the number becomes '0', the first decision section can decide that the normalized entity is only corresponding to the target data to be deleted, so that deletion of the normalized entity is possible.

A ninth aspect of the present invention is a database design system according to the fourth-aspect, the altering-section includes: a second deleting section for deleting the relationship between the entities in the second matrix table when a command to delete the relationship between the entities in the data is entered, and wherein the E-R diagram creation section includes: a second decision section for deciding whether deletion of a connecting line, which indicates the relationship between the entities deleted by the second deleting section, from the E-R diagram is possible or not; and a third deleting section for deleting the connecting line indicating the relationship between the entities from the E-R diagram when the second decision section decides that deletion of the connecting line is possible.

In accordance with the ninth aspect of the present invention, in the altering section, when the command to delete the relationship between the entities is entered in the case in which the need arises to delete the normalized entity due to deletion of data or modification of contents, or in which an unnecessary relationship between normalized entities exists, the second deleting section deletes the relationship between the normalized entities from the second matrix table.

In the E-R diagram creation section, when the relationship between the normalized entities is deleted by the second deleting section, the second decision section decides whether deletion of the connecting line between the entities from the E-R diagram is possible or not. When the second decision section decides that deletion of the connecting line is possible, the third deleting section deletes the connecting line between the entities from the E-R diagram. In such a manner, the E-R diagram can be altered (modified) easily and efficiently by altering (modifying) the second matrix table according to deletion of data, contents modification, or deletion of unnecessary relationship between normalized entities.

At this time, as in a tenth aspect of the present invention, the second decision section may decide that deletion of the connecting line indicating the relationship between the entities in the E-R diagram is possible, when the relationship between the entities deleted by the second deleting section exists only in the data related to the deleted relationship between the entities.

Accordingly, when the relationship between the normalized entities existed only in one data is deleted, the connecting line showing the relationship between the normalized entities can be deleted from the E-R diagram, and when the relationship between the deleted entities exists in other data, the connecting line showing the relationship between the normalized entities on the E-R diagram can be remained.

For example, as in an eleventh aspect of the present invention, the system may further include a second storage section for storing the number of data to which the relationship between the entities belongs, wherein when a command to add the relationship between the entities is entered, the second decision section increments the number, stored in the second storage section, corresponding to the target relationship between the entities to be added, and when a command to delete the relationship between the entities is entered, the second decision section decrements the number, stored in the second storage section, corresponding to the target relationship between the entities to be deleted, and the second decision section decides that deletion of the connecting line indicating the relationship between the entities in the E-R diagram is possible when the number becomes '0'.

That is, the second storage section stores the number of data to which each relationship between entities belongs (referred to as "the relationship number" hereafter). The relationship number is incremented or decremented according to addition or deletion of the relationship between the entities by the second decision section, and always updated to the up-to-the-minute value. Accordingly, when the second decision section decrements the relationship number of the relationship between the entities according to the deletion of the relationship between the entities and then the number becomes '0', the second decision section can decide that the relationship between the entities exists only in the data corresponding to the target relationship between the entities to be deleted, so that deletion of the connecting line showing the relationship between the entities on the E-R diagram is possible.

A twelfth aspect of the present invention is a database design system according to the fourth aspect, wherein when a command to alter the entity type of the normalized entity is entered, the altering section alters the entity type of the normalized entity, retrieves data corresponding to the normalized entity from among the data by referring to the first matrix table, and alters, on the basis of the alteration of the entity type, the relationship between the normalized entities belonging to the retrieved data.

In accordance with the twelfth aspect of the present invention, when the altering section alters the entity type of the normalized entity, it looks up the first matrix table, retrieves the data with which the normalized entity is associated from among the data, and alters the relationship between the normalized entities belonging to the retrieved data. Accordingly, alteration. of the relationship between the normalized entities due to the alteration of the entity type can be performed accurately, and any omissions of alteration for the relationship between the normalized entities can be prevented.

A thirteenth aspect of the present invention is a database design system according to the fourth aspect, wherein the altering section includes: a third decision section for deciding, when a command to delete the data is entered, whether deletion of at least one of the key definition data and the data item included in the target data to be deleted from the key definition data and the data item which form the normalized entity is possible or not; and a fourth deleting section for deleting at least one of the key definition data and the data item included in the target data to be deleted when the third decision section decides that deletion is possible.

In accordance with the thirteenth aspect of the present invention, the altering section includes the third decision section and the fourth deleting section. When the command to delete the data is entered, the third decision section decides whether deletion of at least one of the key definition data and the data item included in the target data to be deleted is possible or not. The key definition data and the data item which are decided to be capable of deletion by the third decision section are deleted from the key definition data and the data item forming the normalized entity by the fourth deleting section. In such a manner, the correspondence between the key definition data and the data item which form the normalized entity can be altered (modified) easily and efficiently according to deletion of data.

At this time, as in a fourteenth aspect of the present invention, the third decision section may decide that deletion of at least one of the key definition data and the data item possible when at least one of the key definition data and the data item included in the target data to be deleted is included only in the target data to be deleted. Accordingly, only the key definition data and the data item included in the target data to be deleted can be deleted from among the key definition data and the data items forming the normalized entities.

For example, as in a fifteenth aspect of the present invention, the system may further include a third storage section for storing the number of data including the same key definition data, and the number of data including the same data item, wherein when a command to additionally input the data is entered, the third decision section increments the number, stored in the third storage section, of the key definition data and of the data item included in the target data to be added, and when a command to delete the data is entered, the third decision section decrements the number, stored in the third storage section, of the key definition data and of the data item included in the target data to be deleted, and the third decision section decides that deletion of the key definition data or the data item is possible when the number becomes '0'.

That is, the third storage section stores the number of data which includes the same key definition data, and the number of data which includes the same data item (i.e., the utilization number of each key definition data and the utilization number of each data item). These utilization numbers are incremented or decremented by the third decision section according to addition or deletion of data, and always updated to the up-to-the-minute values. Accordingly, when the third decision section decrements the utilization number of the key definition data or that of the data item included in the target data to be deleted according to the deletion of data, the third decision section can decide that the key definition data or the data item whose utilization number becomes '0' is only corresponding to the target data to be deleted, so that deletion of the key definition data or the data item is possible.

A sixteenth aspect of the present invention is a database design system according to the fourth aspect, wherein the E-R diagram creation section modifies the E-R diagram on the basis of the results of alteration performed by the altering section, and give notice of portions of the E-R diagram which have been modified.

In accordance with the sixteenth aspect of the present invention, since the E-R diagram created before alteration is modified by the E-R diagram creation section on the basis of the results of alteration performed by the altering section and the modified parts are informed, users can easily grasp the modified parts. In particular, in the case of a partial E-R diagram used as a program specification for practically constructing a DBMS (Data Base Management System), users can easily understand which part of the program needs to be modified and how it should be modified from the informed modified parts, thereby reducing the time required for a program modification operation.

A seventeenth aspect of the present invention is a database design system according to the first aspect, wherein the temporary entity creation section includes: a master file creating section for creating a master file by registering the key definition data and the data items corresponding to the key definition data of the created temporary entities; a retrieval section for retrieving a data item, which does not correspond to any key definition data even though the data item is the same as the one registered in the master file with a key definition data, by referring to the master file; and a retrieval results notification section for giving notice of the results of retrieval.

In accordance with the seventeenth aspect of the present invention, the temporary entity creation section includes the master file creating section, the retrieval section, and the notification section.

The temporary entity creation section classifies the data into the key definition data and the data items corresponding to the key. definition data to create a temporary entity, and the master file creating section registers the key definition data and the data items corresponding to the key definition data of the created temporary entity into the master file.

Moreover, the retrieval section retrieves a data item, which is not corresponding to any key definition data even though the data item is the same as the one registered in the master file along with a key definition data. The retrieved data item is informed by the notification section. Users decide that the informed data item is a data item forgotten to be classified (or mistakenly classified), and can classify it again, so that a temporary entity can be created properly.

An eighteenth aspect of the present invention is a database design system according to the first aspect, wherein the temporary entity creation section classifies unclassified additional input data into their key definition data and the data items corresponding to the key definition data by referring to the already-created/existing normalized entities, and creates a temporary entity.

In accordance with the eighteenth aspect of the present invention, when the data are additionally input, the temporary entity creation section classifies the additional input data into the key definition data and the data items by referring to the existing normalized entities to create a temporary entity. After normalized entities have been created for the unclassified data by the normalized entity creation section, data may be newly added or there may be, in a case where a large amount of data is to be processed and normalized entity creation processing has already been performed on a part of the data, the rest of the data, or the like. Accordingly, the time required for the data to be added, or the time required for processing the large amount of data, can be reduced.

A nineteenth aspect of the present invention is a database design system according to the seventeenth aspect, wherein the normalized entity creation section aggregates a,temporary entity, which has the same key definition data as that of,one of the existing normalized entities into the one existing normalized entity whose key definition data is the same, and turns a temporary entity having a key definition data different from those of the existing normalized entities into a new normalized entity.

In accordance with the nineteenth aspect of the present invention, when the data is additionally input or when, in the case where there is a large amount of data to process and a part of the data has already been processed, the rest of the data is processed, or the like, the normalized entity creation section compares the key definition data of the temporary entity newly created from the added data, remaining data or the like with the key definition data of the existing normalized entity. When the key definition data are the same, the temporary entity is aggregated with the existing normalized entity. Only when the key definition data are different, the temporary entity is turned into a new normalized entity. Accordingly, the time required for the data to be added can be reduced.

In this case, in a twentieth aspect of the invention, an automatic classification notification section may also be provided. The automatic classification notification section gives notification of the temporary entity that has been automatically classified, with reference to existing normalized entities, or of the normalized entity with which the temporary entity has been aggregated.

A twenty-first aspect of the present invention is a database design system according to the first aspect, further including a manual correction section and a status notification section.

The manual correction section is for manual correction of correspondence relationships of key definition data and data items. The status notification section gives notification of the status of corrections made by the manual correction section.

In accordance with the twenty-first aspect of the present invention, correspondence relationships of key definition data and data items can be manually corrected by the manual correction section. Notification of the status of these corrections is given by the status notification section. Thus, the user can easily ascertain where corrections have been made.

A twenty-second aspect of the present invention is a database design system according to the first aspect, further including a consistency decision section and an inconsistency notification section. The manual addition/deletion section implements manual addition or deletion of a normalized entity or, in the data, a key definition data or a data item. After an addition or deletion by the manual addition/ deletion section, the consistency decision section decides. whether correspondences between the data and the normalized entities have been conserved or not. If the consistency decision section detects an inconsistency, the inconsistency notification section gives notification of the inconsistency.

In accordance with the twenty-second aspect of the present invention, manual addition or deletion of key definition data or a data item at the data can be done at the manual addition/deletion section. Further, manual addition or deletion of a normalized entity can be done at the manual addition/deletion section. After the addition or deletion by the manual addition/deletion section, the consistency decision section determines whether consistency has been conserved in the data and the normalized entities subsequent to the addition or deletion. If there is an inconsistency, notification is given by the inconsistency notification section. Accordingly, the user can identify an inconsistency easily. The user can then perform an addition or deletion with the manual addition/deletion section, so as to eliminate the inconsistency and facilitate consistency.

A twenty-third aspect of the present invention is a database design system according to the first aspect, further including a division/integration section, which performs division or integration of the normalized entities.

In accordance with the twenty-third aspect of the present invention, the normalized entities can be split or joined by the division/integration section. Thus, access time to the database, when the DBMS is constructed and operated in practice, can be shortened.

A twenty-fourth aspect of the present invention is a database design system according to the first aspect, wherein the first matrix table creation section creates, in addition to the first matrix table, a third matrix table showing, for each of the normalized entities, the correspondence between the key definition data and data item which form the normalized entity, and the data.

In accordance with the twenty-fourth aspect of the present invention, the first matrix table creation section also creates the third matrix table which shows, for each of the normalized entities, the correspondence between the key definition data and data item, forming the normalized entity, and the data. It is possible to understand, based on the third matrix table, as to which data to which the key definition-data and data item which form each entity correspond (belong). As a result, so-called data life cycle analysis is facilitated.

A twenty-fifth aspect of the present invention is a database design system according to the first aspect, wherein the second table creation section classifies the normalized entity into a normalized entity for a header part and a normalized entity for a detail part in which repetitive items in the data are listed, and creates the second matrix table by determining the relationship between the normalized entities for the header part, the relationship between the normalized entities for the detail parts, and the relationship between the header part and the detail part.

In accordance with the twenty-fifth aspect of the present invention, the normalized entity is classified into the normalized entity for the header part and the normalized entity for the detail part, and then the relationship between the normalized entities for the header parts, the relationship between the normalized entities for the detail parts, and the relationship between the header part and the detail part are sought for creating the second matrix table. That is, the relationship between each normalized entity for the header part and each normalized entity for the detail part can be omitted, so that the time required for the second matrix table to be created can be reduced.

A twenty-sixth aspect of the present invention is a database design system according to the first aspect, further including a display control section. The display control section displays the data, the normalized entities, the first matrix table, the second matrix table and the E-R diagram.

In accordance with the twenty-sixth aspect of the present invention, because the display control section can display the data, the normalized entities, the first matrix table, the second matrix table and the E-R diagram, the user can check the same.

For example, the display control section may display the data and the normalized entities along with the first matrix table created by the first matrix table creation section, the second matrix table created by the second matrix table creation section, or the E-R diagram created by the E-R diagram creation section. Accordingly, the user can easily check whether results of the creation of the first matrix table, the second matrix table and the E-R diagram are suitable.

In another example, the display control section may arrange the data in order of identification numbers assigned to each data, or separated into previously assigned groups. A portion of the data is designated to be processed by the normalized entity creation section. The normalized entity creation section processes the designated data and newly created normalized entities are arranged adjacent to the data.

When the display control section displays the data, the key definition data and data items included in each data are displayed in a single display frame assigned to that data. In addition a data title is displayed adjacent to the data frame.

In a thirty-second aspect of the present invention, a database design method utilizing an E-R model includes the steps of creating a temporary entity from a plurality of data including key definition data and data items corresponding to the key definition data by classifying the data into the key definition data and the data items corresponding to the key definition data; creating a normalized entity by aggregating the temporary entities, if any, which have a common key definition data therein, into one entity; setting an entity type for the normalized entity; creating a first matrix table showing the correspondence between the normalized entity and the data; creating, for each data, a second matrix table showing the relationship between the normalized entities, which belong to the data, on the basis of the first matrix table and the relationship between the normalized entities based on the preset entity type; and creating an E-R diagram on the basis of the second matrix table created for each data.

In accordance with the thirty-second aspect of the present invention, the temporary entity is created by classifying the plurality of input data including the key, definition data and the data items corresponding to the key definition data into the key definition data and the data items corresponding to the key definition data. Aggregating operation (so-called normalization operation) is performed to aggregate the temporary entities, if any, which have a common key definition data therein, among the created temporary entities into one entity, and to create a normalized entity. The entity type of the created normalized entity is then set. Moreover, the first matrix table showing the correspondence between the created normalized entity and the data is created, and the second matrix table showing the relationship between the created normalized entities is created on the basis of the first matrix table and a table which predetermines the relationship between entities according to their entity type. The E-R diagram is created on the basis of the second matrix table. In such a manner, a normalization design operation for a database is performed, and the E-R diagram can be created.

Further, by creating the second matrix table for every data, an E-R diagram either on the basis of at least one of the plurality of data or on the basis of the combination of two or more data can easily be created.

As with the first aspect, the plurality of data including the key definition data and the data items corresponding to the key definition data may be input directly or via a network or the like. Moreover, this data may be data for/on a screen, a form, or a functional specification.

In accordance with a thirty-third aspect of the present invention, at least one of the correspondence between the normalized entity in the first matrix table and the data, the relationship between the normalized entities in the second matrix table, the entity type of the normalized entity, and the correspondence between the key definition data and the data item which form the normalized entity may be alterable. Accordingly, addition and/or deletion of data, contents modification of data, and the like can be processed.

In a thirty-fourth aspect of the present invention, a computer readable recording medium is provided on which a database design program for designing a database utilizing an E-R model has been recorded. The database design program creates a temporary entity by classifying a plurality of data, which include key definition data and data items corresponding to the key definition data, into the key definition data and the data items corresponding to the key definition data, creates a normalized entity by aggregating the temporary entities, if any, which have a common key definition data therein, into one entity, sets an entity type of the normalized entity, creates a first matrix table showing the correspondence between the normalized entity and the data, creates, for each data, a second matrix table showing the relationship between the normalized entities which belong to the data, on the basis of the first matrix table and the relationship between the normalized entities based on a preset entity type, and creates an E-R diagram on the basis of the second matrix table created for each data.

In accordance with the thirty-fourth aspect of the present invention, the database design program for creating the E-R diagram has been recorded on the computer readable recording medium. According to the program, the temporary entity is created by classifying the plurality of data including the key definition data and the data items corresponding to the key definition data into the key definition data and the data items corresponding to the key definition data. Aggregating operation (so-called normalization operation) is performed to aggregate the temporary entities, if any, which have a common key definition data therein, among the created temporary entities into one entity, and to create a normalized entity. The entity type of the created normalized entity is then set. Moreover, the first matrix table showing the correspondence between the created normalized entity and the data is created, and the second matrix table showing the relationship between the created normalized entities is created on the basis of the first matrix table and a table which predetermines the relationship between entities according to their entity type. The E-R diagram is created on the basis of the second matrix table. Therefore, in accordance with the database design program, a database can be designed by a computer.

Moreover, since the second matrix table is created for every data, an E-R diagram on the basis of at least, one data from among the plurality of data, or an E-R diagram on the basis of the combination of two or more data can easily be created by the computer. As with the first aspect, the plurality of data including the key definition data and the data items corresponding to the key definition data may be input directly or via a network or the like. Moreover, this data may be data for/on a screen, a form, or a functional specification.

Further, in accordance with a thirty-fifth aspect of the present invention, in the database design program, at least one of the correspondence between the normalized entity in the first matrix table and the data, the relationship between the normalized entities in the second matrix table, the entity type of the normalized entity, and the correspondence between the key definition data and the data item forming the normalized entity can be altered. Accordingly, addition and/or deletion of data, contents modification of data, and the like can be processed.

In a thirty-sixth aspect of the present invention, there is a display method in which, when the E-R model is created on the basis of the data that includes the key definition data and data items corresponding to the key definition data, each data is displayed in a single display frame assigned to that data and a data title is displayed adjacent to the data frame.

In accordance with the thirty-sixth aspect of the present invention, a display frame is provided for each data, the key definition data and data items corresponding to the key definition data of each data are displayed in the display frame that corresponds to the respective data, and the title of the data is displayed adjacent to the display frame. Accordingly, for each data, the key definition data and data items included in the data, can be easily checked.

For example, the key definition data and the data items may be displayed separately by entity in the display frame (1-column form).

Further, the display frame may be divided into a key definition data display column and a data item display column. Thus, the key definition data and the data items may be displayed in the key definition data display column and the data item display column, separately by entity (2-column form).

Further, the size of the display frame may be adjusted in accordance with the number of characters and/or the number of items of the key definition data and/or the data items which are displayed in the display frame.

BRIEF DESCRIPTION OF THE DRAWINGS

FIG. 4A and FIG. 4B show examples of form and data item display frames displayed when a data item is retrieved in the embodiment of the present invention, wherein FIG. 4A is an example of a form and data item display frame for a "Division" screen and FIG. 4B is an example of a form and data item display frame for an "Execution of Works" screen.

FIG. 5A and FIG. 5B show examples of form and data item display frames displayed when a temporary entity is created in the embodiment of the present invention, wherein FIG. 5A is an example of a form and data item display frame for a "Division" screen, and FIG. 5B is an example of a form and data item display frame for an "Execution of Works" screen.

FIG. 6A and FIG. 6B show other-examples of form and data item display frames displayed when a temporary entity is created, wherein FIG. 6A is an example of a form and data item display frame for an "Execution of Works" screen displayed when a data item is extracted, and FIG. 6B is that for an "Execution of Works" screen displayed when a temporary entity is created.

FIG. 9 is an example of a correspondence matrix table seen in which the correspondence matrix is displayed in the embodiment of the present invention.

FIG. 10 is an example of a detailed correspondence matrix table screen in which a detailed correspondence matrix table is displayed, and it shows an example of a "Division" entity detailed correspondence matrix table screen in the embodiment of the present invention.

FIG. 14 is a diagram illustrating an example of a "Sum of Order Received" screen.

FIGS. 15A and 15B are examples of a form and data item display frame illustrating an example of a temporary entity creation process result for the "Sum of Order Received" screen of FIG. 14.

FIG. 16 is a diagram for explaining the temporary entity which is registered in the master file when the temporary entity of the "Sum of Order Received" screen in FIG. 14 is created.

FIG. 17 is an example of the form and data item display frame illustrating an example of a normalized entity belonging to the "Sum of Order Received" screen of FIG. 14 which appears after the normalized entity registration process.

FIG. 18 is an example of a relationship matrix table screen illustrating an example of a processing result in a case where a relationship creation process of the, normalized entity which belongs to the "Sum of Order Received" screen of FIG. 14 is carried out taking an HDR portion and a DTL portion into consideration.

FIG. 19 is an example of a relationship matrix table screen illustrating an example of a processing result in a case where a relationship creation process for the normalized entity which belongs to the "Sum of Order Received" screen of FIG. 14 is carried out without taking an HDR portion and a DTL portion into consideration.

FIG. 20 is an example of a correspondence matrix table screen in a case where an entity type of the "Settlement" entity is incorrect.

FIG. 21A and FIG. 21B show examples of relationship matrix table screens to which the entity belong, where FIG. 21A shows a screen whose form ID is 113 and FIG. 21B shows a screen whose form ID is 115, in a case where the entity type of the "Settlement" entity is incorrect.

FIG. 22A and FIG. 22B show examples of relationship matrix table screens to which the entity belong, where FIG. 22A shows a screen whose form ID is 113 and FIG. 22B shows a screen whose form ID is 115, in a case where the entity type of the "Settlement" entity is changed to the correct type.

FIG. 25 is an example of an "Sum of Ordering" screen.

FIG. 27 is an example of a form and data item display frame which displays the normalized entity belonging to the "Sum of Ordering" screen which is created by the normalization process design being carried out with the "Sum of Ordering" screen being used as the screen which is the object of processing FIG. 28 is an example of a correspondence matrix table screen which displays a correspondence matrix table created by the normalization process being carried out with the "Sum of Ordering" screen being used as the screen which is the object of processing.

FIG. 29 is an example of a relationship matrix table screen which displays the relationship matrix for the "Sum of Ordering" screen which is created by the normalization process being carried out with the "Sum of Ordering" screen being used as the screen which is the object of processing.

FIG. 30A and FIG. 30B are diagrams for explaining the screen/form addition process wherein FIG. 30A illustrates an example of a form and data item display frame for the "Sum of Order Received" screen (an additional screen) before the automatic normalization process is carried out, and FIG. 30B illustrates an example of a form and data item display frame for the "Sum of Order Received" screen after the automatic normalization process is carried out, in the embodiment of the present invention.

FIG. 32 is an example of a relationship matrix table screen which displays a relationship matrix table for the "Sum of Order Received" screen which is created by the screen/form addition/ removal process being carried out with the "Sum of Order Received" screen being used as the screen which is the object of the addition/ removal.

FIG. 36 is a diagram for explaining the integration process of the E-R diagram and is an example of an E-R diagram which is the object of processing in the embodiment of the present invention.

FIG. 37 is an example of a correspondence matrix table screen illustrating the correspondence matrix table in the F-R diagram in FIG. 36.

FIG. 41A and FIG. 41B are diagrams illustrating examples of a creation process result of a partial E-R diagram of the embodiment of the present invention, and is the portion of the E-R diagram wherein FIG. 41A is the screen for which the, form ID is 102 and FIG. 41B is the screen for which the form ID is 110.

FIG. 42 is an explanatory diagram, illustrating a "Trust Fee Deduction Amount" function specification as an example of a function specification in the embodiment of the present invention.

FIG. 43 is an example of a form and data item display frame for a "Trust Fee Deduction Amount" function specification for explaining a data item in the function specification, which was extracted from the "Trust Fee Deduction Amount" function specification.

FIG. 44A is an example of the form and data item display frame when an automatic size adjustment function is set to OFF and FIG. 44B is an example of the form and data item display frame when the automatic size adjustment function is set to ON.

FIG. 46 is an example of a partial E-R diagram in which the automatic aggregation function is set to ON.

FIG. 47A is an example of a form and data item display frame in a case where unregistered data items exist, and FIG. 47B is an example of an entity display frame in a case where unused data items exist.

FIG. 48A is a form and data item display screen before a user enters an OK command and before a temporary entity is created. FIG. 48B is an example of a form and data item display frame after the OK command has been entered. FIG. 48C illustrates the registered estimation specification after the OK command has been entered.

FIG. 49A illustrates the structure of the entity in the "Sum of Order Received" screen before non-normalization. FIG. 49B illustrates the structure of the non-normalized entity in the "Sum of Order Received" Screen in a case where the non-normalization function is set to ON FIG. 49C illustrates the registered non-normalization function entity.

FIG. 50A and FIG. 50B are examples of the non-normalized entity in a case in which the number of times the DTL entity is to be repeated is set, wherein FIG. 50A illustrates the structure of the non-normalized entity in the "Sum of Order Received" screen and FIG. SOB illustrates the registered non-normalized entity.

FIG. 51 is another example of a relationship matrix table screen.

FIG. 52 is a diagram illustrating an example of a "Division" screen.

FIG. 53 is a diagram illustrating an example of a "Person-in-Charge" screen.

FIG. 54 is a diagram illustrating an example of a "Customer" screen.

FIG. 55 is a diagram illustrating an example of a "Design Office" screen.

FIG. 56 is a diagram illustrating an example of a "Orderer" screen.

FIG. 57 is a diagram illustrating an example of a "Client" screen.

FIG. 58 is a diagram illustrating an example of a "Published Article" screen.

FIG. 59 is a diagram illustrating an example of a "Case of Business" screen.

FIG. 60 is a diagram illustrating an example of a "Business Activity" screen.

FIG. 61 is a diagram illustrating an example of a "Estimation of Design" screen.

FIG. 62 is a diagram illustrating an example of a "Man-hour of Design" screen.

FIG. 63 is a diagram illustrating an example of a "Man-hour of Estimation" screen.

FIG. 64 is a diagram illustrating an example of a "Settlement" screen.

FIG. 65 is a diagram illustrating an example of a "Bidding" screen.

FIG. 66 is a diagram illustrating an example of an "Execution of Works" screen.

FIG. 67 is a diagram illustrating an example of a "Working Office" screen.

FIG. 68 is a diagram illustrating an example of a display in which the form and data item display frames are divided into groups.

DESCRIPTION OF THE PREFERRED EMBODIMENTS

Next, embodiments of the present invention will be described in detail with reference to the drawings.

Overall Structure of System

Figure 1:
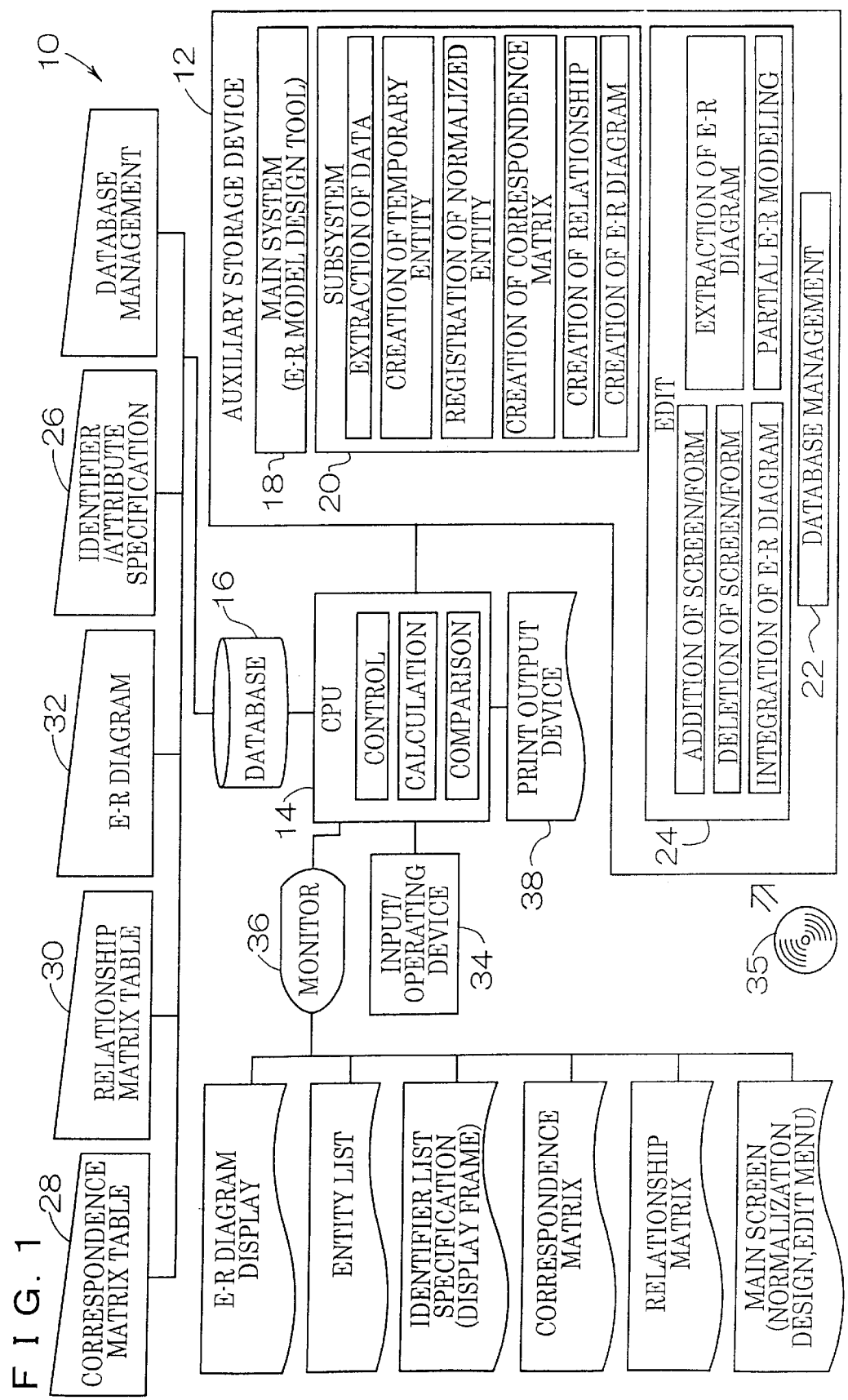
FIG. 1 is a structural view of a database design system in an embodiment of the present invention.

FIG. 1 shows an overall structural view of a database design system. As illustrated in FIG. 1, a database design system 10 is structured to include an auxiliary storage device 12 which stores various types of programs for driving the system of the present invention, a CPU 14 which reads out various types of programs from the auxiliary storage device 12 and carries out the programs, and a database 16 which stores results of various types of processes by the CPU 14.

The auxiliary storage device 12 stores, as well as an activating program 18 of an E-R model database design tool which is a main system, an activating program 20 of subsystems for a database normalization design including extraction of data, creation of temporary entities, registration of normalized entities, creation of a correspondence matrix table (creation of a matrix table which shows a correspondence between entities and screens/forms), creation of a relationship (creation of a relationship matrix table which shows a relationship between entities), creation of an E-R diagram and the like, and a database management program 22. These programs are read out from an external recording medium 35 such as a CD-ROM, an FD or the like, and are stored (installed) in the auxiliary storage device 12. The correspondence matrix table corresponds to a first matrix table of the present invention, and the relationship matrix table corresponds to a second matrix table of the present invention.

The CPU 14 reads out the activating program 18 of the E-R model database design tool from the auxiliary storage device 12, and in accordance with the program, reads out the activating program 20 of various types of subsystems. Further, the CPU 14 carries out, in accordance with the activating program 20 of respective subsystems, the database normalization process (including setting of an entity type, as will be described later) in which data items are extracted from the screen/form to be processed to create a temporary entity, and the temporary entity is normalized to create a normalized entity. Further, the CPU 14 carries out the correspondence matrix table creation process, the relationship creation process (creation of the relationship matrix), the E-R diagram creation process and the like. Namely, the CPU 14 functions as input section, temporary entity creation section, normalized entity creation section, setting section, first table creation section, second table creation section and E-R diagram creation section.

The database 16 is structured to include data such as an identifier/attribute specification 26 which includes a correspondence between key definition data and data item in each normalized entity, a correspondence matrix table 28, a relationship matrix table 30, an E-R model diagram 32 and the like. Further, the database 16 stores results generated by carrying out various types of processes in the CPU 14. The correspondence matrix table 28, the relationship matrix table 30 and the E-R model diagram 32-are automatically generated in the present embodiment.

Also stored in the auxiliary storage device 12 are various types of edit programs 24 for editing the results of processes of normalization design including addition/deletion of the screen/form, integration/extraction of the E-R model diagram 32, the partial E-R diagram modeling and the like. These programs are also read from a recording medium such as a CD-ROM, an FD or the like to be stored (installed) in the auxiliary storage device 12.

The CPU 14 is structured to read out the activating program 18 of the E-R model database design tool, and in accordance with the program, to read respective edit programs 24. Further, in accordance with the read out edit program 24, the CPU 14 carries out addition/deletion process of the screen/form in which the correspondence matrix table 28 or the relationship matrix table 30 is modified (changed) on the basis of the addition/deletion of the screen/form so as to create the E-R diagram 32. Moreover, the CPU 14 carries out the integration process of the created E-R diagrams 32, the extraction process of the E-R diagram 32 which corresponds to an arbitrary screen/form, from the created E-R diagrams 32, the partial E-R diagram modeling process in which the E-R diagram 32 for creating a program specification is cut for each screen/form, and the like. That is to say, the CPU 14 functions as altering section of the present invention.

The database design system 10 includes an input/operating device 34 for a user to carry out various types of requests or settings on the CPU 14, such as a mouse, a keyboard or the like, a monitor 36 which displays the process results based on the operation of the input/operating device 34 to give a notice to a user, and a print-output device 38 for print-outputting the process results displayed on the monitor 36.

Displays of the monitor 36 and print-outputs of the print-output device 38 are controlled by the CPU 14. Thus, various notifications to the user can be implemented, particularly by display on the monitor 36. In other words, the monitor 36 functions as various notification sections of the present invention (a retrieval results notification section, an automatic classification notification section, a status notification section, and an inconsistency notification section). The CPU 14 acts as a display control section of the present invention and performs functions related to triggering notifications (serving as a master file creation section, a retrieval section, and a consistency decision section).

Specific examples of display items of the monitor 36 include processing results from the database design system 10, such as various types of screens (a form and data item display frame 50 to be described later and the like) used for the database normalization design process, the E-R diagram 32, the identifier/attribute specification 26 (an entity display frame 53 to be described later), the correspondence matrix table 28 (a correspondence matrix table screen 54 which will be described later), the relationship matrix table 30 (a relationship matrix table screen 64 which will be described later) and the like.

In the present embodiment, a user can carry out manual correction of processing results and manual addition/deletion of various types of data under a GUI (Graphical User Interface) environment by operation of the input/operating device 34. In other words, the input/operating device 34 corresponds to a manual correction section and a manual addition/deletion section of the present invention.

Further, the user can carry out various types of requests and settings under the GUI environment. Specifically, when a user designates to activate the E-R model database design tool by operating the input/operating device 34, the E-R model database design tool is activated by the CPU 14 in accordance with the activating program of the E-R model database design tool such that a main screen 40 is displayed on the monitor 36.

Figure 2:
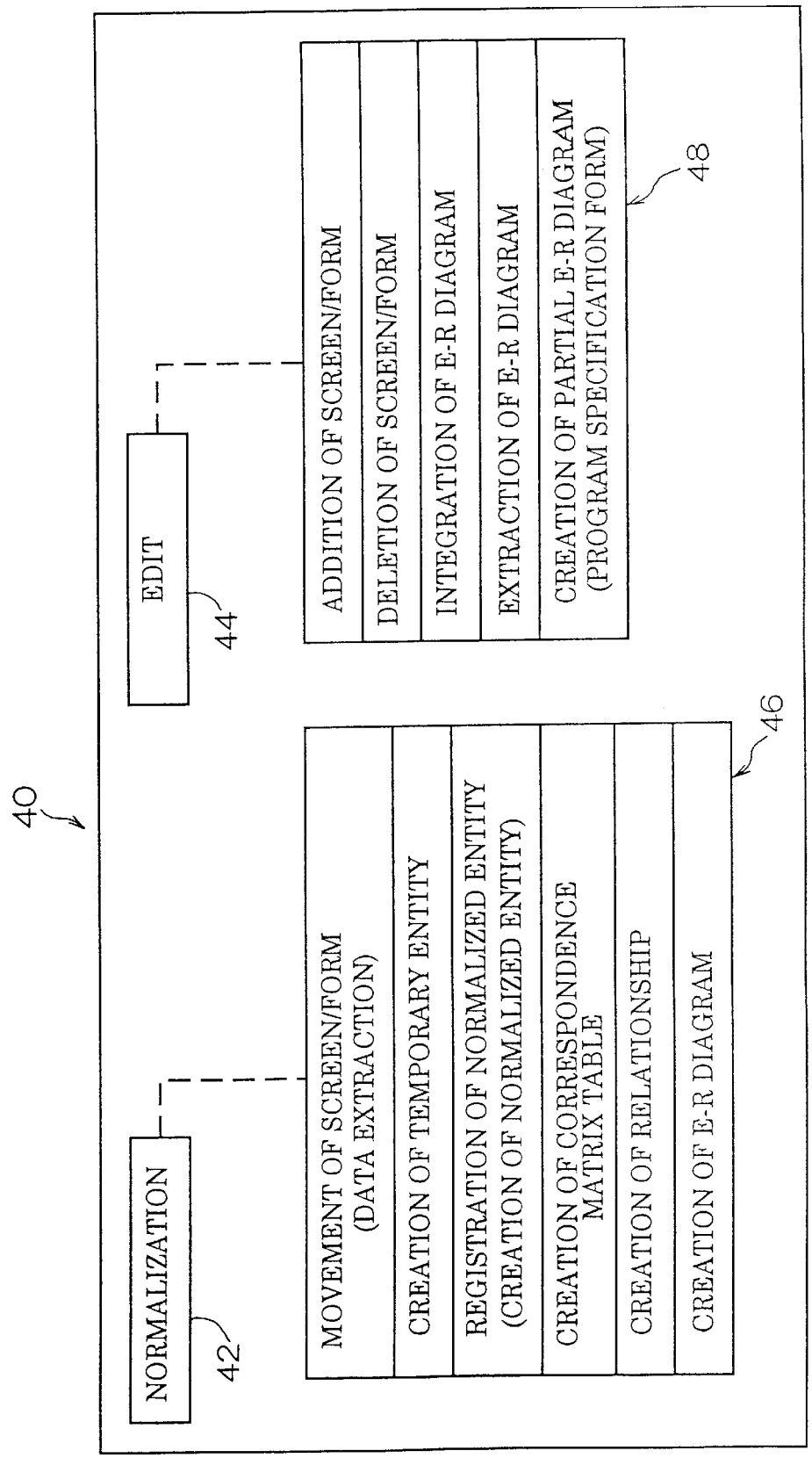
FIG. 2 is a diagram illustrating an example of a main screen displayed when an E-R diagram creation tool in the embodiment of the present invention starts operating.

FIG. 2 shows an example of the main screen 40. As shown in FIG. 2, the main screen 40 is provided with a "Normalization Design" menu button 42 and an "Edit" menu button 44.

The "Normalization Design" menu button 42 is formed in a pull-down menu form. If a user selects the "Normalization Design" menu button 42 from the screen 40 by operating the input/operating device 34, a pull-down menu 46 is displayed, in which pull-down menu 46 menus corresponding to various types of processes carried out in the normalization design of database are aligned in the order the menus are to be carried out. If a user selects a menu from the pull-down menu 46 by operating the input/operating device 34, an activating program of the subsystem corresponding to the selected menu is activated. Namely, a user sequentially selects respective menus and therefore is allowed to carry out various types of processes for the normalization design of database without being lost. Various types of processes will be described in detail later as an operation of the present embodiment (see "Normalization Design Processing" which will be described later).

An "Edit" menu button 44 is also formed in a pull-down menu form. If a user selects the "Edit" menu button 44 from the screen 40 by operating the input/operating device 34, a pull-down menu 48 which shows edit menus that the present system supports. When a user selects a menu from the pull-down menu 48 by operating the input/operating device 34, an edit program corresponding to the selected menu is activated. Namely, a user arbitrarily selects an edit menu among the menus and thus can carry out edit corresponding to the selected menu on respective process results of the normalization design. Edit processes will be described in detail later as an operation of the present embodiment (see "Edit Process" which will be described later).

Operation

An operation of the present embodiment will be described hereinafter.

If the E-R model database design tool is activated by a user (a designer), the E-R model database design tool is activated, and the main screen 40 is displayed on the monitor 36. A user can carry out the normalization design process by selecting the "Normalization Design" menu button 42 in the main screen 40 by operating the input/operating device 34. Further, a user can carries out various types of editing processes by selecting the "Edit" menu button 44 in the main screen 40. Hereinafter, detailed descriptions will be given of the normalization design process and the edit process, respectively.

Normalization Design Process

First, a description will be given of the normalization design process, i.e., creating of the E-R diagram. A description will be given of a case in which screens shown in FIGS. 52 to 67 are designated as screens which are subjected to the normalization design process and an E-R diagram 32 is to be created on the basis of these screens.

FIG. 52 is an example of a "Division" screen. FIG. 53 is an example of a "Person-in-Charge" screen. FIG. 54 is an example of a "Customer" screen. FIG. 55 is an example of a "Design Office" screen. FIG. 56 is an example of a "Orderer" screen. FIG. 57 is an example of a "Client" screen. FIG. 58 is an example of a "Published Articles" screen. FIG. 59 is an example of a "Case of Business" screen. FIG. 60 is an example of a "Business Activities" screen. FIG. 61 is an example of an "Estimation of Design" screen. FIG. 62 is an example of a "Man-Hour of Design" screen. FIG. 63 is an example of a "Man-Hour of Estimation" screen. FIG. 64 is an example of "Settlement" screen. FIG. 65 is an example of a "Bidding" screen. FIG. 66 is an example of an "Execution of Works" screen. FIG. 67 is an example of a "Working Office" screen.

Extraction of Data Item

Figure 3:
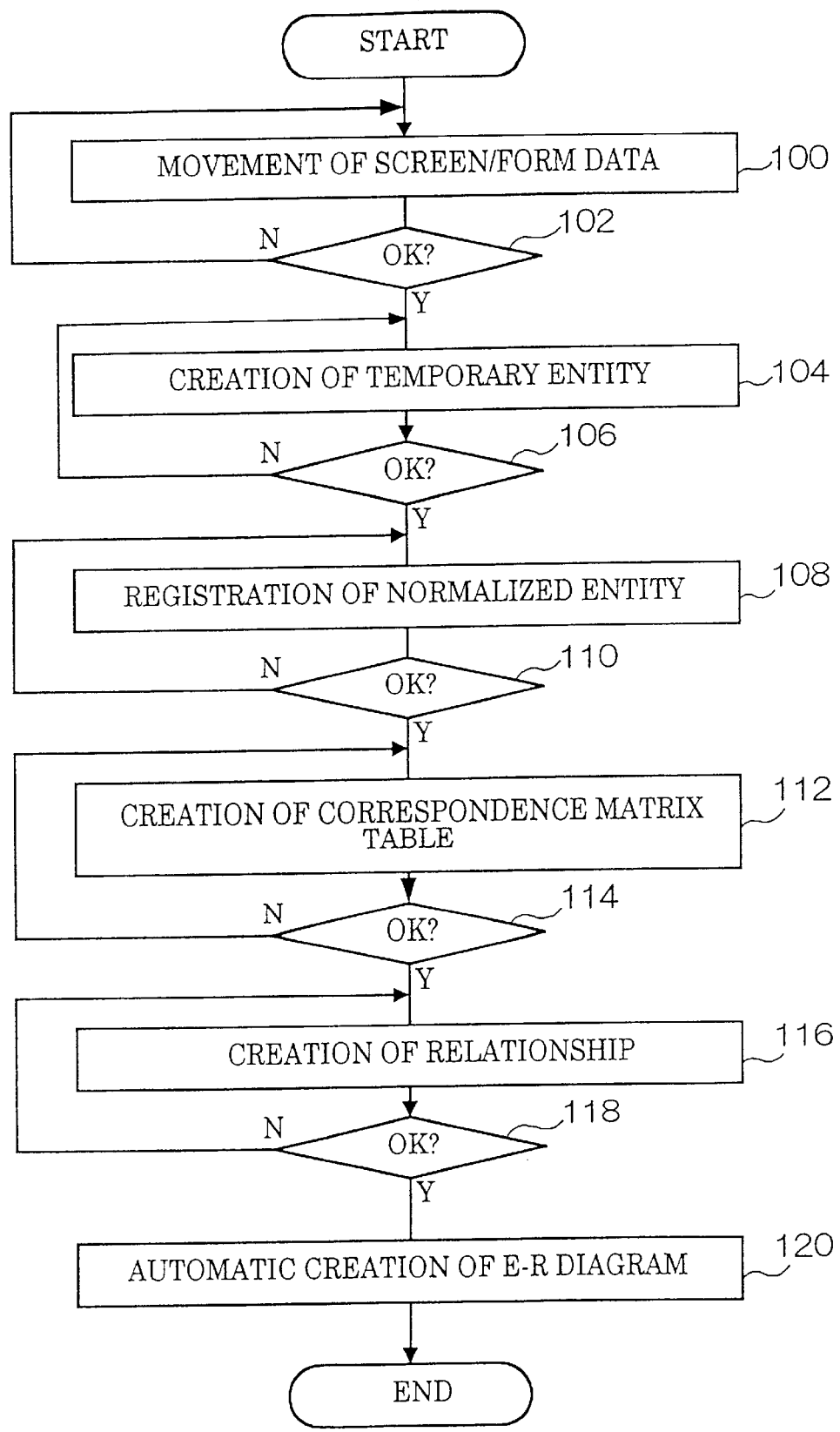
FIG. 3 is a flowchart illustrating the normalization design process in the embodiment of the present invention.

In the normalization design process, as shown in FIG. 3, firstly, the extracting process of data item is carried out, in which a data item (an item within screen/form) creating a screen/form is extracted from the screen/form to be processed (step 100). The data item extracting process starts when a user selects "Movement of Screen/Form" of the pull-down menu 46 (see FIG. 2) such that the CPU 14 activates the activating program of the data extraction subsystem.

In the data item extracting process, all screens/forms to be processed are moved (fetched) to an E-R diagram creation tool. Then, what types of data are included in respective screens/forms is analyzed, and data items within screen/form are extracted. Extracted results are displayed on the monitor 36 for each screen/form. Different numbers (referred to as "Form ID" hereinafter) are applied to respective screens/documents.

For example, in a case of the "Division" screen shown in FIG. 52, a "Division Code" and a "Name of Division" are extracted as the data item within screen. In a case of the "Person-in-Charge" screen shown in FIG. 53, an "Employee Code", an "Employee's Name" and the "Division Code" are extracted as the data item within screen.

In the present embodiment, for example, data within screen which is extracted within a form and data item display frame 50 for each screen shown in FIGS. 4A and 4B is displayed. A number of three digits "XXX" is applied to each screen as the form ID (The number of digit of the form ID is not limited to three and a number of any number of digit may be used).

FIG. 4A shows the form and data item display frame 50 of the "Division" screen. FIG. 48 shows the form and data item display frame 50 of the "Execution of Works" screen. The name of the screen is shown as a title at an upper portion of the form and data item display frame 50. The lower portion of the form and data item display frame 50 is divided in two areas and the data items within screen which are extracted from the corresponding screen are displayed. The form ID applied to the corresponding screen is displayed above the form and data item display frame 50. The left side area of the form and data item display frame 50 is blank, but as described later, among data displayed on the right side area thereof, key definition data is moved to the left side area. A user can easily grasp what types of data items within screen belong to the corresponding screen, from the form and data item display frame 50.

Specifically, from the form and data item display frame 50 of the "Division" screen shown in FIG. 4A, a user can recognize that the data items within screen such as the "Division Code" and the "Name of Division" belong to the "Division" screen. A "101" is applied to the "Division" screen as the form ID. A "Form 101" which shows the form and data item display frame of the "Division" screen is displayed above the form and data item display frame 50.

From the form and data item display frame 50 of the "Execution of Works" screen shown in FIG. 4B, a user can recognize that "Construction Number", "Name of Construction", "Working Office Code", "Term of Works", "Net Construction Cost", "Estimated Profit", "Construction Employee Code", "Telephone Number" and "Settlement Number" belong to the "Execution; of Works" screen as the data item within screen. A "115" is applied to the "Execution of Works" screen as the form ID. A "Form 115" which shows the form and data item display frame of the "Execution of Works" screen is displayed above the form and data item display frame 50.

Similarly, the data items within screen are extracted from respective screens and are displayed on the form and data item display 50 on a screen-by-screen basis.

Form 101: "Division"
  division code, name of division
Form 102: "Person-in-Charge's"
  employee code, employee's name, division code
Form 103: "Customer"
  customer code, customer's name
Form 104: "Design Office"
  design office code, name of design office
Form 105: "Orderer"
  orderer code, orderer's name, corporate image
Form 106: "Client"
  client code, client's name
Form 107: "Published Article"
  article consecutive number, date of publication, title of magazines, outline of article, case number
Form 108: "Case of Business"
  case number, title of case, date of entry, business employee code, customer code, degree of maturity of case, degree of possibility of receiving order, ordering time, estimated construction cost, site of construction, purpose, outline of construction, site area, area of building, published date, serial number
Form 109: "Business Activities"
  business employee cord, date, case number, working hours,
Form 110: "Estimation of Design"
  design number, design name, case number, date of entry, term of works, matters demanded, date of submission design employee code, accuracy of estimation, estimated cost, date of submission of estimation, estimate employee cord
Form 111: "Man-Hour of Design"
  design employee code, date, design number, working hours
Form 112: "Man-Hour of Estimation"
  estimate employee code, date, design number, working hours
Form 113: "Settlement"
  settlement number, name of construction, bidden price, estimated profit, payment conditions, date of settlement, bidding number, joint enterprise, code of person who settles accounts, design number, construction number
Form 114: "Bidding"
  bidding number, date of bidding, place of bidding, other bidder company, documents for submission
Form 115: "Execution of Works"
  construction number, name of construction, working office code, term of works, net construction cost, estimated profit, construction employee code, telephone number, settlement number
Form 116: "Working Office"
  working office code, working office address, telephone number The form and data item display frame 50 for each screen may be displayed on the monitor 36 one by one, or a plurality of form and data item display frames 50 may be displayed on the monitor 36 all at one time. It is essential that the data items within screen are displayed in one form and data item display frame 50 on a screen-by-screen basis.

The data items within screen/form extracted from screens/forms are displayed, and then, in the next step 102, a user is urged to make a confirmation. The user makes corrections if a necessary and then inputs a command showing OK by pressing an Enter key provided with a keyboard of the input/operating device 34. When the OK command is input, the routine proceeds to the temporary entity creation process in step 104.

Creation of Temporary Entity

As shown in FIG. 3, the temporary entity creation process is carried out by a user's selecting "temporary entity creation" of the pull-down menu 46.

In the temporary entity creation process, the temporary entity is created for each screen/form by classifying (sorting) extracted data items within screen/form into key definition data and its data item.

Specifically, among the data, data to which an xx number (NO, other than telephone number) or an xx code (CD) is applied is classified as the "Key Definition Data" and other data is classified as the "Data Item". The data other than the xx code (CD) or the xx number (NO) (for example, date or the like) may be used as the key definition data for an entity.

For example, in cases of the "Division Code" and the "Name of Division" extracted from the "Division" screen shown in FIG. 52, the "Division Code" is classified as the key definition data, and the "Name of Division" is classified as the data item. In the case of the "Person-in-Charge" screen shown in FIG. 53, the "Employee Code" and the "Division Code" are classified as the key definition data and the "Employee's Name" is classified as the data item.

Similarly, in respective screens, classifications are carried out as follows.

Form 101: "Division"
 key definition data: division code
 data item: name of division
Form 102: "Person-in-Charge"
 key definition data: employee code
 data item: employee's name
 key definition data: division code
Form 103: "Customer"
 key definition data: customer code
 data item: customer's name
Form 104: "Design Office"
 key definition data: design office code
 data item: name of design office
Form 105: "Orderer"
 key definition data: orderer code
 data item: orderer's name, corporate image
Form 106: "Client"
 key definition data: client code
 data item: client's name
Form 107: "Published Article"
 key definition data: article consecutive number
 data item: date of publication, title of magazines, outline of article
 key definition data: serial number
Form 108: "Case of Business"
 key definition data: case number
 data item: title of case, date of entry, degree of maturity of case, degree of possibility of receiving order, ordering time, estimated construction cost, site of construction, purpose, outline of construction, site area, area of building, date of publication
 key definition data: business employee SB, business employee cord
 key definition data: customer code
 key definition data: serial number
Form 109: "Business Activities"
 key definition data: date
 key definition data: none
 data item: working hours
 key definition data: business employee SB, business employee cord
 key definition data: serial number
Form 110: "Estimation of Design"
 key definition data: design number
 data item: design name, date of entry, term of works, matters demanded, accuracy of estimation, estimated cost, date of submission of estimation
 key definition data: design employee SB, design employee cord
 key definition data: case number employee cord
Form 111: "Man-Hour of Design"
 key definition data: date
 key definition data: none
 data item: working hours
 key definition data: design employee SB, design employee cord
 key definition data: design number
Form 112: "Man-Hour of Estimation"
 key definition data: date
 key definition data: none
 data item: working hours
 key definition data: estimate employee SB, estimate employee cord
 key definition data: design number
Form 113: "Settlement"
 key definition data; settlement number
 data item: bidden price, estimated profit, payment conditions, date of settlement, joint enterprise
 key definition data: bidding number
 key definition data: SB of person who settles accounts, code of person who settles accounts
 key definition data: design number
 key definition data: construction number
 data item: name of construction
Form 114: "Bidding"
 key definition data: bidding number
 data item: date of bidding, place of bidding, other bidder companies, documents for submission,
Form 115: "Execution of Works"
 key definition data: construction number
 data item: name of construction, term of works, net construction cost, estimated, profit
 key definition data: working office cord
 data item: telephone number
 key definition data: construction employee SB, construction employee cord
 key definition data: settlement number
Form 116: "Working Office"
 key definition data: working office cord
 data item: working office address, telephone number The classification of the key definition data and the data item is carried out using the data item display frame 50 for each screen, such that, among the data items within screen which are being displayed on the lower right area of the form and data item display frame 50, the key definition data is moved to the lower left area thereof.

For example, in the "Division" screen, the "Division Code" and the "Name of Division" present as the data item within screen as shown in FIG. 4A, and the "Division Code" presents as the data item within screen to which the xx code,or the xx number is applied. Thus the "Division Code" shown in the lower right area is automatically moved to the lower left area by the CPU 14. This movement may be carried out by a user's operating the input/operating device 34 (a user s clicking or dragging with a mouse).

Therefore, the data items within screen forming the screen are classified and displayed for each temporary entity which is formed by a key definition data and a data item in the form and data item display frame 50. As an example of the form and data item display frame 50, FIG. 5A shows the form and data item display frame 50 of the "Division" screen and FIG. 5B shows the form and data item display frame 50 of the "Execution of Works" screen.

The form of the form and data item display frame is not especially limited. Any form and data item display frame may be used so long as at the time of the above-described data item extracting process, extracted data items within screen can be displayed and at the temporary entity creation process, the key definition data and its data item can be classified and displayed for each temporary entity.

That is, a two-column form, in which the lower area of the form and data item display frame is divided into right and left areas, is not necessary. For example, as in the one-column form illustrated in FIGS. 6A and 6B, at the time of the data item extracting process, the extracted data items within screen are displayed in the lower area of a form and data item display frame 50A (see FIG. 6A). In the temporary entity creation process, the lower area of the form and data item display frame 50A is divided for each created temporary entity. In the divided area for each temporary entity, the key definition data of the corresponding temporary entity is displayed on the uppermost line and the data items corresponding to the key definition data are sequentially displayed (see FIG. 6B). FIGS. 6A and 6B show the form and data item display frame 50A of the "Execution of Works" screen.

The temporary entities can be formed by repeating the above-described process (classification of data items within screen) from the first screen to the last screen. At this time, from the processed screens, entities, whose entity type is resource in accordance with the relationship between the key definition data and the data item, (entities whose name cannot be verbalized as described later) are stored as a master file, and when the key definition data and the data item are classified in a screen, the master file may be referenced so that the process of assigning the data item to the appropriate key definition data can be carried out at a higher speed.

In this way, when the temporary entities are created, i.e., when the data items within screen are classified into the key definition data and the data item and types of respective temporary entities are designated, a user is urged to make a confirmation (step 106). A user makes corrections if necessary and then inputs an OK command by pressing the Enter key of the keyboard of the input/operating device 34. When the OK command is inputted, the routine proceeds to the next step 108 and the normalized entity registration process is carried out.

Registration of Normalized Entity

The normalized entity registration process is carried out by a user's selecting the "Normalized Entity Registration" of the pull-down menu 110.

In the normalized entity registration process, temporary entity data (entity name, entity type, key definition data item and data item) is sequentially registered, from the first screen/form, in an identifier/attribute specification 26 of a database 16 as entity data for normalized entities. In a subsequent screen/form, if temporary entities (referred to as overlapped entities) which have the key definition data which are the same as or are closely associated with the key definition data of the registered entity data, the CPU 14 automatically carries out the process in which these entities are integrated to an entity so as to avoid overlapping of entities. An entity type is assigned to each entity registered as the normalized entity.

At this time, the screens/forms (utilized screens/forms) to which normalized entities belong and the number of entities are also registered in the identifier/attribute specification 26 as entity data in order to form the correspondence matrix table 28 which will be described later (Namely, the database 16 functions as first storage section in the present invention).

Specifically, when the temporary entities are registered as the normalized entities, the form ID of the corresponding screen/form is registered as data of the screen/form in which the normalized entities are utilized. Then, if overlapped entities present in subsequent screens/forms, the form ID of the screen/form in which the overlapped entities present is added to and registered in the data of the utilized screen/form. The number (the utilization number) of form IDs registered as data of the utilized screen/form is counted and is registered (stored) as the number of screens/forms to which overlapped entities belong.

In order to create the detail correspondence matrix table 29 which will be described later, with respect to the key definition data item and the data item which form the registered normalized entities, the utilized screens/forms and the utilization number thereof are registered in the identifier/attribute specification 26 as entity data (That is to say, the database 16 functions as third storage section in the present invention).

Registered in the identifier/attribute specification 26 are, as entity data of each normalized entity, entity name, entity type, the form ID of the screen/form in which the entity is utilized and the utilization number thereof, the key definition data item and the data item which form the entity, the form ID and the utilization number of the screen/form in which the key definition item is utilized and the form ID and the utilization number of the screen/form in which the data item is utilized.

Specifically, in the form 101 screen, the "Division" code presents as the key definition data and the "Name of Division" presents as the data item, and the same key definition data also presents in the next form 102 screen. Thus, the data item is integrated with the registered entity which has already present to be a normalized entity and the "Division" is registered as the entity name. The 101 and the 102 (form IDs) are registered as the screen/form in which the "Division" entity is utilized, and the "2" is registered as the utilization number thereof. Further, as the key definition data and the data item forming the "Division" entity, the "Division Code" and the "Name of Division" are registered and the 101 and the 102 (form IDs) are registered as the screen/form in which the "division code" is utilized and the "2" is registered as the utilization number thereof. The 101 (form ID) is registered as the screen/form in which the "division name" is utilized and "1" is registered as the utilization number thereof.

Next, to the respective normalized entities, an entity type is selected and set from a list described below, respectively.

Resource, Resource Entity Role, Resource Header (HDR), Resource Detail (DTh), Resource VE, Resource Recursion, Event, Event Entity Role, Event HDR, Event DTL, Event VE, Event Recursion, Cross-Reference Table, Correspondence Table, Resource Subtype, Resource Entity Role Subtype, Resource HDR Subtype, Resource DTL Subtype, Resource VE Subtype, Resource Recursion Subtype, Event Subtype, Event Entity Role Subtype, Event HDR Subtype, Event DTT Subtype, Event VE Subtype, Event Recursion Subtype, Cross-Reference Table Subtype, Correspondence Table Subtype.

Further, regarding classification between resources and events, entities whose names can be verbalized are events, and entities whose names cannot be verbalized are resources. For example, concerning the "Bidding" entity, since the name can be verbalized as "Bid", it can be classified as an event. However, concerning the "Orderer" entity, since "Do Orderer" does not make sense, it can be classified as a resource.

Also, concerning classification between DTLs (Details) and HDRs (Headers), those which correspond to repetitive items which are within screens/forms are DTLs, and those other than DTLs are HDRs (see "Relationship Creation between HDRs and DTLs" which will be described later). Further, entities without key definition data are VEs (Virtual Entities), and entities formed by homogeneous data items (entities which take a so-called ring structure) are recursions. Further, entities which are included within other entities are referred to as subtypes and, for example, since the "Business Employee" entity is included in the "Employee" entity, it is considered to be a subtype.

When "Normalized Entity Registration" in the pull down menu 46 is selected, a pull down menu 52 (see FIG. 7) is further displayed and all selectable entity types are displayed in a listed form. Concrete work for setting an entity type is performed by a user selecting a desired type from this pull down menu 52 by a mouse and designating entity types of the respective normalized entities.

Figure 7:
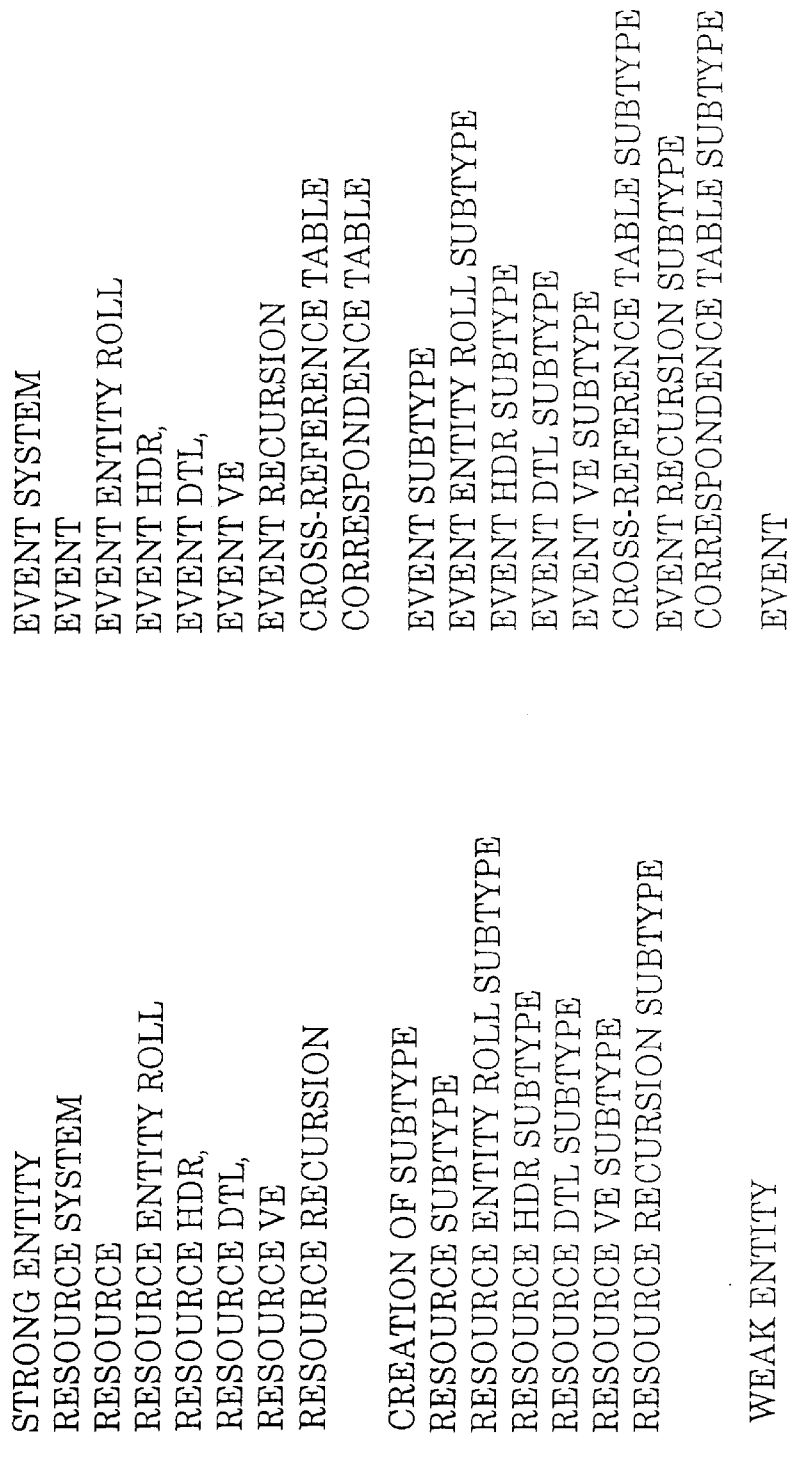
FIG. 7 is an example of a pull down menu for setting an entity type which is displayed when the temporary entity is created in the embodiment of the present invention.

Further, in the pull down menu 52, types are classified into strong entities and weak entities. The strong entities signify temporary entities in which key definition data exists and the weak entities signify temporary entities in which key definition data does not exist. Concerning the low entities, they are uniformly treated as events, as illustrated in FIG. 7.

As described above, when the first screen/form to the last screen/form are sequentially processed and the temporary entities are combined, the screens of the above described form 101 through form 116 are aggregated to 22 entities (normalized entities) described below. (Further, only classification of resources and events as entity types will be illustrated below.)

"Division": Resource
"Employee": Resource
"Customer": Resource
"Design office": Resource
"Orderer": Resource
"Client": Resource
"Article Sequence": Event
"Case": Event
"Business Employee": Resource
"Business Activities": Event
"Date": Resource
"Design": Event
"Design Employee": Resource
"Estimate Employee": Resource
"Man-Hour of Design": Event
"Man-Hour of Estimation": Event
"Settlement": Event
"Bidding": Event
"Settlement Employee": Resource
"Construction Employee": Resource
"Working Office": Resource
"Construction": Event When registration of the normalized entities has been completed as described above, the combined registered (normalized) entities are displayed on the monitor 36 and the user's confirmation is requested (step 110). Further, in the present embodiment, as an example, within the entity display frame 53 illustrated in FIG. 8, the registered (normalized) entities which were integrated as described above are respectively displayed with their key definition data and data items. In this entity display frame 53, a, title (an entity name) is displayed in the upper column, key definition data (identifiers) is displayed in the lower left columns, and data items (attributes) are displayed in the lower right column. Also, at the right side of an entity name, classification of the entity between a resource (R) and an event (E) is illustrated.

For example, from the entity display frame 53 of the "Division" entity, it is found that the "Division" entity is classified into a resource, the division code is key definition data, and the division name is a data item. Further, concerning the "Business Activities" entity, the "Man-Hour of Design" entity, and the "Man-Hour of Estimation" entity, since they are low entities in which key definition data does not exist therein, they are classified into events.

After performing modification, if it is required, a user inputs a command which indicates OK by pressing an Enter key provided on a keyboard of the input/operation apparatus 34 or the like. When the command which indicates OK is input, process movies to next step 112, creation process of the correspondence matrix table is performed.

Creation of Correspondence Matrix Table

The creation process of the correspondence matrix table is initiated by selecting "Creation of Correspondence Matrix Table" in the pull down menu 46 in FIG. 2.

In this correspondence matrix table creation process, in order to determine relationships between the respective entities which will be described later, the correspondence matrix table 28 which shows correspondence relationships between the respective screens/forms is automatically created by the CPU 14 on the basis of entity data of the respective normalized entities, which has been registered in the identifier/attribute specification 26, and the result is displayed on the monitor 36.

In FIG. 9, an example of the correspondence matrix table screen 54 which is displayed on the monitor 36 at this time is shown. As shown in FIG. 9, in the upper section of the correspondence matrix table screen 54 the created correspondence matrix table 28 is displayed, columns indicate screens/forms, and rows indicate a completion flag (in the uppermost row) and normalized entities (from the row below the uppermost row).

In the correspondence matrix table 28, on the basis of the data of the utilized screens/forms which has been registered in the entity data for the respective normalized entities, marks "○" are displayed in columns where rows of the respective normalized entities and columns of the screens/ forms to which the respective normalized entities belong intersect one another.

Thus, the user can confirm which normalized entities belong to the respective screens/forms. For example, the "Division" entity belongs to the ("Division" screen) of the form 101, and the "Article Sequence" entity and the "Case" entity belong to the screen ("Published Article" screen) of the form 107.

Also, the user can confirm to which screen/form the respective normalized entities belong. For example, the "Division" entity belongs to the screen of the form 101 and the screen of the form 102, the "Article Sequence" entity belongs to the screen of the form 106 and the screen of the form 115.

Further, the column of the completion flag in the correspondence matrix table 28 is provided for deletion processes of the screens/ forms which will be described later. The number of the normalized entities (the number of the marks "○") which form the respective screens/forms is counted, and a mark "1" is displayed in the row of the completion flag for the screens/forms to which only one normalized entity belongs.

Further, in a lower part of the correspondence matrix table screen 54, an "OK" button 56, a "Detailed Correspondence Matrix" button 58 for displaying detailed correspondence matrixes for each normalized entity, and a "Relationship Matrix" button 60 for displaying relationship matrix tables 30 which will be described later are provided. Further, since the relationship matrix table 30 herein has not been completed yet, the "Relationship Matrix" button 60 is unable to be pressed.

The user selects an arbitrary normalized entity by clicking a column of an entity name or the like, and presses the "Detailed Correspondence Matrix" button 58. Thereby, a detailed correspondence matrix table 29 of the normalized entity can be displayed on the monitor 36.

In FIG. 10, an example of the detailed correspondence matrix table screen 62 which is displayed at this time is illustrated. As illustrated in FIG. 10, the detailed correspondence matrix table 29, in which columns indicate screens/forms and the rows indicate data items which form the normalized entity (a key definition data item and data items which belong thereto), is displayed in an upper part of the detailed correspondence matrix table screen 62.

In the detailed correspondence matrix table 29, on the basis of the data for the utilized screens/forms of the data items (the key definition data item and the data items which belong thereto) which have been registered in the entity data of the normalized entity, marks "○" are displayed in columns where the rows of the screens/forms, to which the data item belongs, intersect the columns. Further, in FIG. 10, the detailed correspondence matrix table screen 62 for the "Division" entity is illustrated.

The user can confirm, from this detailed correspondence matrix table screen 62, in which screens/forms the data items forming the entity are used. For example, the "Division Code" data item (key definition item) which forms the "Division" entity is used for screens of the forms 101, 102, and the "Division Name" data item is used for a screen of the form 101.

The detailed correspondence matrix table 29 corresponds to the third matrix table of the present invention and the user can easily perform so-called data life cycle analysis by using data of the detailed correspondence matrix table 29.

The user confirms the correspondence matrix table 28, makes modifications if necessary, and when the contents of the correspondence matrix table 28 is OK, the "OK" button 56 is pressed. When the "OK" button 56 is pressed, the system decides that the user has confirmed that he/she is OK with this correspondence matrix table 28 (step 114), the routine proceeds to step 116, a relationship creation process is performed.

Creation of Relationships

The relationship creation process is started by selecting "Creation of Relationships" in the pull down menu 46 in FIG. 2.

In the relationship creation process, using the correspondence matrix table 28 as a reference, the relationship matrix table 30 which illustrates relationships between entities (hereinafter referred to as "relationships") at every screen/form is automatically created by the CPU 14. Also, at this time, the number of relationships created (hereinafter referred to as "relationship number") is counted for each category of entities. This counted relationship number is stored in the database 16 with the relationship matrix table 30 (i.e., the database 16 functions as a second storage section of the present invention).

Further, relationships are of course not created for the screens/forms formed by only one entity, i.e., the screens/forms for which a "1" is recorded in the row of the completion flag in the correspondence matrix table. Concretely, relationships are not created for screens of forms 101, 103, 104, 105, 106, 114, and 116, and relationships are created for the respective screens of forms 102, 107, 108, 109, 110, 111, 112, 113, and 115.

Specifically, a determination of whether the respective entities are upstream or downstream in accordance with the execution order of an event process and a resource order in a flow of an actual task is performed. Entities whose execution order is early are upstream, and those whose execution order is late are downstream. Next, in a case of creation of a relationship between resources, a cross-reference table is created, and, in a case of creation of a relationship between a resource and an event, a reference key of the resource is substituted for the event. If there is a relationship between an event and an event, in a case in which the relationship between upstream and downstream is 1:1 or 1:N, a reference key is substituted for the downstream entity, and, in a case in which the relationship between upstream and downstream is N:1 or N:N, a correspondence table is created. Further, all unnecessary relationships are deleted.

At this time, in order to reduce process time, entities which structure the respective screens/forms, in which repetitive items (so-called detailed portions) are included, are divided into HDR (Header) entities (HDR portion) and DTR (detail) entities (DTL portion) and the relationship creation process is performed. This relationship creation process will be explained in detail in "Relationship Creation between HIDR and DTL" later.

Figure 11:
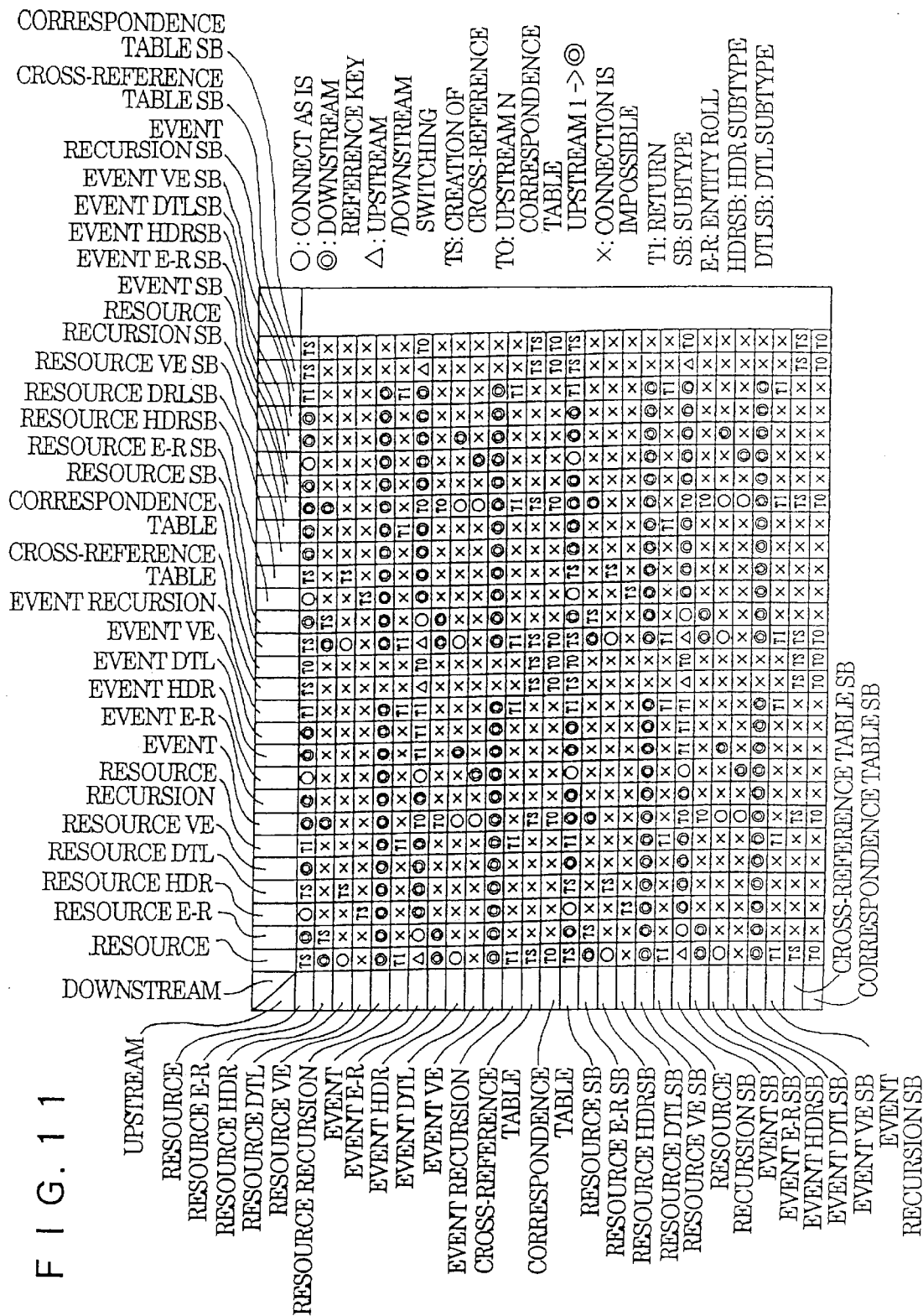
FIG. 11 is a diagram for explaining the table showing relations in an embodiment of the present invention.

More detailed relationships are disclosed in FIG. 2 in Japanese Patent Application Laid-Open No. 9-146805 and these relations are illustrated in FIG. 11 for reference. By storing the relations of relationships for each category of entities as a table, such as those illustrated in FIG. 11, in the CPU 14, the relations between entities can be prescribed easily and the process time can be reduced.

When the relationship matrix table 30 is created, pressing the "Relationship Matrix" button 60 in the correspondence matrix table screen 54 (see FIG. 9) become possible. The user selects an arbitrary screen/form by clicking a column of a form ID in the matrix table screen 54 or the like, and by pressing the "Relationship Matrix" button 60 the relationship matrix table screen 64 of the screen/form on the monitor 36 can be displayed. Thereby, the user can confirm created relationships (the relationship matrix table 30).

Figure 12:
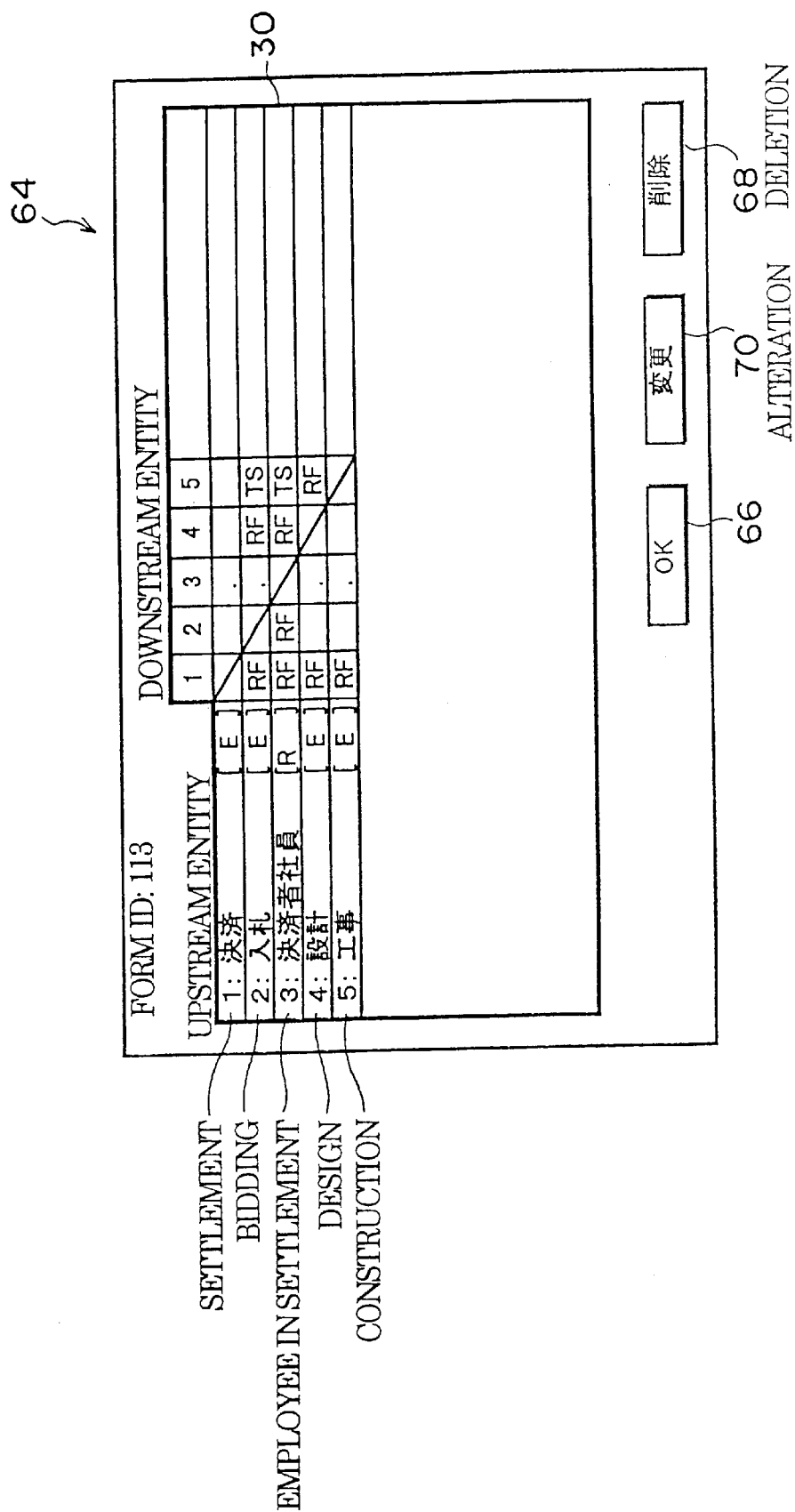
FIG. 12 is an example of a relationship matrix table screen in which the relationship matrix table is displayed, and it shows an example of a relationship matrix screen in which a form ID is 113 (a "Settlement" screen) in the embodiment of the present invention.

In FIG. 12, an example of the relationship matrix table screen 64 is shown. As illustrated in FIG. 12, in an upper section of the relationship matrix table screen 64, the created relationship matrix table 30 is displayed, and, columns indicate downstream entities and rows indicate upstream entities. Also, in a lower section of the relationship matrix table screen 64, an OK button 66, a deletion button 68, and an alteration button 70 (used in alteration processes of entity types which will be described later), are provided. FIG. 12 illustrates the relationship matrix table screen 64 of a screen of the form 113.

For example, among entities which structure the form 113, only "Settlement Employee" entity is a resource, while other respective entities such as "Settlement", "Bidding", "Design", and "Construction" are events, and "RFs" which indicate substitution of a reference key of the resource "Settlement Employee" for the respective entities of the events ("Settlement", "Bidding", "Design", and "Construction") are displayed. Also, since the entities of the events are of a 1:1 correspondence respectively, at the side of downstream entities (an upper right section of the matrix which is made by dividing the matrix by a diagonal line which connects an upper left and a lower left of the matrix), "RPs" which indicate substitution of respective reference keys are displayed.

The user displays the relationship matrix table screen 64 of all screens on the monitor 36 and confirms the relationship matrix table 30. When there are relationships which are unnecessary, the user deletes the relationships (by selecting the column of the relationship which was determined to be unnecessary and pressing the deletion button 68). When everything is "OK", the user presses the "OK" button 66. When the "OK" button 66 is pressed, the system decides that the user is OK with this relationship matrix table 30 (step 118), and the routine proceeds to step 120, and the creation process of an E-R diagram is performed. When relationships have been deleted, the number of relationships corresponding to the deleted relationships is subtracted and an updated number of relationships is stored.

Creation of an E-R Diagram

The E-R diagram creation process is initiated by selecting "Creation of E-R diagram" in the pull-down menu 46 in FIG. 2.

In the E-R diagram creation process, the final E-R diagram 32 is automatically created by the CPU 14 by respectively drawing each of the registered normalized entities, and then, on the basis of the relationship matrix table 30, determining how the drawn normalized entities are connected to each other, determining which normalized entities are to be substituted with reference keys, and creating cross-references and correspondence tables.

Figure 13:
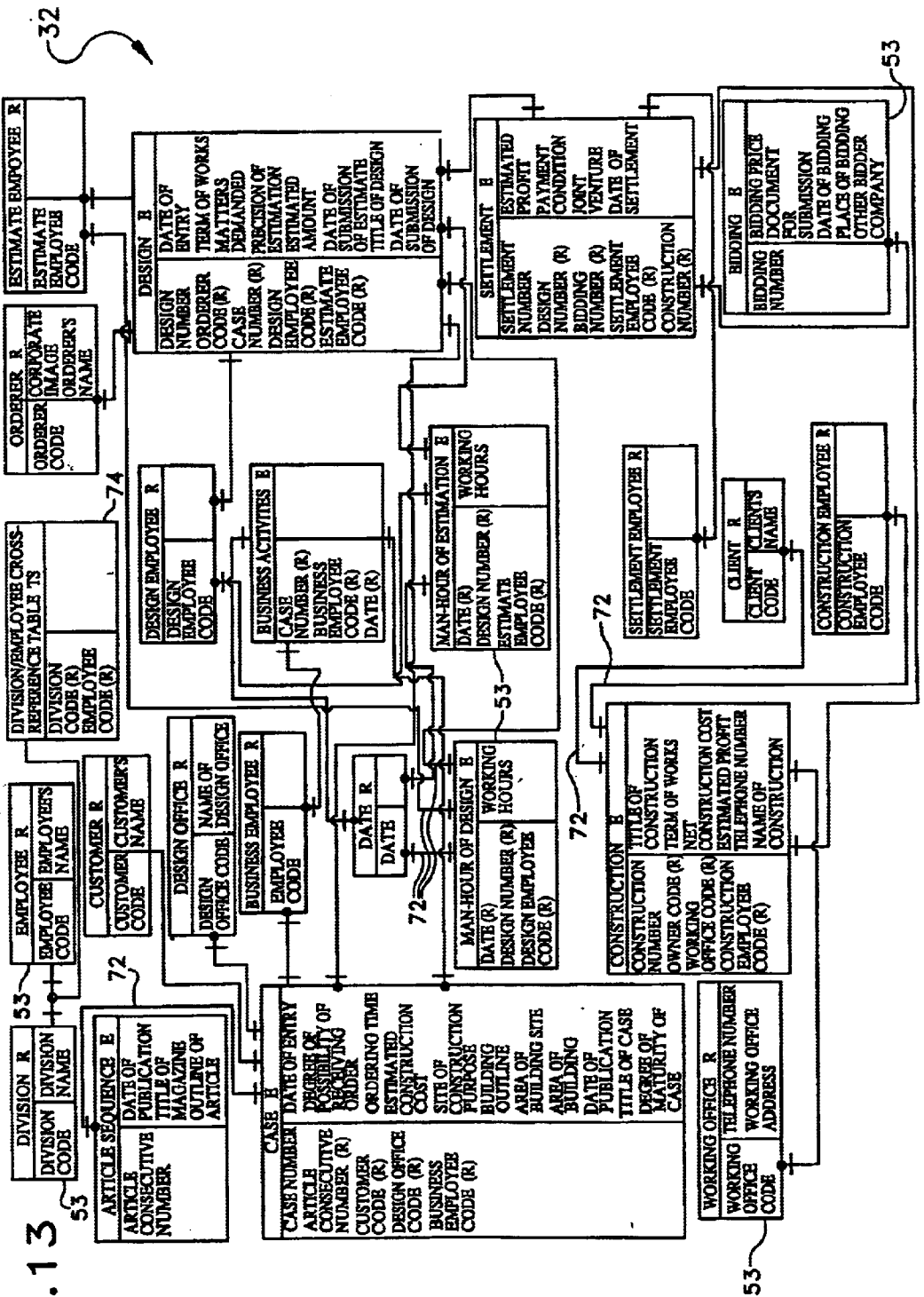
FIG. 13 is an example of an E-R diagram designed with the database design system in the embodiment of the present invention.

The thus created E-R diagram 32 is shown in FIG. 13. In the E-R diagram 32, as shown in FIG. 13, entity display frames 53 are respectively provided as the registered normalized entities. Entities (the entity display frames 53) that have relationships with each other are connected with connecting lines 72. In FIG. 13, upstream/downstream relationships between entities are. distinguished by providing a dot at an upstream end of the corresponding connecting line 72.

As previously mentioned, since a cross-reference is created for the relationship between "Division" entity and "Employee" entity, each of which is a resource, a cross-reference 74 is created, as shown in FIG. 13. Further, the business employee code and the design employee code, which are upstream reference keys, and respectively assigned to the "Business Activities" entity and the "Man-Hour of Design" entity, each of which is an event, because these entities have a 1 to N upstream to downstream relationship with the "Business Employee" entity and the "Design Employee" entity (each of which is a resource).

With the arrangement described above, automatic creation of the E-R diagram can easily and assuredly be achieved in the present embodiment.

When carrying out the processes shown in FIG. 3, the present embodiment requires the user to confirm that each of the processes has been completed. However, this confirmation process may be omitted, except for a part of relationship creation, because the CPU 14 automatically carries out processing after the normalized entity generation process has been carried out.

A temporary entity for which no key definition data has been defined (a weak temporary entity having no key definition data) may be retrieved using a master file during or after carrying out of the temporary entity creation process.

In a case, for example; in which data items within the "Sum of Order Received" screen in FIG. 14 have been extracted from the screen, the extracted data items within the screen have been classified as shown in FIG. 15, and data about the temporary entities shown in FIG. 16 has already been registered in the master file, a temporary entity, in which data such as key definition data: none and data items; standard, unit price of order received, unit, and name of goods has been classified, will be retrieved (see FIG. 15).

On the other hand, the "Goods" temporary entity, in which data such as key definition data: goods code and data items: standard, unit price of order received, unit, and name of goods has been classified, has already been registered as shown in FIG. 16.

For the temporary entity which has been retrieved as a weak entity, the CPU 14 determines that such a temporary entity was originally a strong entity into which the "goods code" key definition data was mistakenly not input. The CPU 14 gives the user a notice of this by sounding an alarm, by displaying the column within the form and data item display frame 50 that corresponds to the temporary entity in reverse, or the like. In response to this, the user inputs "goods code" into the key definition data column of the retrieved temporary entity (the left area of the retrieved weak entity). In this manner, the temporary entities can be precisely integrated and normalized without any duplication in the normalized entity creation process that follows.

Further, when a weak entity is retrieved, in place of user input, the CPU 14 may automatically input appropriate key definition data, referring to the master file in which the existing normalized entities were previously registered by the CPU 14, and thus create the temporary entity. In this case, status data of the temporary entity creation that used the master file may be saved, and the user may be notified. For example, after temporary entity creation processing, when results of that processing are displayed, the column of the temporary entity created using the master file may be displayed in reverse, surrounded by a thick border, or the like (see FIG. 15B). When the user receives this notification, the user can check whether or not the creation of the temporary entity using the master file was appropriate. If the creation was not appropriate, the user can carry out corrections. Thus, the accuracy of subsequent processing can be improved.

Further, in a case in which the user manually corrects contents of the form and data item display frame 50 the correction status may be stored and notified to the user. For example, in the present embodiment, the user can operate the input/operation device 34 (by clicking and dragging with a mouse). In this way, the user can change the position of a key definition data or a data item in the form and display frame 50, and thereby correct a temporary entity or normalized entity. If, at this time, an arrow from the original position to the corrected position of the key definition data or data item is displayed (see FIG. 15B), the user can visually confirm the details of the correction.

Creation of Inter-HDR and Inter-DTL Relationships

In the present embodiment, when the relationships are created, the entities constituting each of the screens/forms are classified into HDR parts and DTL parts before processing takes place. The processing is described in detail hereinafter.

The following description is given for a case where the "Sum of Account" screen shown in FIG. 14 is processed. Relationships will be created in accordance with results of the data items extraction process, the temporary entity creation process, and the normalized entity registration process, after these processes have taken place.

FIG. 17 shows the form and data item display frame 50 of the "Sum of Account" screen after the same has been subjected to the normalized entity registration process. In FIG. 17, the form and data item display frame 50 is framed by a double line, which shows that the data displayed in the form and data item display frame 50 is data which has experienced normalization processing. That is, the data has been classified in accordance with the normalized entities.

As shown in FIG. 14, the "Sum of Account" screen contains repetitive items (order received specification number; goods code; name of goods; standard; unit; number of pieces in a package; number of cases; quantity of order received; unit price of order received; price of order received; and notes). The normalized entities can be classified into the DTL (detail) entity which corresponds to the repetitive items and the HDR (header) entity which corresponds to other items. That is, in FIG. 17, each entity having a key definition that is: item of order received number; warehouse code; person-in-charge code; customer code; or delivery destination code, is classified into the HDR entity (HDR part), whereas each entity having a key definition that is: item of order received specification number or goods code is classified into the DTL entity (DTL part).

In the present embodiment, after the classification into the HDR part and the DTL part has taken place, relationships are respectively created within the HDR part (entities 1 to 5) and within the DTL part (entities 6 and 7) as shown in FIG. 18. Also, a relationship linking the HDR part and the DTL part is established. This relationship linking the HDR part and the DTL part is displayed at the column which corresponds to the HDR entity which is furthest upstream and to the DTL entity which is furthest upstream.

FIG. 19 shows an example for the sum of account screen where the relationships are created without consideration of the HDR part and the DTL part. When FIGS. 18 and 19 are compared, it can be seen that the creation of the relationships between each entity of the HDR part and each entity of the DTL part (the areas of FIG. 18 filled with slant lines) can be omitted because of the procedure of classification into the HDR part and the DTL part that was performed before the processing.

In this manner, by creating relationships with due regard to the HDR part and the DTL part, the relationships creation process can be shortened by almost half, which leads to reduced processing time.

The classification into the HDR part and the DTL part takes place during the extraction of the data items. Thus, when the temporary entity creation process is carried out, the process only needs to classify key definition data and data items thereof within the screen/form data items of the HDR part and to classify key definition data and data items thereof within the screen/form data items of the DTL part. As a result, processing can be simplified.

It is desirable to display the extracted screen/form data items on the form and data item display frame 50 so that the user can distinguish between the HDR part and the DTL part of the data items within the screen/form when the user extracts the data items. With this arrangement, it becomes easy for the user to classify the data items within the screen/form into key definition data and data items thereof.

For example, as shown in FIG. 30A, the lower area of the form and data item display frame 50, where the extracted data items within the screen/form are displayed, is divided into two sections, an upper section and a lower section. By displaying the HDR part of the data items within the screen/form in the upper section, and displaying the DTL part of the data items within the screen/form in the lower section, the user can readily distinguish the HDR part and the DTL part of the data items within the screen/form. Thus, the user can carry out the operation of classification of the data items within the screen/form into the key definition data and the data items thereof with additional ease.

Alteration of Entity Type

In a case in which the entity type of a normalized entity is wrong due to, for example, mistaken setting of the entity type by the user during the temporary entity creation process described above, it is necessary to change the wrong entity type to a right entity type. In the present embodiment, alteration of the entity type can be carried out during the relationship creation process.

A more detailed description of the alteration of the entity type is given hereinafter. In the relationship creation process, a correspondence matrix table screen 54 is displayed on the monitor 36. The user selects the row of a normalized entity that has the wrong entity type from the correspondence matrix table 28 on the correspondence matrix table screen 54 by operating the input/operation device 34. Then, the user pushes the "Relationship matrix" button 60 and a relationship matrix table screen 64 which relates to that normalized entity is displayed.

A case where the entity type of the "Settlement" entity is mistakenly set to be "resource (R)" (see FIG. 20) instead of the right entity type, "event (E)", is described hereinafter.

Figure 20:
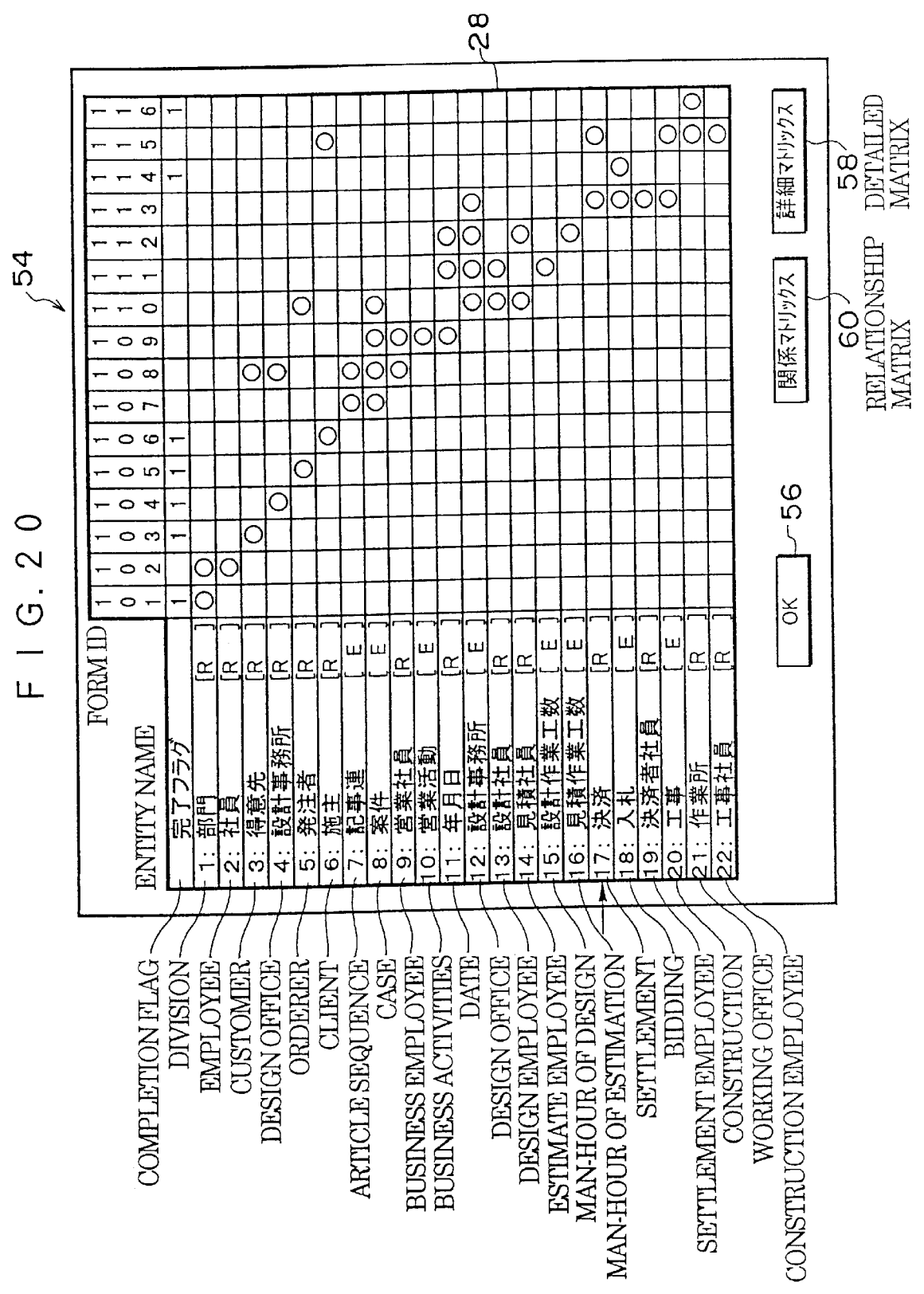

When the user determines that the entity type of the "Settlement" entity has been mistakenly set, the user selects the "Settlement" entity row in the correspondence matrix table 28 on the correspondence matrix table screen 54 and pushes the "Relationship matrix" button 60. The "Settlement" entity belongs to the form 113 and form 115 screens, as shown in FIG. 20. In response to this, the CPU 14 displays the correspondence matrix table screens 64 of the form 113 and form 115 screens (see FIGS. 21A and 21B) on the monitor 36.

At this time, the correspondence matrix table screen 64 is displayed with the "Settlement" entity row selected (displayed in reverse), which indicates that normalized entity alteration processing is to be performed on the "Settlement" entity.

The user pushes the alteration button 70 while the "Settlement" entity row is selected on the relationship matrix table screen 64 of the form 113 screen or on the relationship matrix table screen 64 of the form 115 screen by operating the input/operation device 34. In response to this, the CPU 14 alters the entity type of the "Settlement" normalized entity from "resource" to "event" and, at the same time, re-creates the relationships on the form 113 and form 115 screens. The CPU 14 displays the relationship. matrix table 30 on the relationship matrix table screen 64 with the results of the alteration being reflected therein.

FIGS. 79A and 22B show the relationship matrix table screen 64 of the form 113 and form 115 screens when the entity type has been altered (corrected). The fact that relationships with the "Settlement" normalized entity have been altered as a result of the alteration of the entity type of the "Settlement" normalized entity can be seen from FIGS. 22A and 22B.

The above procedure alters the entity type after displaying the relationship matrix table screen 64 such that the user can confirm relationship alterations resulting from the alteration of the entity type. However, the entity type may be directly altered on the correspondence matrix table screen 54. Further, the entity type may also be altered in a manner wherein the user pushes the alteration button 70 to have the pull-down menu 52 (see FIG. 7) displayed on the monitor 36, and selects the right entity type with a mouse or the like from the pull-down menu 52.

Editing Processes

Next, a variety of editing processes will be described, which are carried out as required following the above-described normalization design process, that is, after the E-R diagram 32 has been created.

Addition of a Screen/Form

Figure 23:
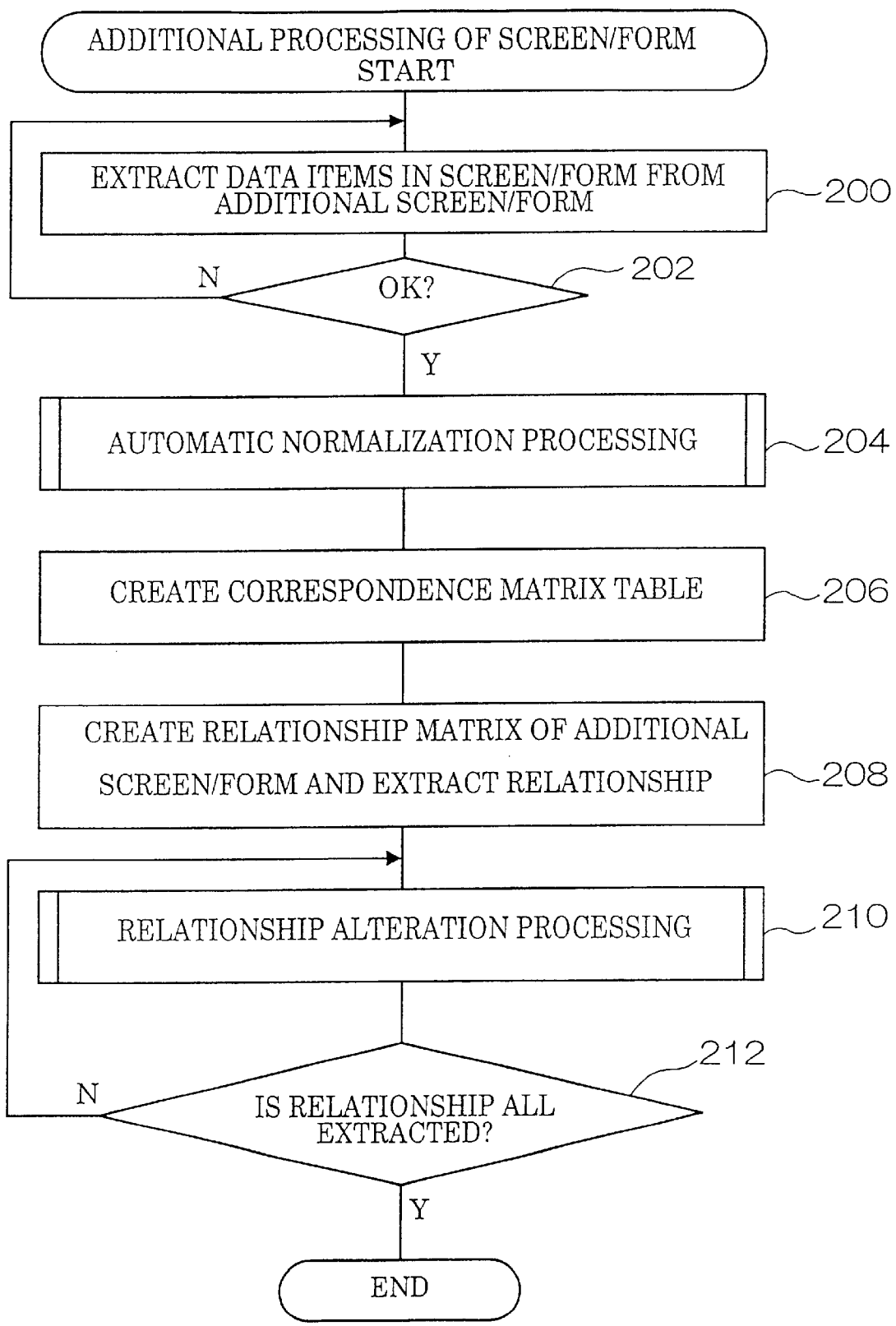
FIG. 23 is a flow chart illustrating the screen/form addition process in the embodiment of the present invention.

In a case in which an additional screen/form is required after creation of the E-R diagram, a screen/form addition process is carried out as shown in FIG. 23. The screen/form addition process is initiated by the user selecting the "Edit" menu button 44 in the main screen 40 shown in FIG. 2 and then selecting "Addition of a screen/form" from the pull-down menu 48.

Figure 26:
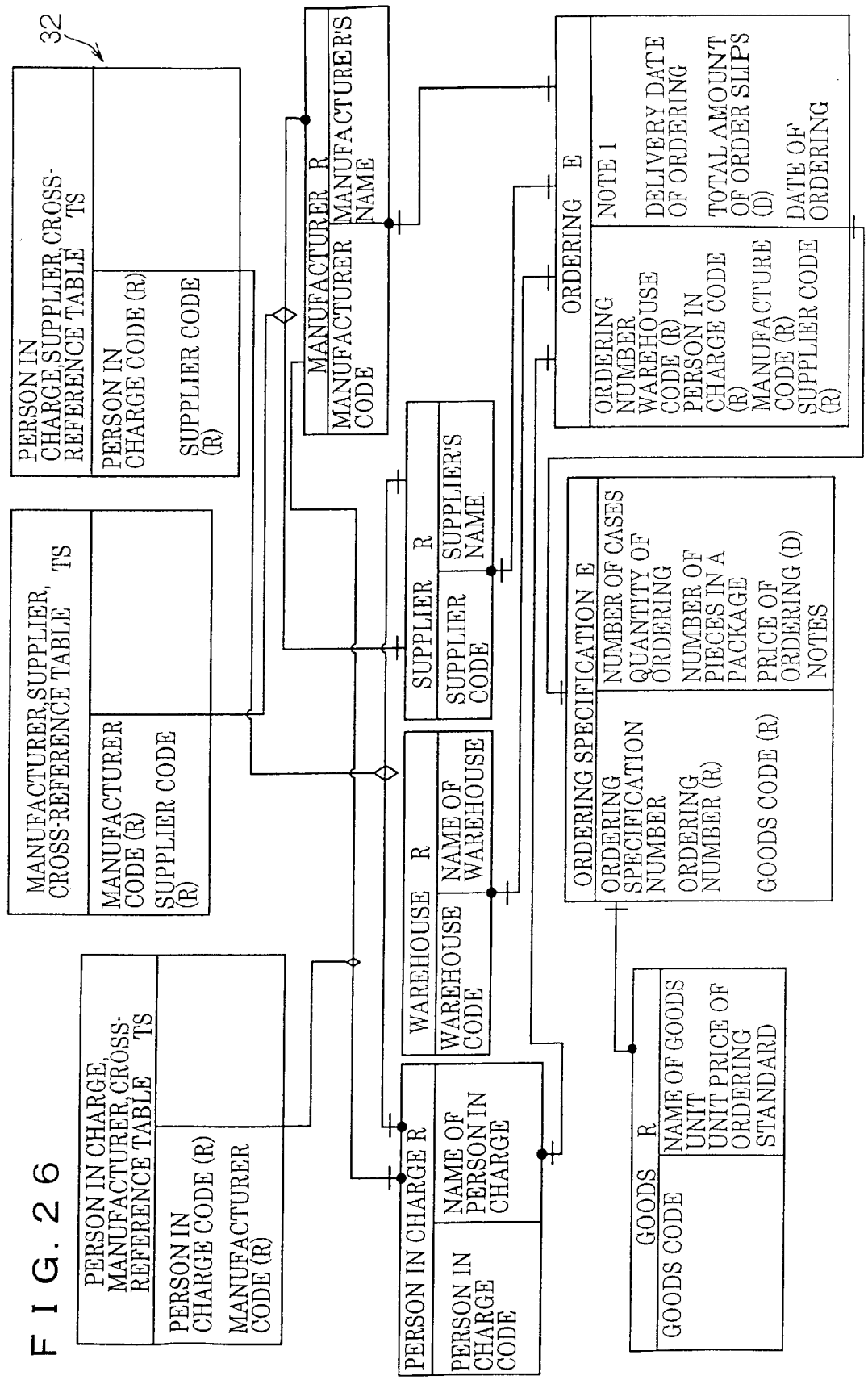
FIG. 26 is an E-R diagram created by the normalization processing design being carried out with the "Sum of Ordering" screen being used as the screen which is the object of processing.

The following is a description of a case in which, for example, the "Sum of Ordering" screen shown in FIG. 25 is specified as the screen to be processed and, after the E-R diagram 32 (see FIG. 26) has been created by carrying out of each of the above-described normalization design processes, the "Sum of Order Received" screen shown in FIG. 14 is specified as the additional screen.

The following entities have already been registered (stored) in the identifier/attribute specification 26 (see FIG. 27) as normalized entities by the previous normalization design process (respective processes of the normalization design process preformed for the "Sum of Ordering" screen).

"Order" Entity
  Key definition data: order number; data items: note 1, delivery date of order, total amount of order slips, and order date.
"Warehouse" Entity
  Key definition data: warehouse code; data item: name of warehouse.
"Person-in-Charge" Entity
  Key definition data: person-in-charge code; data item: name of person-in-charge.
"Maker" Entity
  Key definition data: maker code; data item: name of maker.
"Supplier" Entity
  Key definition data: supplier code; data item: name of supplier.
"Order Specification" Entity
  Key definition data: order specification number; data items: number of cases, quantity of ordering, number of pieces in a package, price of ordering, and notes.
"Goods" Entity
  Key definition data: goods code; data items: name of goods, unit, unit price of ordering, and standard.

The correspondence matrix table 28 shown in FIG. 28 and the relationship matrix table 30 shown in FIG. 29 are also created by the previous normalization design process. FIGS. 25 through 29 illustrate examples of a case in which "117" is assigned as a form ID of the "Sum of Ordering" screen.

In the screen/form addition process, as shown in FIG. 23, first, screens/forms which are specified by the user to be newly added as processing objects (hereinafter referred to as "additional screen(s)/form(s)") are moved (taken) into the E-R diagram creation tool, where form IDs are assigned to the additional screens/forms, the additional screens/forms are analyzed to determine what type of data is contained in each of the additional screens/forms, and data items in the screens/forms are extracted (step 200). An exemplary case in which "118" is assigned as a form ID of the "Sum of Order Received" screen is explained below.

As the "Sum of Order Received" screen (additional screen) is analyzed, delivery date of order received, date of order received, order received NO, warehouse CD, name of warehouse, person in charge CD, name of person in charge, total amount of order slips received, customer CD, customer's name, delivery destination CD, delivery destination name, note 1 (above listed are HDR portion), number of cases, standard, price of order received, unit price of order received, order received specification NO, goods CD, quantity of order received, unit, number of pieces in a package, notes, and name of goods (above listed are DTL portion) are extracted as data items in the screen. As shown in FIG. 30A, the result of this extraction is displayed in the form and data item display frame 50 with the 14DR portion and the DTL portion being separated.

In subsequent step 202, the user is prompted to determine whether this is acceptable or not. The user makes modifications if necessary, and then inputs a command indicating "OK" by pressing the Enter key provided at the keyboard of the input/operation device 34. When the command indicating "OK" is input, the process proceeds to step 204.

Figure 24B:
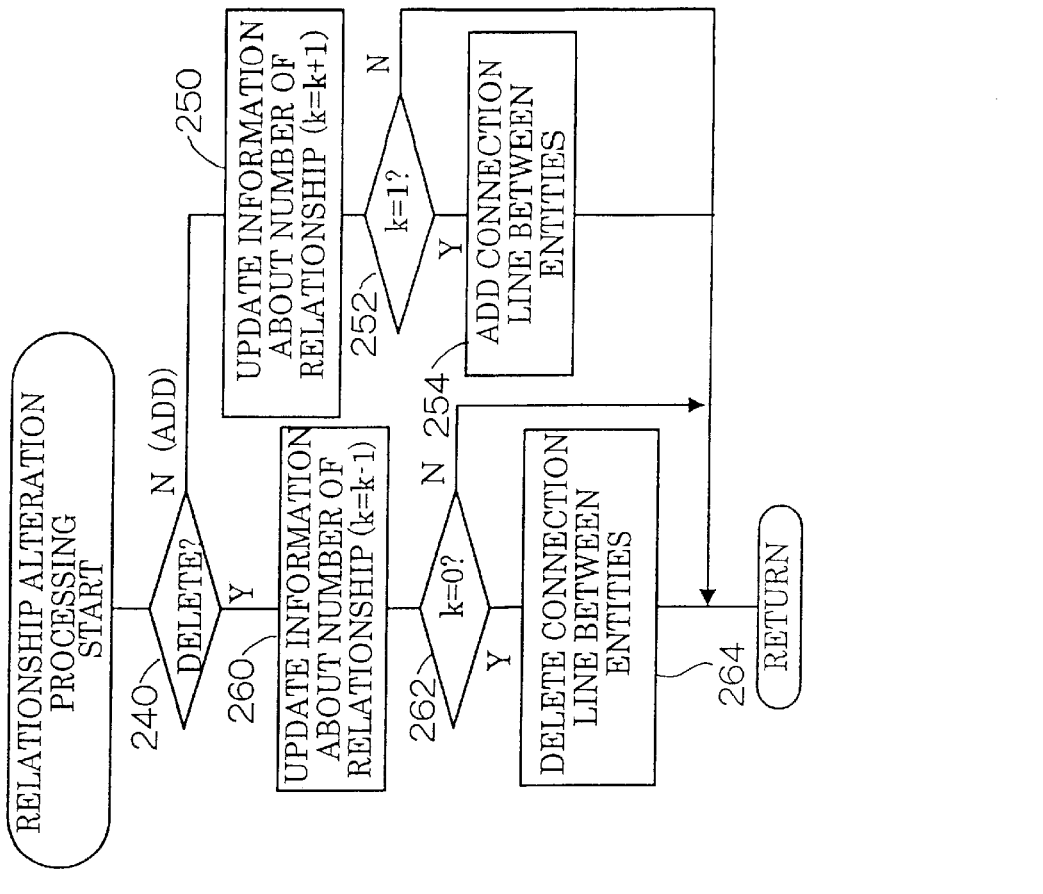
FIG. 24A is a flow chart illustrating an automatic normalization process and FIG. 24B is a flow chart illustrating a relationship altering process in the embodiment of the present invention.
Figure 24A:
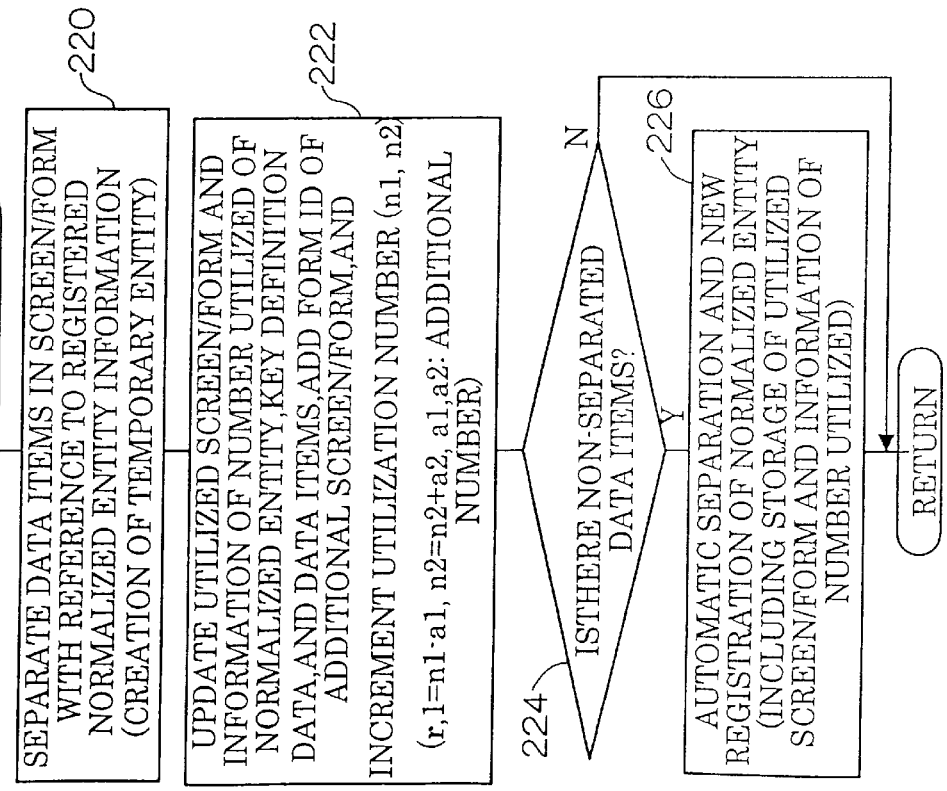

In step 204, the automatic normalization process shown in FIG. 24A is performed. In the automatic normalization process, first, a temporary entity is created by referring to the registered normalized entity and automatically classifying the data items in the screen/form extracted from the additional screens/forms into the key definition data and the data items thereof (step 220). Specifically, this automatic classification is carried out as follows (see FIG. 30B):
  with reference to "Warehouse" entity,
  key definition data: warehouse CD; data item: name of warehouse;
  with reference to "Person-in-Charge" entity,
  key definition data: person in charge CD; data item: name of person in charge;
  with reference to "Goods" entity,
  key definition data: goods CD; data item: standard, unit price of order received, unit, name of goods.

Next, as entity data for each of the above listed normalized entities, data of normalized entities, key definition data, and utilized screen/form and utilization number for data items registered in the identifier attribute specification 26 are updated (step 222). More particularly, the form ID of the "Sum of Order Received" screen (additional screen) is added to the data of the utilized screen/form, and the utilization number is incremented and stored. Specifically, when a current utilization number for a normalized entity is n1, and the normalized entity is contained in a1 screens/forms of the screens/forms to be added at that time, n1=n1+a1 is stored as a new utilization number. When a current utilization number for key definition data or a data item is n2 and the key definition data or the data item is contained in a2 screens/forms, n2=n2+a2 is stored as a new utilization number.

For example, in a case of the "Warehouse" entity, although "117" (the form ID of the "Sum of Ordering" screen) has been already registered as the utilized screen/form for the entity, "118" (the form ID of the "Sum of Order Received" screen) is newly added at this time. Since "1" is stored as the current utilization number for the entity (i.e. n1=1) and the "Warehouse" entity also belongs to the "Sum of Ordering" screen to be added this time (i.e. a1=1), "2" is stored as a new utilization number for the "Warehouse" entity.

Similarly, for the "Warehouse CD" key definition data and the "Name of Warehouse" data item belonging to the "Warehouse" entity, "118" (the form ID of the "Sum of Order Received" screen) is newly added as the utilized screen/form. Since "1" is stored as the current utilization number for the "Warehouse CD" key definition data (i.e. n2=1) and the "Warehouse CD" key definition data also belongs to the "Sum of Ordering" screen to be added this time (i.e. a2=1), "2" is stored as a new utilization number for the "Warehouse CD" key definition data. Similarly, a new utilization number is stored for the "Name of Warehouse" data item.

Of course, data items which have not been registered in the entity data are additionally registered at this time. For example, "Unit Price of Order Received" is additionally registered as a data item belonging to the "Goods" entity, "118" is registered as a utilized screen/form for this "Unit Price of Order Received" data item, and "1" is stored as a utilization number (n2) thereof.

While, if there is no corresponding registered normalized entity and there is a data item or data items in the screen/form which have not been classified in step 220 (the determination in step 224 is affirmative), they are determined to be newly added data items in the screen/form by the addition of the screen/form and the process proceeds to step 226.

In step 226, these data items in the screen/form are automatically classified by the CPU 14 into key definition data and data items (creation of a temporary entity) and normalization is carried out. Similar to the above described temporary entity creation processing, classification may be carried out by the user specifying key definition data among data items in screens/forms.

Specifically, data items in each screen such as order received NO, note 1, delivery date of order received, date of order received, total amount of order slips received, customer CD, customer's name, delivery destination CD, delivery destination name, order received specification NO, number of cases, price of order received, quantity of order received, number of pieces in a package and notes are determined to be newly added data items in the screen by the addition of the screen/form. Those having CD or NO in their name are classified as key definition data, and the others are classified as data items, as shown below, to create temporary entities automatically (see FIG. 30B).

key definition data: order received NO; data item: note 1, delivery date of order received, date of order received, total amount of order slips received;

key definition data: customer CD; data item: customer's name;

key definition data: delivery destination CD; data item: delivery destination name;

key definition data: order received specification NO; data item: number of cases, price of order received, quantity of order received, number of pieces in a package, notes.

These temporary entities are registered as normalized entities in the identifier attribute specification 26. Namely, the following entities are added as new normalized entities:

"Order Received" entity key definition data: order received NO; data item: note 1, delivery date of order received, date of order received, total amount of order slips received;

"Customer" entity key definition data: customer CD; data item: customer's name;

"Delivery Destination" entity key definition data: delivery destination CD; data item: delivery destination name; and "Order Received Specification" entity key definition data: order received specification NO; data item: number of cases, price of order received, quantity of order received, number of pieces in a package, notes.

At this time, for each of the normalized entities ("Order Received", "Customer", "Delivery Destination" and "Order Received Specification"), "118" (the form ID of the "Sum of Order Received" screen which is the additional screen) is stored as the utilized screen/form, and 1 is stored as the utilization number (n1) in the identifier attribute specification 26. Similarly, for each key definition data and each data item belonging to each of the normalized entities, "118" is stored as the utilized screen/form, and 1 is stored as the utilization number (n2).

When a plurality of screens/forms are simultaneously added, redundancy is eliminated as in the above described normalized entity registering process.

Turning back to FIG. 23, as the automatic normalization process has been performed for data items in the screens/forms extracted from the additional screens/forms in this manner, the correspondence matrix table 28 is created on the basis of entity data of normalized entities currently registered in the identifier attribute specification 26 (step 206).

Figure 31:
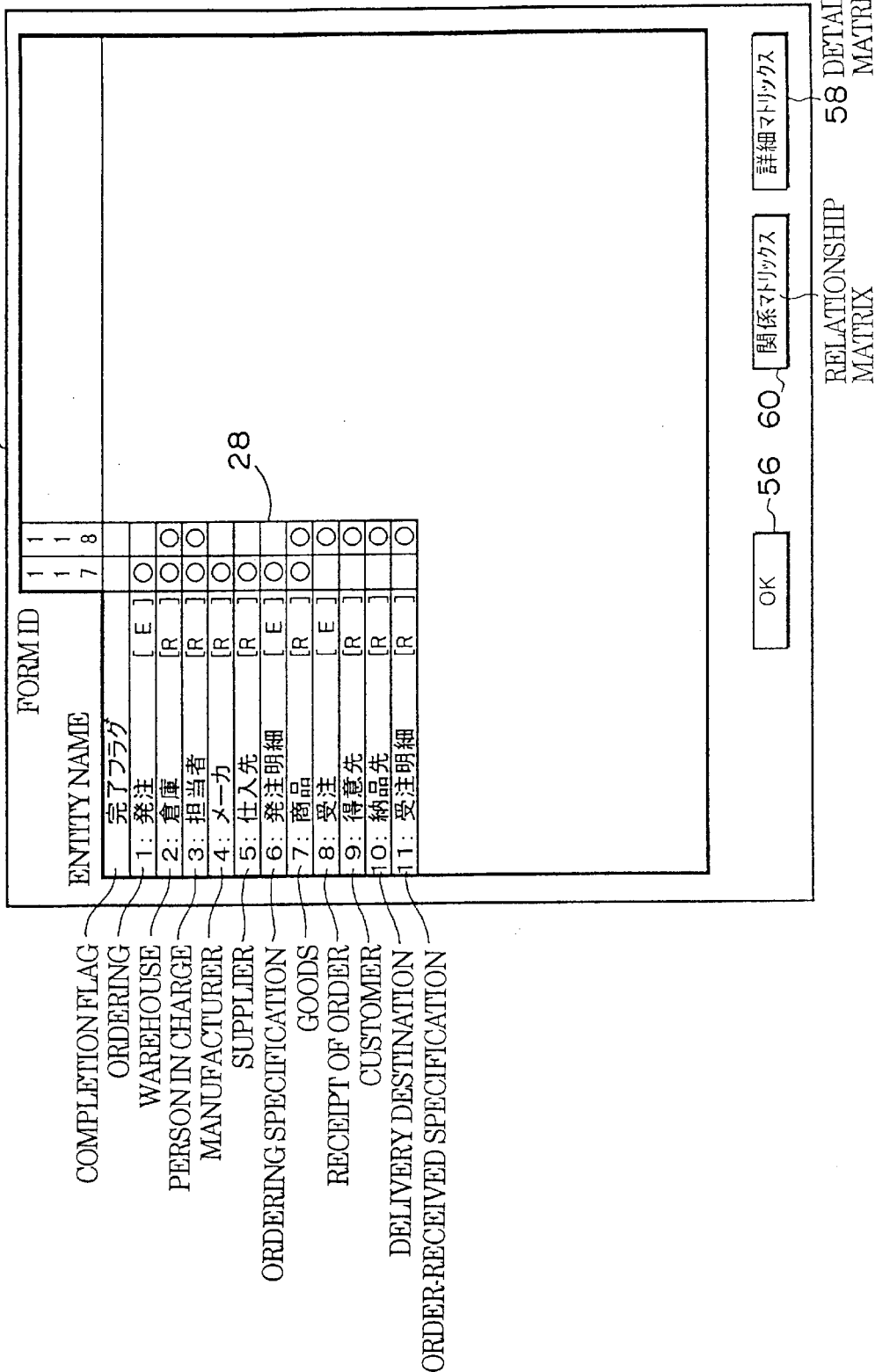
FIG. 31 is an example of a correspondence matrix table screen in which a correspondence matrix table is displayed. The correspondence matrix table is created by the normalization process design being carried out with the "Sum of Order Received" screen being used as the screen which is the object of processing, and then an additional screen/form processing is carried out with the "Sum of Order Received" screen being used as the screen which is the object of processing. The correspondence matrix table may also be created by the normalization process design being carried out with "Sum of Order Received" screen and the "Sum of Ordering" screen being used as the screens which are the objects of processing.

Thus, as shown in FIG. 31, to the previously created correspondence matrix table 28 (see FIG. 28), a column corresponding to the "Sum of Order Received" screen which is the additional screen and rows corresponding to the "Order Received" entity, the "Customer" entity, the "Delivery Destination" entity and the "Order Received Specification" entity are added. Further, a mark "○" is displayed in a field for each of the normalized entities belonging to the "Sum of Order Received" screen (i.e., "Order Received", "Warehouse", "Person-in-Charge", "Customer", "Delivery Destination", "Order Received Specification" and "Goods" entities).

At this time, a detailed correspondence matrix is also created for each of the normalized entities. For the "Goods" entity, a detailed correspondence matrix table 29 having a row of "Unit Price of Order Received" added to the previously created detailed correspondence matrix table 29 is created.

Subsequently, on the basis of the correspondence matrix table 28, a relationship matrix table 30 of the additional screen/form is newly created. Unnecessary relationships are deleted at this time. Further, relationships are extracted from the created relationship matrix table 30 of the additional screen/form (step 208). Specifically, when the relationship matrix table 30 of the additional screen/form shown in FIG. 32 is created, nine relationships including:

"Order Received" entity-"Warehouse" entity,
"Order Received" entity-"Person-in-Charge" entity,
"Order Received" entity-"Customer" entity,
"Order Received" entity-"Delivery Destination" entity,
"Order Received" entity-"Order Received Specification" entity,
"Person-in-Charge" entity-"Customer" entity,
"Person-in-Charge" entity-"Delivery Destination" entity,
"Customer" entity-"Delivery Destination" entity and
"Order Received Specification" entity-"Goods" entity are extracted.

Subsequently in step 210, a relationship altering process shown in FIG. 24B is carried out.

In the relationship altering process, a determination is made as to whether the extracted relationships were deleted from or added to the relationships since the previous E-R. diagram was created (step 240). In this case, since the extracted relationships were added along with the addition of the screen/form, the process proceeds to step 250.

In step 250, the number of these relationships is incremented and the updated data is stored. For example, when a current relationship number of the "Order Received" entity-"Warehouse" entity is stored as k (k=0 in the above example), k=k+1 is stored as a new relationship number.

In subsequent step 252, this relationship number is compared with 1, and whether or not the relationship between these entities existed at the time when-the previous E-R diagram was created is determined.

If the relationship number is 1 (k=1), it is determined that there was no relationship between these entities at the time of the previous E-R diagram creation, and the process proceeds to step 254. In step 254, a connecting line which connects these entities is added to the previously created E-R diagram, 32, and the process returns to the steps shown in FIG. 23.

While, if the relationship number is not 1 (k>1), the relationship between these entities already existed at the time of the previous E-R diagram creation. Therefore, it is determined that the entities have been connected by a connecting line in the previously created E-R diagram 32, and the process returns to the steps shown in FIG. 23.

On returning to FIG. 23, for all relationships extracted in step 208, whether the relationship altering processing of step 210 has been carried out or not is determined (step 212). If there are unprocessed relationships, the process goes back to step 210 and performs the relationship altering processing on a next relationship in the same manner.

When the relationship altering processing has been performed for all the relationships extracted in step 208, the screen/form addition process ends.

Figure 33:
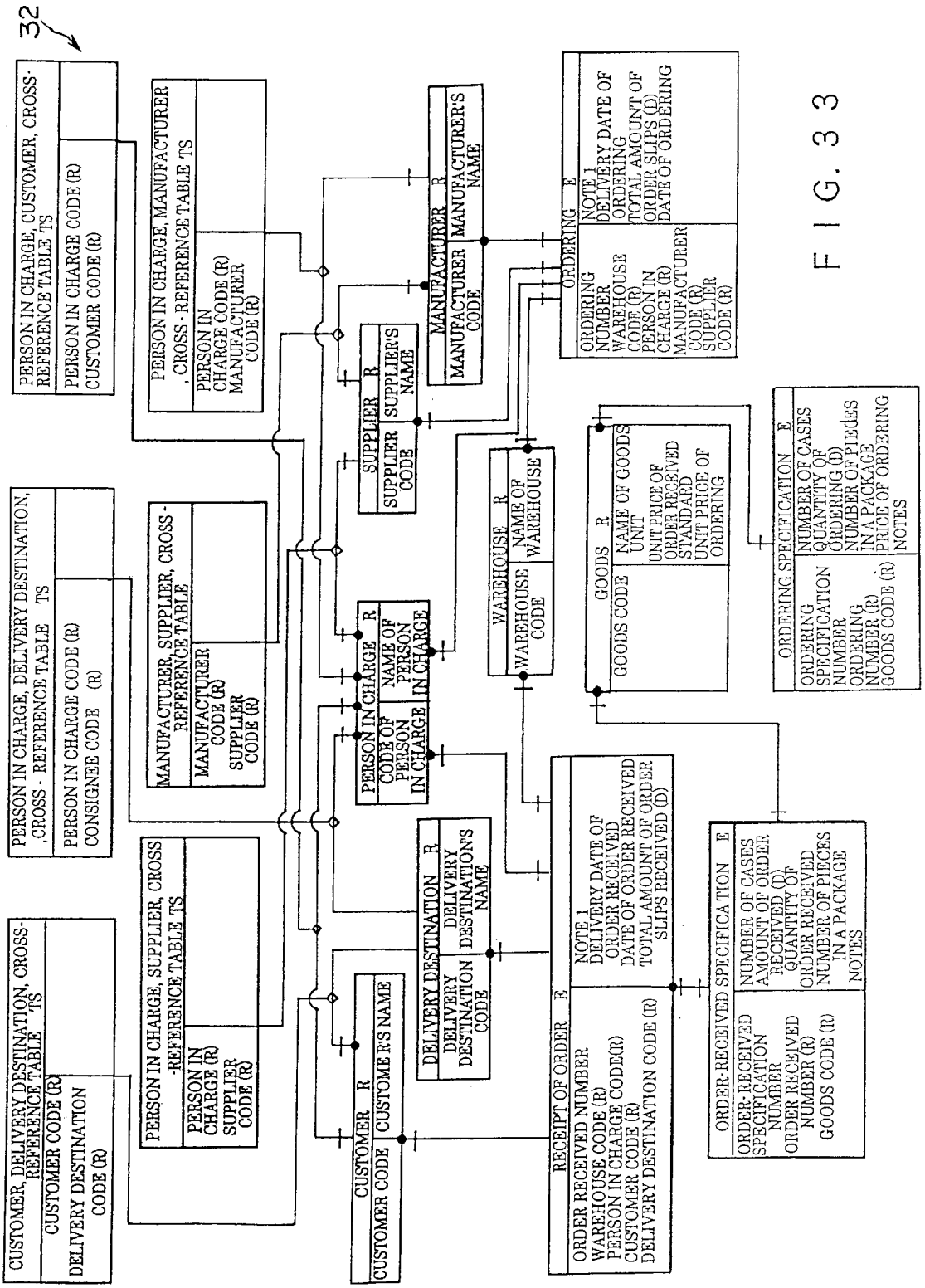
FIG. 33 is an E-R diagram which is created by the normalization process design being carried out by the "Sum of Ordering" screen being used as the screen which is the object of processing and then the screen/form addition process is carried out with the "Sum of Order Received" screen being used as, the screen which is the object of the addition or when the normalization process design is carried out with the "Sum of Order Received" screen and the "Sum of Ordering" screen being used as the screens which are the objects of processing.

Thus, an E-R diagram 32 which is modified on the basis of the addition of the "Sum of Order Received" screen can be obtained (see FIG. 33). The E-R diagram 32 is, of course, the same as the E-R diagram 32 which is created by performing the above described normalization design process with the "Sum of Ordering" screen and the "Sum of Sales" screen being specified as the screen which is the object of the normalization design process.

Deletion of Screen/Form

Figure 34:
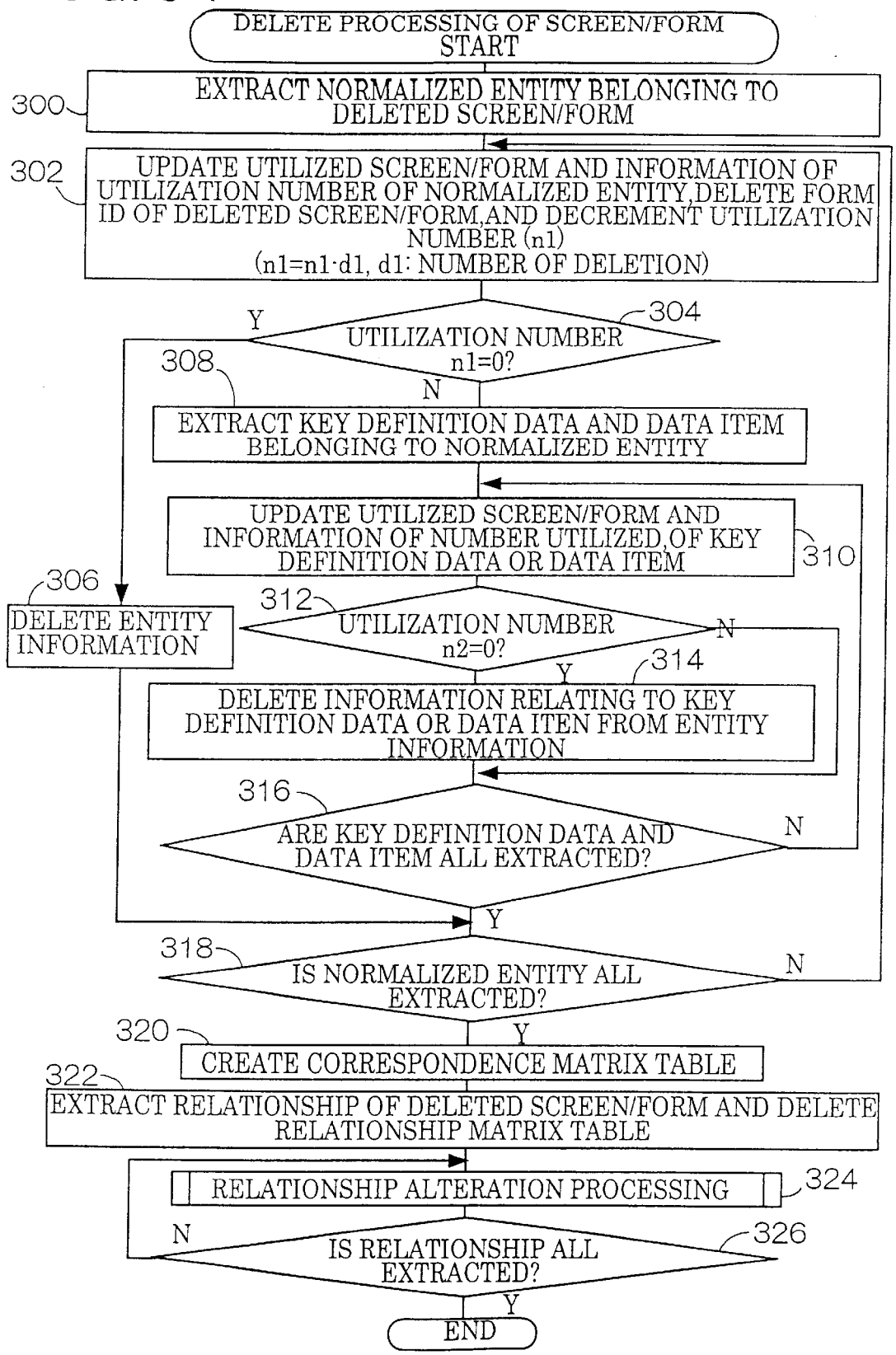
FIG. 34 is a flow chart illustrating a screen/form deletion process in the embodiment of the present invention.

When it is necessary to delete some of the screens/forms after the E-R diagram is created, a screen/form deletion process shown in FIG. 34 is automatically performed by the CPU 14. This screen/form deletion process starts when the user selects the "Edit" menu button 44 in the main screen 40 in FIG. 2 and then selects "Delete Screen/Form" from the pull down menu 48.

Converse to the screen/form addition process described above, an exemplary case in which the "Order Received" screen is specified as a screen to be deleted, after the E-R diagram 32 (see FIG. 33) is created on the basis of the "Order Received" screen and the "Ordering" screen shown in FIGS. 14 and 25, is described below.

In the screen/form deletion process, as shown in FIG. 34, first, normalized entities belonging to screens/forms which are specified by the user to be deleted (hereinafter referred to as"screen(s)/form(s) to be deleted") are extracted with reference to the correspondence matrix table 28 (see FIG. 31) (step 300). Specifically, each of the entities including "Warehouse", "Person-in-Charge", "Goods", "Order Received", "Customer", "Delivery Destination" and "Order Received Specification" is extracted.

In subsequent step 302, form IDs of the screens/forms to be deleted which are stored as the utilized screens/forms of the entities are deleted from entity data stored in the identifier attribute specification 26 which corresponds to the extracted normalized entities, and the utilization number, is decremented and the updated data is stored. Specifically, when a current utilization number is n1 and the entities are contained in d1 (d1=1 in this case) screens/forms of the screens/forms to be deleted this time, n1=n1−d1 is stored as a new utilization number.

Thus, "118" (form ID of the "Sum of Order Received" screen) is deleted from the utilized screen/form data of each of the normalized entities including "Warehouse", "Person-in-Charge", "Goods", "Order Received", "Customer", "Delivery Destination" and "Order Received Specification". Since the current utilization number of each of the "Order Received", "Customer", "Delivery Destination" and "Order Received Specification" entities is 1, 0 is stored as a new utilization number. While, since the current utilization number of each of the "Warehouse", "Person-in-Charge", "Goods" entities is 2, 1 is stored as a new utilization number.

Next, data on the utilization number is compared with 0, and a determination is made as to whether or not the normalized entity belongs to (is used in) a screen/form other than the delete screen/form (step 304).

When the utilization number is 0 (n1=0), it is judged that the normalized entity is a normalized entity belonging only to the delete screen/form, and the routine proceeds to step 306. Specifically, because the utilization number of each of the entities "Order Received", "Customer", "Delivery Destination", "Order Received Specification" is zero, the routine proceeds to step 306 in the case of each of the normalized entities "Order Received", "Customer", "Delivery Destination", and "Order Received Specification".

In step 306, all of the entity data (entity name, key definition data, data item, form ID of utilized screen, utilization number) of the normalized entities which are stored in the identifier attribute specification 26 are deleted, and the routine moves on to step 318.

When the utilization number is not zero (n1>0), it is judged that the normalized entity is a normalized entity which also belongs to a screen/form other than the delete screen/form, and the routine proceeds to step 308. Specifically, because the utilization numbers of the normalized entities "Warehouse", "Person-in-Charge", "Goods" are each 1, the routine moves on to step 308 in the case of the normalized entities "Warehouse", "Person-in-Charge", "Goods".

In step 308, the key definition data and data item forming the normalized entity are extracted. Next, in step 310, the extracted key definition data and utilized screen/form of the data item, and the data on the utilization number are updated.

Specifically, for the key definition data and the data item for which the form ID of the delete screen/form are stored as the utilized screen/form, the form ID of the delete screen/form is deleted from the utilized screen/form. The data of the utilization number is decremented by a number corresponding to the number of deleted form IDs, such that the data of the utilization number is updated and stored. Specifically, in a case in which the current utilization number is n2, and among the screens/forms to be deleted this time, the key information data or the data item are included in d2 (here d2=1) screens/forms, then n2 n2−d2 is stored as the new utilization number.

For example, in the "Goods" entity, "Goods Code" is included as key definition data, and "Name of Goods", "Units", "Unit Price of Order Received", "Standard", and "Unit Price of Ordering" are included as data items in the "Goods" entity (see FIG. 33). "118" (the form ID for the "Sum of Orders Received" screen which is a delete screen) is included in the data of the utilized screens/forms of "Goods Code", "Name of Goods", "Units", "Unit Price of Order Received", and "Standard". "118" is not included in the data of the utilized screen/form for "Unit Price of Ordering". Further, "2" is stored as the utilization number for "Goods Code", "Name of Goods", "Unit" and "Standard", and "1" is stored as the utilization number for "Unit Price of Order Received" and "Unit Price of Ordering".

Accordingly, here, "118" is deleted from the data of the utilized screens/forms of "Goods Code", "Name of Goods", "Unit", "Unit Price of Order Received", and "Standard". Further, the utilization numbers of "Goods Code", "Name of Goods", "Unit", "Unit Price of Order Received" and "Standard" are decremented, and "1" is stored as the new utilization number for "Goods Code", "Name of Goods", "Unit", and "Standard", whereas "0" is stored as the new utilization number for "Unit Price of Order Received". Note that "118" (the form ID of the "Sum of Orders Received" screen which is a delete screen) is not included as data of the utilized screen/form in the "Unit Price of Ordering". Thus, the data of the utilization number of the utilized screen/form is not altered.

In subsequent step 312, the data on the utilization number is compared with zero. For each of the key definition data and the data items forming the normalized entity, a determination is made as to whether the key definition data and the data items also belong to a screen/form other than the delete screen/form. When the utilization number is 0 (n2=0), it is judged that the key definition data or data item belongs only to the delete screen/form, and the routine proceeds to step 314.

In step 314, the data relating to that key definition data or data item is completely deleted from the entity data of the normalized entity stored in the identifier attribute specification 26, and the process moves on to step 316.

On the other hand, when the utilization number is not 0 (n2>0), it is judged that key definition data or data item also belongs to a screen/form other than the delete screen/form, and the routine proceeds to step 316.

In step 316, for all of the key definition data and data items extracted in step 308, a determination is made as to whether the above-described processings have been carried out. If there is a key definition data or a data item which has not been processed, the routine returns to step 310.

In this way, for example, in the case of the "Goods" entity, the utilization number of the "Unit Price of Order Received" is 0. Thus, in step 314, all of the data relating to the "Unit Price of Order Received" is deleted from the entity data of the "Goods" entity. The utilization number of the "Goods Code", "Name of Goods", "Unit", "Standard", and "Unit Price of Ordering" is 1. Thus, these data are kept as they are.

When processing has been completed for all of the key definition data and data items extracted in step 308, the routine moves on to step 318.

In step 318, a determination is made as to whether the above-described processings have been carried out on all of the normalized entities extracted in step 300. When there are normalized entities which have not been processed, the routine returns to step 302. In this way, the entity data corresponding to the entities "Order Received", "Customer", "Delivery Destination", and "Order Received Specification" are deleted from the identifier attribute specification 26. Further, the data relating to the "Unit Price of Order Received" data item is deleted from the entity data of the "Goods" entity.

When processing has been carried out for all of the normalized entity data extracted in step 300, the routine proceeds to step 320. On the basis of the entity data of the normalized entity recorded in the current identifier attribute specification 26, a correspondence matrix table 28 is created. In this way, a correspondence matrix table 28 (see FIG. 28) is created. in which the row corresponding to the deleted screens/forms and the row of the normalized entities whose entity data has been deleted, have been deleted from the correspondence matrix table 28 created the previous time (see FIG. 31). Further, a detailed correspondence matrix is also created for each normalized entity. At this time, a detailed correspondence matrix table 29 is created from which the line "Unit Price of Order Received" has been deleted from the detailed correspondence matrix table 29 created the previous time.

In subsequent step 322, the relationship is extracted from the relationship matrix table 30 (see FIG. 32) of the delete screen/form, and the relationship matrix table 30 of this delete screen/form is deleted. Next, in step 324, the relationship illustrated in the screen diagram 24B is subjected to altering processing.

In the relationship altering processing, a determination is made as to whether the extracted relationship has been deleted or added since the time that the previous E-R diagram was created (step 240). Here, along with the deletion of the screen/form, the extracted relationship is deleted, and thus, the routine returns to step 260.

In step 260, the relationship number of this relationship is decremented so as to be updated, and the new relationship number is stored. Specifically, in a case in which the relationship number of this relationship is stored as k, k=k−1 is stored as the new relationship number.

In the subsequent step 262, this relationship number is compared to 0, and a determination is made as to whether the relationship between the entities is dependent on a screen/form other than the delete screen/form.

In a case in which the relationship number is 0 (k=0), it is judged that the relationship between the entities is dependent only on the delete screen/form, and the routine proceeds to step 264. In step 264, for the E-R diagram 32 which was created the previous time, the connection line connecting the entities is deleted, and the routine returns to FIG. 23.

On the other hand, when the relationship number is not 0 (k>0), it is judged that the relationship between the entities also depends on a screen/form other than the delete screen/form, and the routine returns to FIG. 23 as it is.

When the routine returns to FIG. 23, a determination is made (step 326) as to whether the relationship altering processing of step 324 has been carried out for all of the relationships extracted in step 322. If there are relationships which have not been processed, the routine returns to step 324, and the relationship altering processing is carried out for the next relationship.

When the relationship altering processing is carried out for all of the relationships extracted in step 322, the processing of adding the screens/forms is completed.

By repeating in this way the relationship altering processing (step 324) for all relationships of the screens/forms which have been deleted in accordance with the deletion of the screens/forms, the E-R diagram 32 modified on the basis of the deletion of the "Total Sales" screen is obtained. This E-R diagram 32 is of course the same as the E-R diagram 32 (see FIG. 26) which is created by designating the "Total Sales" screen as the screen which is the object of normalization design processing and carrying out the above-described normalization design processing.

As described above, in the present embodiment, for each of the normalized entities, key definition data and data items, the data (form ID) of the used screen/form and the data of the utilization number are stored. Each time a screen/form is added or deleted, the data is updated to the latest data. Further, for each of the relationships between the entities, the relationship number is stored, and each time a screen/form is added or deleted, the data is updated to the latest data. When deletion of a screen/form is designated, the entity or the relationship to be deleted is automatically determined on the basis of the stored latest utilization number and data of the relationship number. Thus, regardless of the deletion of screens/forms, the E-R diagram can always be correctly obtained.

Further, each normalized entity, key definition data, utilized screen/form of a data item, data on the utilization number, and the number of relationships between entities are stored. Thus, even cases in which the contents of the screens/forms are altered can be handled.

For example, if the contents of a screen/form are altered and a data item within a screen/form is newly added, after the data items within that new screen/form are extracted, step 204 and steps thereafter of the above-described screen/form adding processing (see FIG. 23) may be carried out with the data item within the new screen/form being the object of processing, or by replacing the added screen/form with a screen/form whose contents have been altered.

Further, in a case in which the contents of the screen/form are altered and the data item in the screen/form is deleted, the data item in the deleted screen/form (the key definition data or the data item) and the normalized entity to which the data item in the screen/form belongs are extracted. A determination is made as to whether the deletion of the data item in the screen/form is the deletion of the normalized entity extracted from the screen.

More specifically, by referring to the data of the utilized screen/form of the data item and the key definition data forming the extracted normalized entity, a determination is made as to whether, among the data items and key definition data forming the normalized entity, there is a key definition data or a data item which belongs to a screen/form whose contents have been altered, other than the data item in the deleted screen/form. If there is no such key definition data or data item, it is determined that the normalized entity extracted from the screen is to be deleted. If there is such a key definition data or data item, it is determined that the key definition data or the data item is to be deleted from this screen.

When the normalized entity is to be deleted from the screen/form whose contents have been altered, the processings from steps 302 and on of the above-described screen/form deletion processing (see FIG. 34) may be carried out by using the normalized entity and the data in the deleted screen/form as the object of processing, or by using the screen/form whose contents have been altered instead of the deleted screen/form.

When a key definition data or a data item is deleted from the screen/form whose contents have been altered, the processings of steps 310, 312, 314, 316 of the above-described screen/form deleting may be carried out by using the data in the deleted screen/form as the object of processing or by using the screen/form whose contents have been altered instead of the deleted screen/form, and thereafter, the processings of steps 320 and after may be carried out.

In this way, on the basis of the altered contents of the screen/form, the data of the utilized screen/form (form ID) and the data of the utilization number are updated. The corresponding matrix is modified, and the relationship matrix is added, deleted, modified, and the like, such that the E-R diagram 32 can be modified.

In the relationship altering processing illustrated in FIG. 24B, even if the user depresses the delete button 68 of the relationship matrix table screen 64 and an unnecessary relationship is deleted, the same processings are carried out.

The above-described screen/form adding processing is one example, but is not limited to the above description. The essence of the processing is handling the addition and deletion of screens/forms by using the normalized entities, the key definition data; the utilization number of data items, and the relationship numbers between entities. The same holds for processing based on the altering of contents of a screen/form.

Integrating E-R Diagrams

Figure 35:
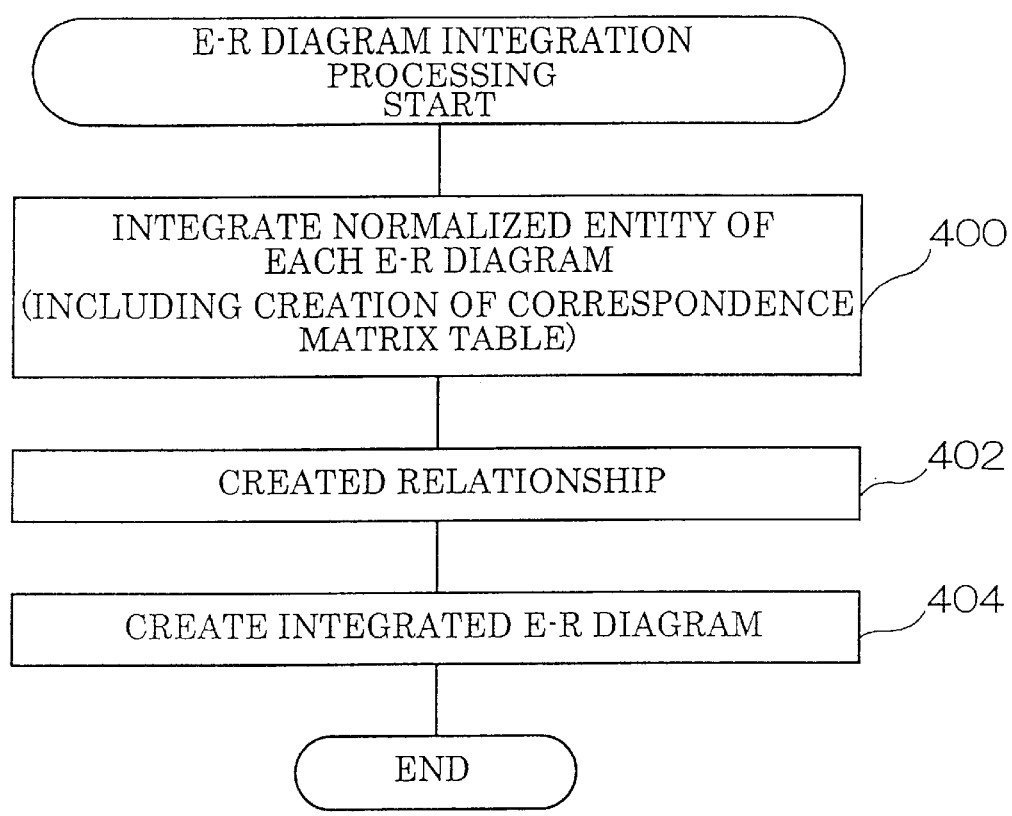
FIG. 35 is a flow chart illustrating an integration process in the E-R diagram in the embodiment of the present invention.

Because the number of screens/forms which are the object of processing is great, after the screens/forms which are the objects of processing are distributed among a plurality of users and the above-described standardization designing processing is carried out, if the E-R diagrams 32 created by the respective users are integrated or there is the need to integrate the plural E-R diagrams 32, the E-R diagram integration processing shown in FIG. 35 is carried out automatically by the CPU 14.

The E-R diagram integration processing is started by a user selecting the "Edit" menu button 44 from the main screen 40 shown in FIG. 2, and selecting "E-R diagram integration" from the pull down menu 48.

Hereafter, explanation will be given of a specific case in which an instruction is given to integrate the E-R diagram 32 created on the basis of the screens shown in FIGS. 52–62 (forms: 101 through 112) using the above-described normalization design processing as an example, and the E-R diagram 32 created on the basis of the screens shown in FIGS. 64–67 (forms: 113 through 116).

Figure 38:
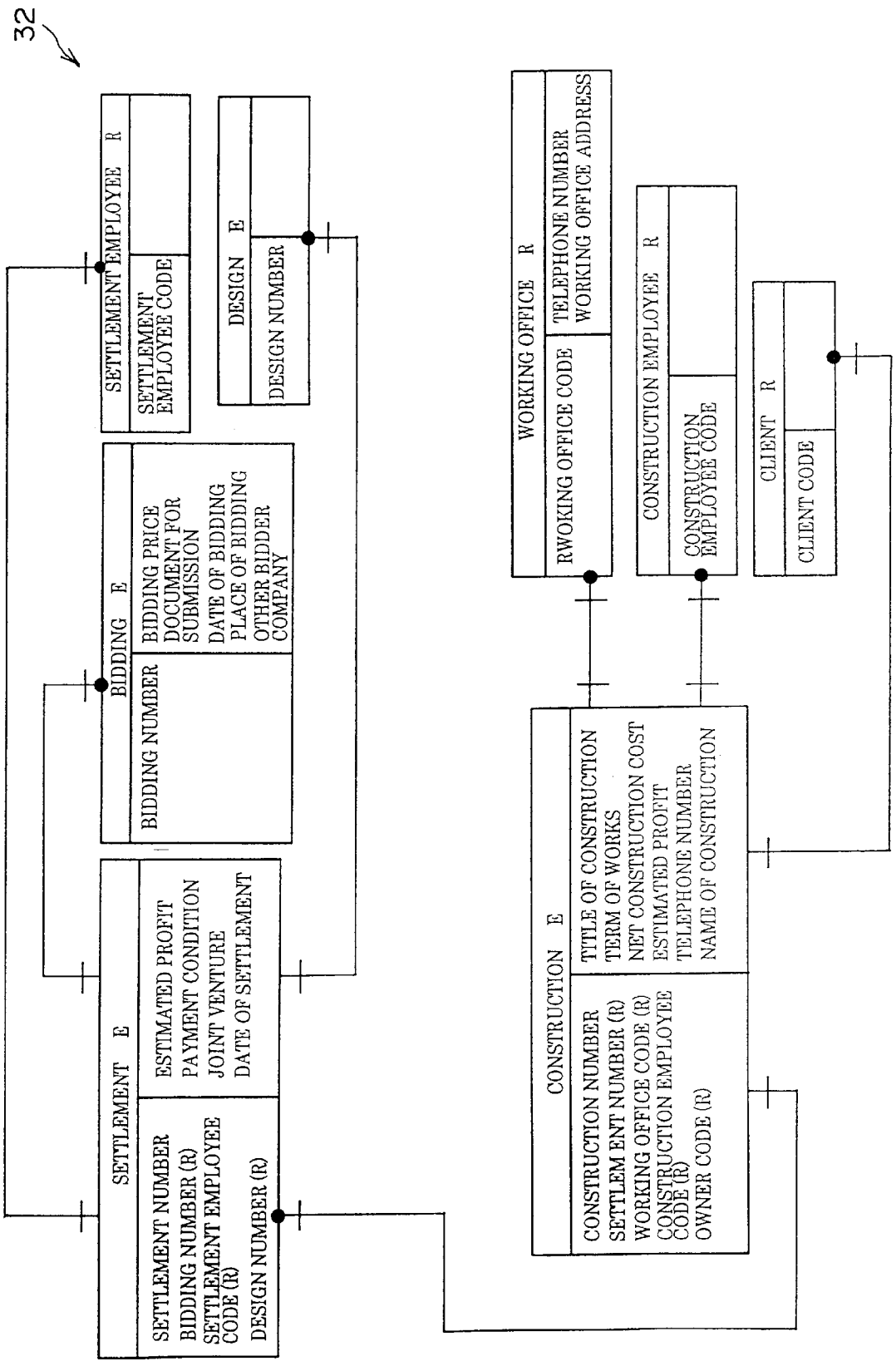
FIG. 38 is a diagram which explains the integration process of the E-R diagram and is an example of the E-R diagram which is the object of processing in the embodiment of the present invention.
Figure 39:
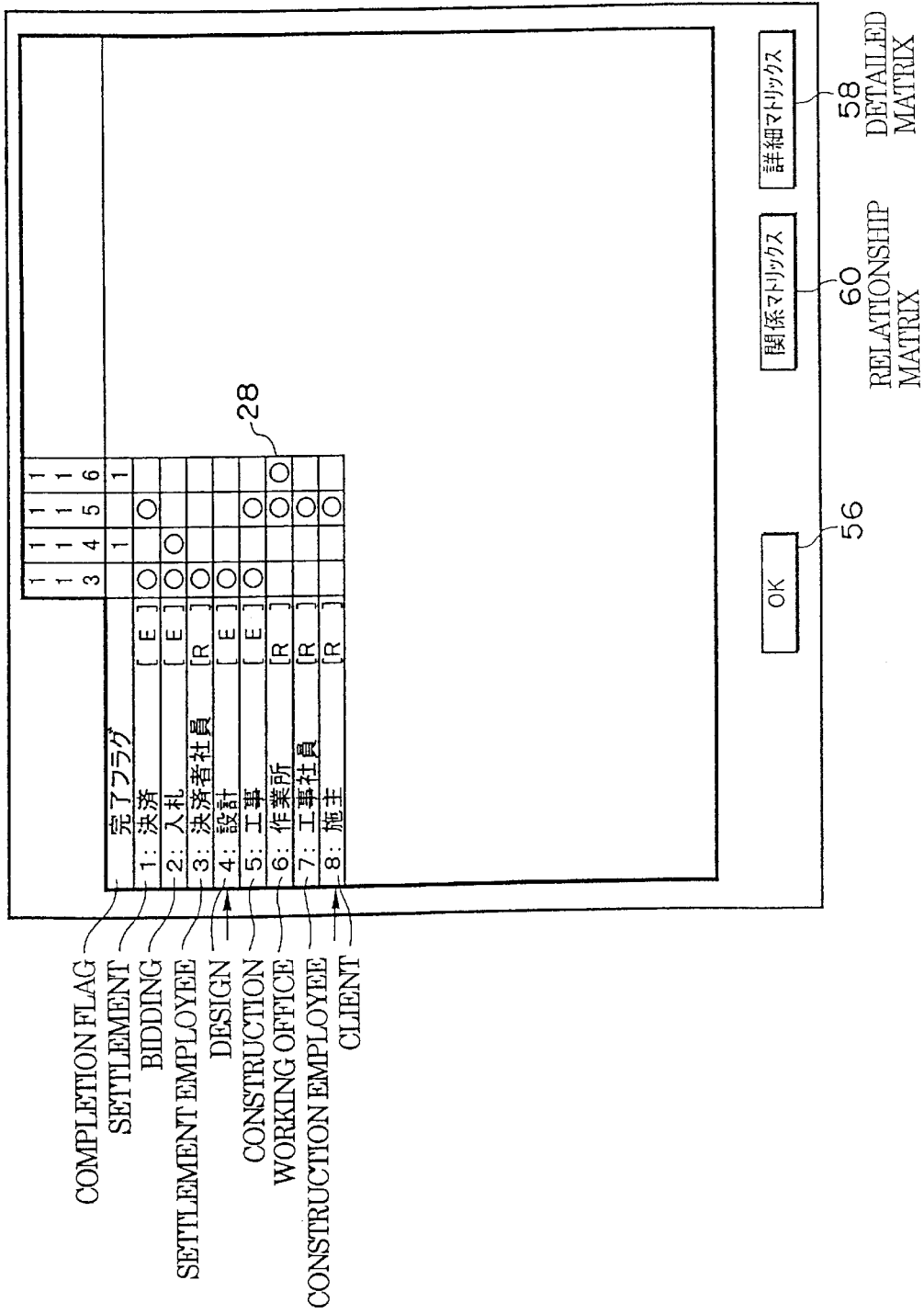
FIG. 39 is an example of a correspondence matrix table screen illustrating the correspondence matrix table of the E-R diagram in FIG. 38.

FIG. 36 illustrates the E-R diagram 32 created on the basis of the screens (a total of twelve screens) shown in FIGS. 52–63 (forms: 101 through 112). The correspondence matrix table screen 54 at this time is illustrated in FIG. 37. Further, FIG. 38 illustrates the E-R diagram 32 created on the basis of the screens: (a total of four screens) shown in FIGS. 64–67 (forms: 113 through 116). FIG. 39 shows the correspondence matrix table screen 54 at this time.

In the E-R diagram integration process, firstly, as shown in FIG. 35, the normalized entities of each E-R diagram 32 are integrated as instructed by the user (step 400). More specifically, first, the normalized entities of one of the E-R diagrams 32 are registered in the identifier/attribute specification 26 as normalized entities. Then the normalized entities of another of the E-R diagrams 32 are sequentially registered in the same. If a normalized entity has key definition data that is the same as or closely related to one of the already registered normalized entities of the one E-R diagram 32, the two normalized entities are combined and a duplicate is discarded. At this time, utilized screen/form IDs, utilization numbers and the like of the duplicated normalized entities are also combined.

For example, as shown in FIGS. 37 and 39, a "Client" entity is present as a normalized entity in each of the two E-R diagrams 32 concerned. As shown in FIGS. 36 and 38, the key definition data of the "Client" entity in both cases is "Client Code". Hence, the two "Client" entities are combined into one. There is also a "Design" entity present as a normalized entity in each of these two E-R diagrams 32. The key definition data of both of the "Design" entities is "Design Number", so the "Design" entities are also combined into one.

That is, in the integration process of these normalized entities, duplicates of two normalized entities (the "Client" entity and the "Design" entity) are discarded. Therefore, the 16 normalized entities shown in the correspondence matrix table screen 54 (correspondence matrix table 28) in FIG. 37 and the 8 normalized entities shown in the correspondence matrix table screen 54 (correspondence matrix table 28) in FIG. 39 are aggregated to 22 normalized entities (16+8−2). A correspondence matrix table 28 that is the same as the above-described correspondence matrix table 28 of FIG. 9 is created by this integration process.

Next, relationships between the normalized entities aggregated by the integration process of step 400 are created (step 402) with reference to relationships when each of the two E-R diagrams was created (relationship matrix tables 30). The relationships between entities were created at the screens/forms when the E-R diagrams 32 were created. Therefore, only relationships that relate entities that have been combined in the normalized entity integration process (the "Client" entity and the "Design" entity) need to be considered. Other relationships between entities can simply be copied without alteration.

Next, an integrated E-R diagram is created on the basis of the created relationships (step 404). The E-R diagram 32 of FIG. 36 and the E-R diagram 32 of FIG. 38 are integrated to create the E-R diagram 32 (the integrated E-R diagram). This integrated E-R diagram is the same as the above-described E-R diagram 32 of FIG. 13.

When the two E-R diagrams 32 were created, the relationship matrix tables 30 (relationships between entities) for each screen/form were separately saved (stored) in the database 16. When the integrated E-R diagram is created, by use of these relationship matrix tables 30, the plurality of E-R diagrams 32 can easily be integrated to create the integrated E-R diagram.

If screens/forms have been added or deleted or if contents have been altered, utilized screen/form data (form IDs) and utilization number data will have been updated on the basis of the screen/form additions and deletions and the content alterations, as described previously. Also, the correspondence matrix tables 28 will have been modified and the relationship matrix tables 30 will have been added, deleted, modified and the like on the basis of the screen/form additions and deletions and the content alterations. Thus, in the E-R diagram integration process, an integrated E-R diagram that has been modified on the basis of the screen/form additions and deletions and the content alterations can be obtained.

Extraction of an E-R Diagram

Figure 40:
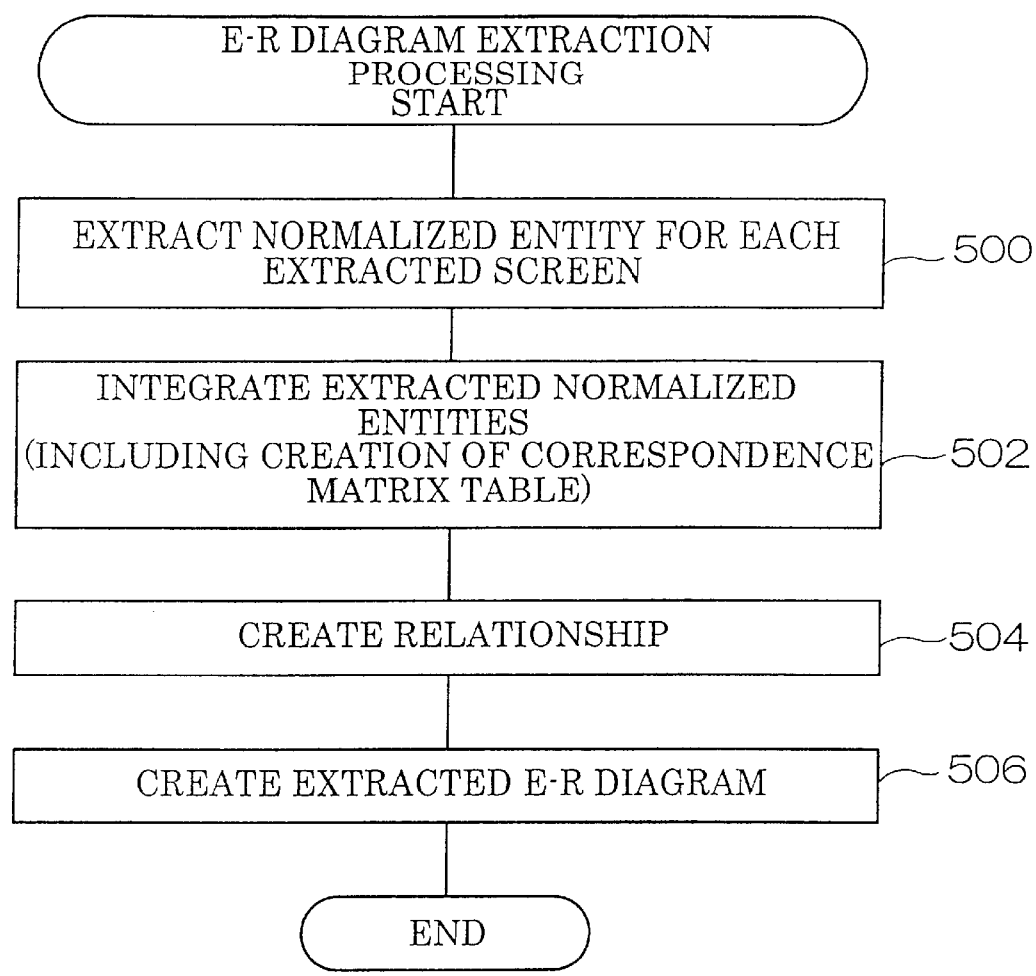
FIG. 40 is a flow chart illustrating the extracting process in the E-R diagram of the embodiment of the present invention.

The E-R diagram 32 is created for general administration of a database with all departments involved in operations as objects of that E-R diagram 32. There may then be a change, such as the database being altered for administration by each department, in which case a particular subset of screens/forms must be extracted from the previously created E-R diagram 32 (hereinafter, this previously created E-R diagram is referred to as a "master E-R diagram" and the E-R diagram that is extracted is referred to as an "extracted E-R diagram"). When such extraction is required, an E-R diagram extraction process, shown in FIG. 40, is automatically carried out by the CPU 14.

In the E-R diagram extraction process, the user selects the "Edit" menu button 44 in the main screen 40 shown in FIG. 2. The user selects "Extraction of E-R diagram" from the pull-down menu 48 to start the process.

Creation of an extracted E-R diagram is concretely explained below, using the example from the aforementioned normalization design process. The extracted E-R diagram is created on the basis of the displays in FIGS. 52 to 67 (forms 101 to 116). A portion thereof based on the displays in FIG.'s 64 to 67 (forms 113 to 116) is extracted from the E-R diagram 32 (the master E-R diagram).

In the E-R diagram extraction process, first, normalized entities are extracted (step 500) for each screen whose extraction has been designated by the user (hereinafter referred to as "extraction screens"). Specifically, the correspondence matrix table 28 that was created when the master E-R diagram was created (see FIG. 9) is referred to. In each extraction screen column, any normalized entity that is marked with a circle is judged to be a normalized entity belonging to that extraction screen and is extracted.

Concretely, the following normalized entities are extracted:

for form 113: design, settlement, bidding, settlement employee, and construction;

for form 114: bidding;

for form 115: client, settlement, construction, working office, and construction employee; and for form 116: working office.

Next, the extracted normalized entities are integrated (step 502). Specifically, entity data is sequentially registered for the normalized entities. When a normalized entity to be registered is the same as an already registered normalized entity, those two normalized entities are combined into one and the duplicate is discarded. At this time, entity data of the two entities, such as utilized screen form IDs and utilization numbers, is combined.

Concretely, "Bidding" entities are included in both form 113 and form 114. Thus, these two entities are combined into one. Similarly, "Settlement" and "Construction" entities in form 113 and form 115, and "Working Office" entities in form 115 and form 116 are respectively combined into ones. A correspondence matrix table 28 is created on the basis of integration results of the extracted normalized entities. This correspondence matrix table 28 is the same as the correspondence matrix table 28 in the correspondence matrix table screen 54 shown in FIG. 39.

Next, relationships between the normalized entities aggregated in the integration process of step 502 are created (step 504) by reference to relationships when each of the E-R diagrams were created (the relationship matrix table 30).

Subsequently, an integrated E-R diagram is created on the basis of created relationships (step 506). In this way, a portion, based on the screens in FIGS. 64 to 67, of the master P-R diagram of FIG. 13 is extracted and the extracted E-R diagram is created. This extracted P-R diagram is the same as the E-R diagram 32 shown in FIG. 38.

When the master E-R diagram 32 was created, the relationship matrix table 30 (relationships between entities) for each screen/form was saved (stored) in the database 16. When the extracted E-R diagram is created, by use of these relationship matrix tables 30, the extracted E-R diagram can easily be extracted on the basis of selected screens/forms, and can easily be created.

If screens/forms have been added or deleted or if contents have been altered, utilized screen/form data (form IDs) and utilization number data will have been updated on the basis of the screen/form additions and deletions and the content alterations, as described previously. Also, the correspondence matrix tables 28 will have been modified and the relationship matrix tables 30 will have been added, deleted, modified and the like on the basis of the screen/form additions and deletions and the content alterations. Thus, in the E-R diagram extraction process, an extracted E-R diagram that has been modified on the basis of the screen/form additions and deletions and the content alterations can be obtained.

Creation of a Partial E-R Diagram

Generally, when a Database Management System (DBMS) based on a normalization design database is actually constructed, each screen/form is programmed individually. If screens/forms are to be separated out of the master E-R diagram (below, an E-R diagram that has been separated out is referred to as a "partial E-R diagram") and used instead of a program specification, a partial model creation process is automatically carried out by the CPU 14.

In the partial E-R diagram creation process, the user selects the "Edit" menu button 44 in the main screen 40 shown in FIG. 2. The user selects "Creation of partial E-R diagram" from the pull-down menu 48 to start the process.

In the partial E-R model creation process, of the relationship matrix tables 30 for each screen/form that were saved (stored) in the database 16 when the master E-R diagram was created, the relationship matrix tables 30 for the screens/forms that have been designated by the user for creation of the partial E-R diagram are read out. In the relationship matrix tables 30 that have been read out, entities and lines corresponding to relationships are separated out (extracted) from the master E-R diagram 32. Thus, a partial E-R diagram for the specified screens/forms is obtained.

Figure 41A:
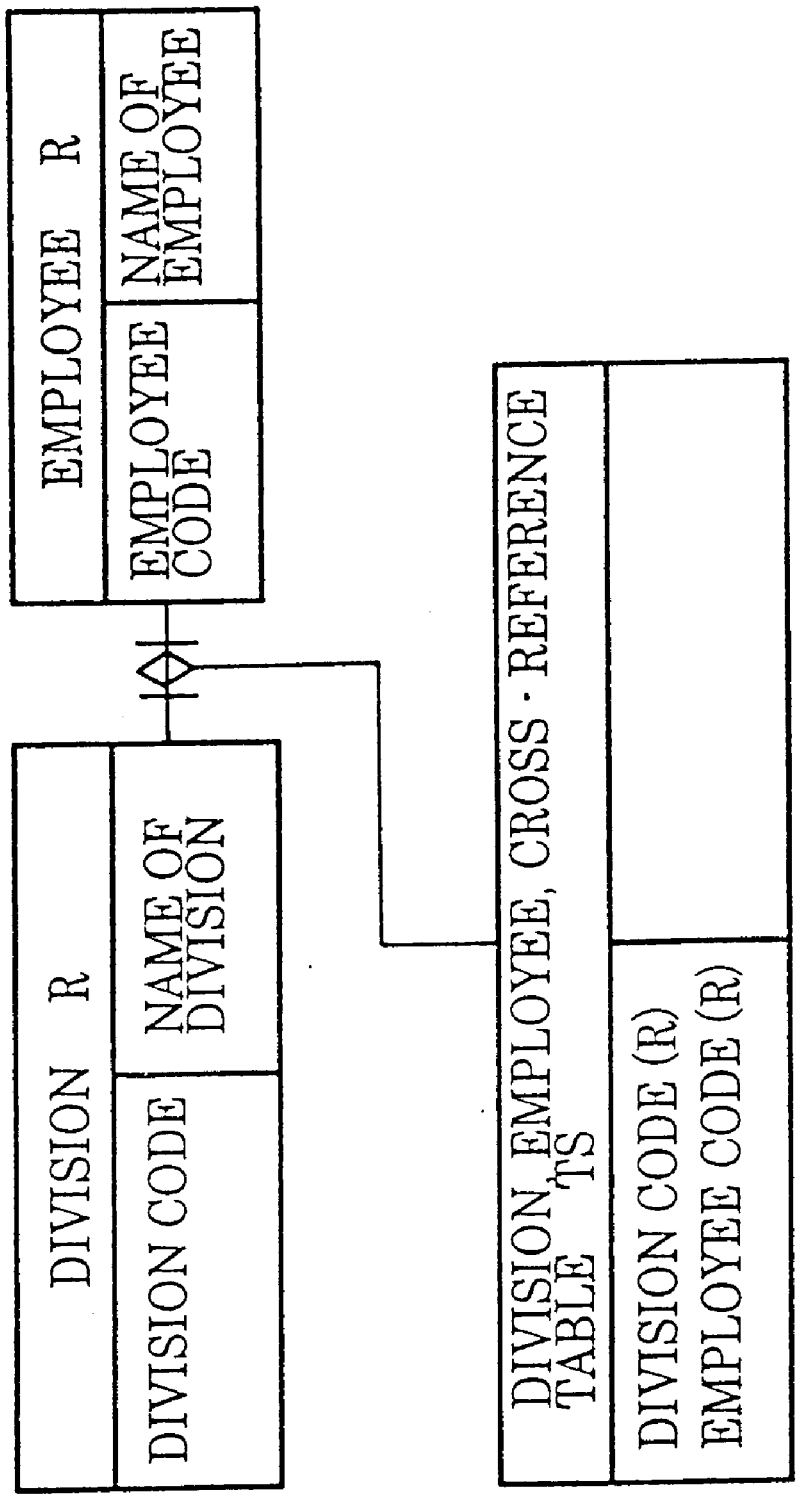

Examples of created partial E-R diagrams are the partial E-R diagram shown in FIG. 41A, which is based on the "Person-in-Charge" screen of FIG. 53 (form 102) that was earlier used as an example for the normalization design process, and the partial E-R diagram shown in FIG. 41B, which is based on the "Estimation of Design" screen of FIG. 61. As can be seen from FIGS. 41A and 41B, data such as entities belonging to screens/forms, relationships between the entities, key definitions and data items of each entity, and the like can be obtained from a partial E-R diagram. Thus, a partial E-R diagram can be utilized as a program specification for a conceptual design.

On the basis of a partial E-R diagram, the user can program each screen/form by defining CRUD (Create, Read, Update, Delete) conditions for key items (key definition data and reference keys) of the forms/screens and by defining function conditions (data values, prerequisites, security conditions, formulas and the like) for data items.

When the master E-R diagram 32 was created, the relationship matrix table 30 (relationships between entities) for each screen/form was saved (stored) in the database 16. When the partial E-R diagram is created, by use of these relationship matrix tables 30, the partial E-R diagram can easily be created for a single screen/form.

Further, data used here is the data that is used for creation of the master E-R diagram 32. Thus, if there is an alteration to the master E-R diagram 32, the partial E-R diagram can also be altered, automatically, in accordance with the alteration.

Specifically, if screens/forms have been added or deleted or if contents have been altered, utilized screen/form data (form IDs) and utilization number data will have been updated on the basis of the screen/form additions and deletions and the content alterations, as described previously. Also, the correspondence matrix tables 28 will have been modified and the relationship matrix tables 30 will have been added, deleted, modified and the like on the basis of the screen/form additions and deletions and the content alterations and saved (stored over) in the database 16. These replaced relationship matrix tables 30 are used in the partial E-R diagram creation process. Thus, a partial E-R diagram that has been modified on the basis of the screen/form additions and deletions and the content alterations can be obtained.

Functional Specification Cases

The normalization design process and editing processes are described above with screens/forms as the objects of processing. However, the present invention is not limited to the same. For example, in the present invention the objects of processing can be functional specifications. Below, functional specifications are designated as the objects of processing. A case in which an E-R diagram is created on the basis of these functional specifications is described in detail.

FIG. 42 shows an "Amount After Trust Fee" functional specification as an example of a functional specification. As shown in FIG. 42, the functional specification defines various items used in a business and includes equations relating the data items.

When this sort of functional specification is designated as the object of processing, the CPU 14 automatically moves (imports) the functional specification into an E-R model database design tool, analyzes what kind of data is included in the functional specification, and shows the functional specification on the monitor 36 such that parts that are considered to be data items are underlined.

The user checks the display. If necessary, the user uses a word processing function or the like to modify underlining. When the display is satisfactory, the user inputs an "OK" command by pressing an "Enter" key provided at a keyboard which is the input/operating device 34, or the like. When the "OK" command has been inputted, the CPU 14 extracts the underlined parts of the functional specification to serve as data items. Also, the same as in the above case wherein the objects of processing were screens/forms, a form ID is allocated to each functional specification and extraction results (data items extracted from the functional specification) are displayed in the form data item display frame 50.

Here, the same data item (below referred to as a "duplicated data item") may be present more than once in one functional specification, as shown in FIG. 42, wherein "Number of cancelled contract (securities)" is present in the second line and the sixth line of the "Amount After Trust Fee" functional specification. When the CPU 14 is extracting the data items from the functional specification, duplicated data items are combined into one and are displayed in the form data item display frame 50 without duplication of data items in the functional specification being shown. (For example, if data items in the functional specification are sequentially displayed in the form data item display frame 50 starting from the top of the functional specification, a data item in the functional specification is cancelled if it is the same as a data item in the functional specification that has already been displayed.) At this time, for the sake of correspondence when contents of the functional specification are to be altered, a number of duplicates (Nk) for each data item in the functional specification is stored, along with row numbers and column numbers of duplicates in the functional specification.

Hence, the data items extracted from the functional specification are displayed without duplication in the form data item display frame 50, as shown in FIG. 43 for the "Amount After Trust Fee" functional specification, for example.

Thus, the data items extracted from the functional specification are displayed in the form data item display frame 50. The user is asked to confirm whether or not this display is satisfactory. If necessary, the user carries out modifications, Then the user inputs the "OK" command by pressing an "Enter" key provided at the keyboard which is the input/operating device 34, or the like. When the "OK" command has been inputted, the same as in the above case wherein the objects of processing were screens/forms, a temporary entity creation process, a normalized entity creation process, a correspondence matrix creation process and a relationship creation process are performed sequentially, and the E-R diagram 32 is created. In this way, the E-R diagram 32 can be created on the basis of the functional specifications. Moreover, the various editing processes can be performed in the same way as in the case in which the objects of processing were screens/forms.

Next, an explanation will be given with regard to a case in which the content of the function specification has been altered after the creation of the E-R diagram. When a description has been newly added to the function specification, the portion regarded as the data item of the new description portion is underlined and displayed on the monitor 36. After the user has modified the underlined portion as needed, the underlined portion is extracted as a data item in the function specification and the display of the form and data item display frame 50 of the function specification is updated.

Specifically, when the newly extracted function specification item data is different from the function specification data item extracted at the time of the previous data item extraction process, the function specification item data is added and displayed on the form and data item display frame 50 as new function specification item data. In later processes (processes-which follow the creation process of the temporary entity), content corresponding to this item is added. When the newly extracted function specification data is the same as the function specification data item extracted at the time of the previous data item extraction process, the function specification data is processed as a multiple data item. That is, column numbers and row numbers of the function specification data item are added and stored as multiple data items, and the number of new multiple data items (m) is added to a multiple number (Nk) (Nk=MN+m), updated and stored, and is not added to and displayed on the form and data item display frame 50.

When a portion of the content of the function specification has been deleted, if the function specification data item which is included in the deleted portion is not a multiple data item (i.e., the multiple number Nk=1), the data of the function specification data item is deleted, and the function specification data item is deleted from the form and data item display frame 50. That is, in later processes, content corresponding to this function specification data item is deleted. If the function specification data item which is included in the deleted portion is a multiple data item (i.e., the multiple number Nk>1), the function specification data item is not deleted from the form and data item display frame 50, and the number of multiple data items to be deleted (m) are subtracted from the multiple number Nk (Nk=Nk−m), updated and stored.

In this manner, by storing the data of respective multiple data items (function specification column numbers, line numbers, and multiple numbers), alterations in the content of the function specification can easily be completed.

Functions for Handling Large Amounts of Screens/Forms

When an E-R diagram is actually created, it is necessary to process large amounts of screens/forms from 100 to 200 or higher. For this reason, the data base design system 10 is provided with functions which provide an environment in which the user can easily operate, even if the number of screens/forms becomes large. These functions will now be explained below.

1. Automatic Size Adjustment Function for the Form and Data Item Display Frame and the Entity Display Frame The data base design system 10 is provided with an automatic size adjustment function for the form and data item display frame 50 and the entity display frame 53.

In the function setting screen (not illustrated), when the automatic size adjustment function is set to "OFF", the form and data item display frame 50 and the entity display frame 53 at the time of display on the monitor 36 or output from the print output apparatus 38 are fixed at a predetermined size which is set in advance. At this time, when character strings or data items cannot be completely displayed within the form and data item display frame 50 and the entity display frame 53 of a predetermined size, symbols are displayed (e.g., in the case of character strings, ". . . ", and in the case of data items, "▲") so that the user is informed when there are non-displayed character strings or non-displayed data items (see FIG. 44A).

By operating the input/operating device 34, the user can manually alter as needed the size of the form and data item display frame 50 or the entity display frame 53, can scroll the display of the form and data item display frame 50 or the entity display frame 53, and can display non-displayed character strings and non-displayed data items. In this case, when the number of screens or documents to be processed becomes large, checking to see whether or not there are non-displayed character strings or non-displayed data items one at a time, manually altering sizes, and scrolling is burdensome.

In the function setting screen (not illustrated), when the automatic size adjustment is set to "ON", the sizes of the form and data item display frame 50 and the entity display frame 53 are automatically adjusted so that every word is displayed (see FIG. 44B).

Specifically, screens/forms, titles of entities, key definition data, and the number of character strings in data items which are displayed on the form and data item display frame 50 and the entity display frame 53 are counted. Based on the result of this count, the size in the horizontal direction of the form and data item display frame 50 and the entity display frame 53 is determined and automatically altered. Further, the number of data items displayed on the form and data item display frame 50 and the entity display frame 53 is counted. Based on the result of this count, the size in the vertical direction of the form and data item display frame 50 and the entity display frame 53 is determined and automatically altered.

In this manner, by being provided with an automatic size adjustment function, the user can confirm the content of the form and data item display frame 50 and the entity display frame 53. Therefore, it becomes unnecessary to adjust one at a time the size of the form and data item display frame 50 or the entity display frame 53 of 100 to 200 or more screens/forms.

2. Automatic Aggregation Function for the Partial E-R Diagram

The data base design system 10 is provided with an automatic aggregation function for the partial E-R diagram. In the function setting screen (not illustrated), when the automatic aggregation function is set to "OFF", the partial E-R diagram is displayed on the monitor 36 in a state of having been cut out (extracted) from the master E-R diagram 32, and is outputted from the print output device.

Figure 45:
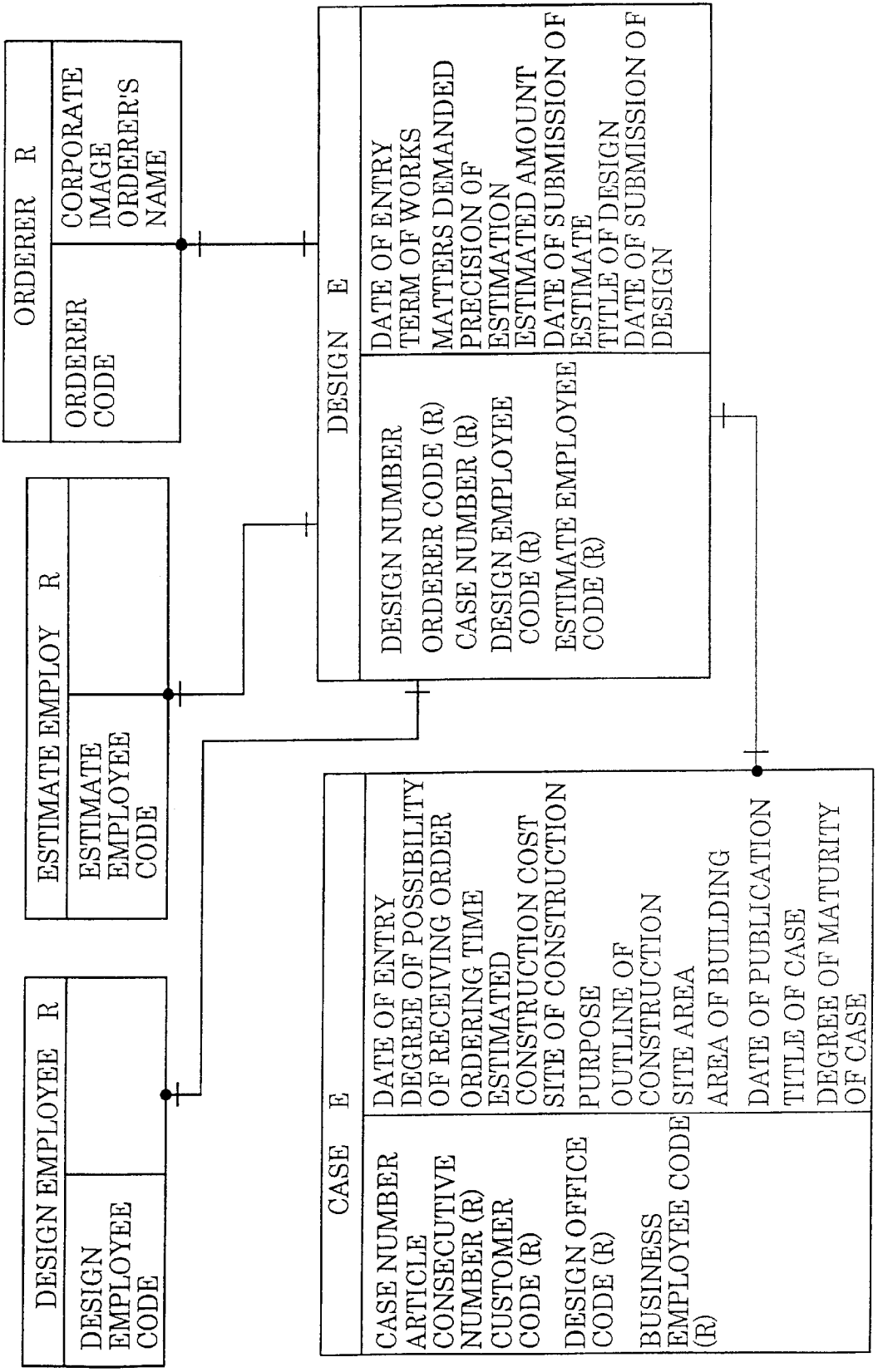
FIG. 45 is an example of a partial E-R diagram in which the automatic aggregation function is set to OFF.

In FIG. 45, an example is illustrated in which the partial E-R diagram of the screen of 110 has been created by the form ID from the master E-R diagram shown in FIG. 13. As can be understood from FIG. 45, the partial E-R diagram contains a lot of blank portions (i.e., unnecessary spaces).

In this case, when the number of screens or documents to be processed increases to 100 to 200 or more and the size of the master E-R diagram 32 becomes large, unnecessary spaces also increase more and more and the size of the partial E-R diagram winds up becoming large. When the size of the partial E-R diagram is made small, the disposed position of the entity (the entity display frame 53) of the partial E-R diagram must be altered by operating the input-operating device 34, which is burdensome.

Figure 46:
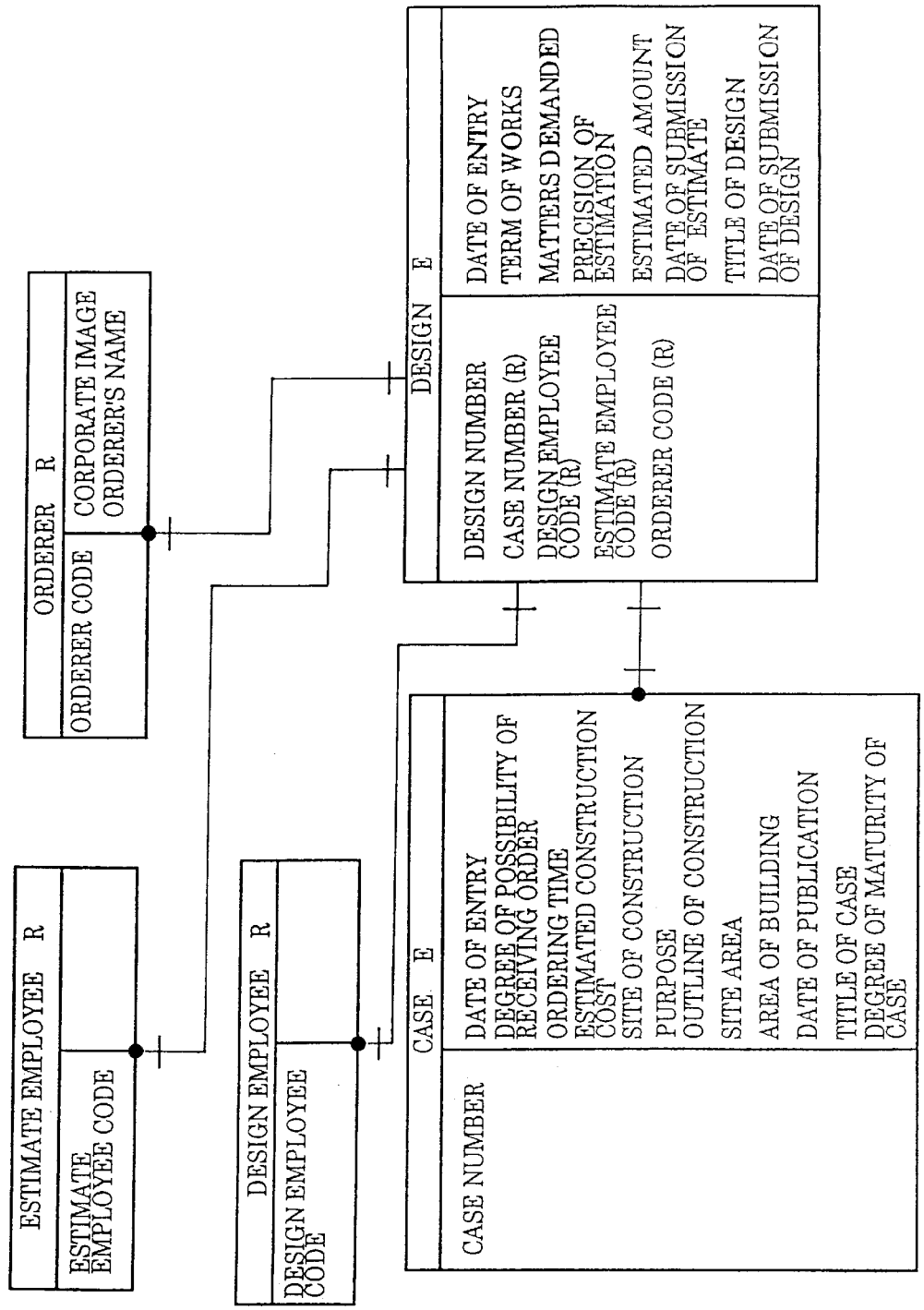

In contrast to this, in the function setting screen (not illustrated), when the automatic summary function is set to "ON", the region at which the partial E-R diagram is aggregated and displayed (hereinafter referred to as "display region") can be designated to a desired size by operating the input-operating device 34 such as a mouse. The entity (the entity display frame 53), which has been cut out (extracted) from the master E-R diagram 32, is automatically disposed within this designated display region (see FIG. 46).

In this manner, by being provided with an automatic summary function, the partial E-R diagram can be automatically placed in a display region of a desired size. Accordingly, it also becomes possible to line the partial E-R diagram up with other data and display (or output) them at the same time (e.g., concurrent display of a plurality of partial E-R diagrams, concurrent display of the partial E-R diagram and the corresponding form and data item display frame 50).

3. Consistency Verification Function for Screens/Forms, and Entities

When an E-R diagram is actually created, sometimes an entity is manually added or a data item within a screen/form is added to the screen/form as needed. For example, after a normalized entity has been registered, the registered entity is displayed on the monitor 36 and confirmation thereof is requested of the user (see step 110 of FIG. 3). However, if necessary at this time, the user manually adds a new entity, and data items within the screen/form which correspond to the added entity are added to some screen/form.

In such a case as this, after an entity or data item within the screen/form has been added, it becomes necessary to confirm whether or not the registered normalized entity is consistent with the screen/form. However, when the number of screens or print-outs to be processed becomes 100 to 200 or more, confirmation takes a lot of time and confirmation errors are easily caused. For this reason, the data base design system 10 is provided with a function to verify the consistency of the registered normalized entity with the screen/form.

Specifically, the function uses the data of the registered normalized entity as a master file and, together with carrying out once again (re-classification) the creation process of the temporary entity on each respective screen/form, searches data items within screens/forms for which there is not a corresponding registered (normalized) entity (hereinafter referred to as "unregistered data items") to inform the user. As an example in present embodiment, with regard to the form and data item display frame 50 of the screen/form which includes an unregistered data item which has been searched, when the form and data item display frame 50 is displayed on the monitor 36, the user is informed of an unregistered data item by the display of the unregistered data item in an upper position of the form and data item display frame 50 (see FIG. 47A).

Further, there is also provided a function which searches, out of the registered normalized entities, normalized entities which contain data items not used in any screen/form (hereinafter referred to as "non-use data item") and informs the user thereof. In the present embodiment, when the entity display frame 53 is displayed on the monitor 36, with regard to the entity display frame 53 of the normalized entity which includes non-use data items which have been searched, a mark which indicates non-use (e.g., an "X") is placed on the non-use data items and displayed so that the user is informed of the non-use data items (See FIG. 47B).

Based on the notification results, the user can easily grasp the unregistered data items and the non-use data items. The user can also register the unregistered data items in the normalized entity, can effect tasks such as adding non-use data items to the screens/forms, can dispose of unregistered data items and non-use data items, and can make screens/forms be consistent with registered normalized entities.

4. Function for Adding Key Definition Data Discrimination Information with Respect to Names of Data Items The data base design system 10 is provided with a function which adds data for the purpose of discriminating key definition data (hereinafter referred to as "key definition data discrimination information") corresponding to data items with respect to data items of the temporary entity created by the creation process of the temporary entity (see FIG. 3, step 104).

As an example in the present embodiment, when an "OK" command is input by the user after the creation process of the temporary entity (step 106), names of key definition data, or portions thereof, are automatically added to the names of respective data items as key definition data discrimination information. For example, if the name of the key definition data is "XX" and the name of the data item is "ΔΔ", the name of the data item is altered to "XX ΔΔ" (see FIGS. 48A through 48C). When the name of the key definition data or a portion thereof is already included in the name of the data item, the name of the data item is not altered.

Further, corresponding data of the screens/forms (i.e., names of data items in the screens/forms) from which the data items have been extracted is altered at the same time that key definition data discrimination information is added with respect to data items.

In this manner, key definition data discrimination information is added to the names of data items and corresponding data of the screens/forms is altered. Therefore, when the creation process of the temporary entity is again effected, the temporary entity created in the prior process can be created automatically (automatic separation of the key definition data and the data items). That is, processing (working) time required for the creation process of the temporary entity after the second time can be reduced. This is extremely effective when processing large amounts of screens/forms.

5. Non-Normalization Function

An identifier/attribute specification 26 is stored in the data base 16 at a normalized entity unit. When the form and data item display frame 50 is displayed on the monitor 36, the data of the identifier/attribute specification 26 is used. That is, when the data of the identifier/attribute specification 26 is read out from the data base 16, it becomes accessible at a normalized entity unit.

Accordingly, when the number of normalized entities which structure the screens/forms increases, the number of accesses to the data base 16 increases by only that amount, and display speed of the form and data item display frame 50 corresponding to the screens/forms slows down (i.e., the search time needed to search necessary data from the data base 16 increases).

Further, when the DBMS is actually structured and put to work, normally various kinds of information of data items in the screens/forms which have been inputted from the screens/forms are stored in the data base at a normalized entity unit. Therefore, when the number of normalized entities which structure the screens/forms increases, the number of accesses to the data base increases and processing speed is lowered.

For this reason, the data base design system 10 is provided with a function which creates a non-normalized identifier/attribute specification 26 for display and stores this in the data base 16. In the function setting screen (not illustrated), when the non-normalization function is set to "ON", a non-normalized entity (hereinafter referred to as "non-normalized entity") is created by an ISAM (Index Sequential Access Method) file design in each screen/form.

As an example in the present embodiment, entities structuring each screen/form are divided into HDR (header) entities and DTL (detail) entities, as illustrated in FIG. 49. One key definition data is left, and the remaining key definition data is made into data items. A non-normalized entity in which HDR entities have been organized into a single entity, and a non-normalized entity in which DTL entities have been organized into a single entity are created.

At this time, the name of the one remaining key definition data is altered, and the name of the original normalized entity and the name of the non-normalized entity which has been created are ensured so as not to be identical to one another. In the present embodiment, the word "Standard" is added to the name of the key definition data (and the non-normalized entity), and the name of the key definition data is automatically altered.

When the identifier/attribute specification 26 of the non-normalized entity which has been created is stored in the data base 16 and the form and data item display frame 50 is displayed on the monitor 36, the identifier/attribute specification 26 of the non-normalized entity is used.

Accordingly, the number of accesses to the data base 16 can be reduced, and the display speed of the form and data item display frame 50 is not affected even when the number of normalized entities structuring the screens/forms increases.

For instance, in the example illustrated in FIGS. 49A through 49C, when non-normalization is not carried out when the form and data item display frame 50 on the "Account Sales" screen is not displayed, the data base 16 must be accessed seven times since there are seven normalized entities. In contrast to this, when the seven normalized entities are combined into two non-normalized entities after non-normalization, the data base 16 only needs to be accessed twice.

At this time, data items of non-normalized entities are sorted by horizontal lines from each of the normalized entities which have been combined into the non-normalized entity, and displayed in the left region of the lower portion of the form and data item display frame 50 (see FIGS. 49A through 49C) so that the normalized entities which are included in the non-normalized entity are displayed. That is, the relationship of the screens/forms to the normalized entities can be displayed even when non-normalization is effected. Accordingly, the correspondence matrix table 28, which is based on the non-normalized entity which has been created, can be created easily, and additions, deletions or content alterations of the screens/forms can also be accommodated.

Further, at this time, the user may also divide or integrate as needed the non-normalized entity which has been created. For this reason also, when the data items of the non-normalized entity are sorted from the normalized entities and are displayed on the form and data item display frame 50, the user can grasp the normalized entities which are incorporated in the non-normalized entity. There is also the effect that the sorting and integration tasks for the non-normalized entity become easier. In FIG. 49, an example is illustrated in which data items of non-normalized entities are sorted by horizontal lines from each of the normalized entities and displayed in the left region of the lower portion of the form and data item display frame 50. However, the data items of non-normalized entities may be sorted from each of the normalized entities and displayed by a method other than this one.

Because the correspondence matrix table 28 is created based on the non-normalized entity, the relationship matrix table 30 is created and the E-R diagram is created. When the DBMS is constructed on the basis of this E-R diagram, the data base can be accessed at the non-normalized entity unit, and improvement of the processing speed when the DBMS is actually constructed and put to work can be secured.

An example has been given above in which the normalized entities which structure the screens/forms are divided into HDR entities and DTL entities to effect non-normalization. However, the present invention is not limited to this example. Combining a plurality of normalized entities into a single non-normalized entity is the essence of the present invention. For instance, all normalized entities which structure one screen/form may be combined into a single non-normalized entity. Further, as illustrated in FIG. 50, a repeat count of the DTL entity may be designated (in FIG. 3, this repeat count is designated as 3 times) so that a non-normalized entity which is provided with a set of items for only the designated repeat count is created.

6. Dividing Normalization Function

When there is a large number of screens/forms, it is often the case that a large number of data items are included in a single normalized entity. When an actual DBMS is constructed and employed, the reading of and writing into a database are carried out in units of normalized entities as described above. Thus, when the amount of data of a normalized entity is large, the access time for that database (especially the time required for reading) becomes proportionally longer. For example, for the "worker" entity, "worker number" is the key definition data, and when the "worker" entity includes a large number of items relating to the worker such as "worker name", "birthdate", "date of entry into company", "work history", "salary" and the like as data items, if a DBMS is constructed on the basis of this data, even if the only data required is the "date of entry into company" data, the other data items, such as "worker name", "work history", and the like are also read.

As a result, the database design system 10 is provided with a normalized entity dividing function. When the user designates a normalized entity having a large amount of data and issues an instruction that entity be divided, the normalized entity for which division is instructed is divided into units of screens/forms. (Hereinafter, an entity which is created by such division will be referred to as a "divisional entity".) At this time, each of the divisional entities should have a different name of the key definition data and name of the entity.

Specifically, the numbers 1, 2, 3, . . . should be added in order to the end of the name of the key definition data of the respective divisional entities, such as "worker number 1", "worker number 2", "worker number 3". The name of the screen/form to which the divisional entity corresponds is used as the name of the entity.

Conventionally, there have been systems in which divisional entities have been created by deleting words such as "number", "code" and the like included in the name of the key definition data. However, in this case, the names of the key definition data are the same for all of the divisional entities, and it is difficult to differentiate the respective divisional entities from one another. In contrast, as described above, in the present invention, by making the names of the key definition data different for the respective divisional entities, when the form and data item display frame 50 of each screen/form is displayed, the respective divisional entities can be easily differentiated from one another.

The above-described functions 5 and 6 are realized by processing carried out in accordance with a program by a CPU 14.

Accordingly, the CPU 14 functions as the dividing/integrating section of the present invention.

A description will be given of the correspondence between the present invention and each of so-called first to fifth normalization. The database design system 10 can correspond to each processing of so-called first, second, fourth, and fifth normalization.

The first normalization is deletion of repetitive items. In the database design system 10, the first normalization is automatically carried out at the time of classification into the HDR part and the DTL part during extraction of data items.

The second normalization is classification into the key definition data and the data items. In the database design system 10, the second normalization is automatically carried out at the time of creation of a temporary entity. The results of the first and second normalization are automatically represented as shown in FIG. 17.

The third normalization is elimination of functional dependency (transition functional dependency) between attributes (data items) other than main keys. In the database design system 10, data items having functional dependency are positively made to remain.

Figure 8:
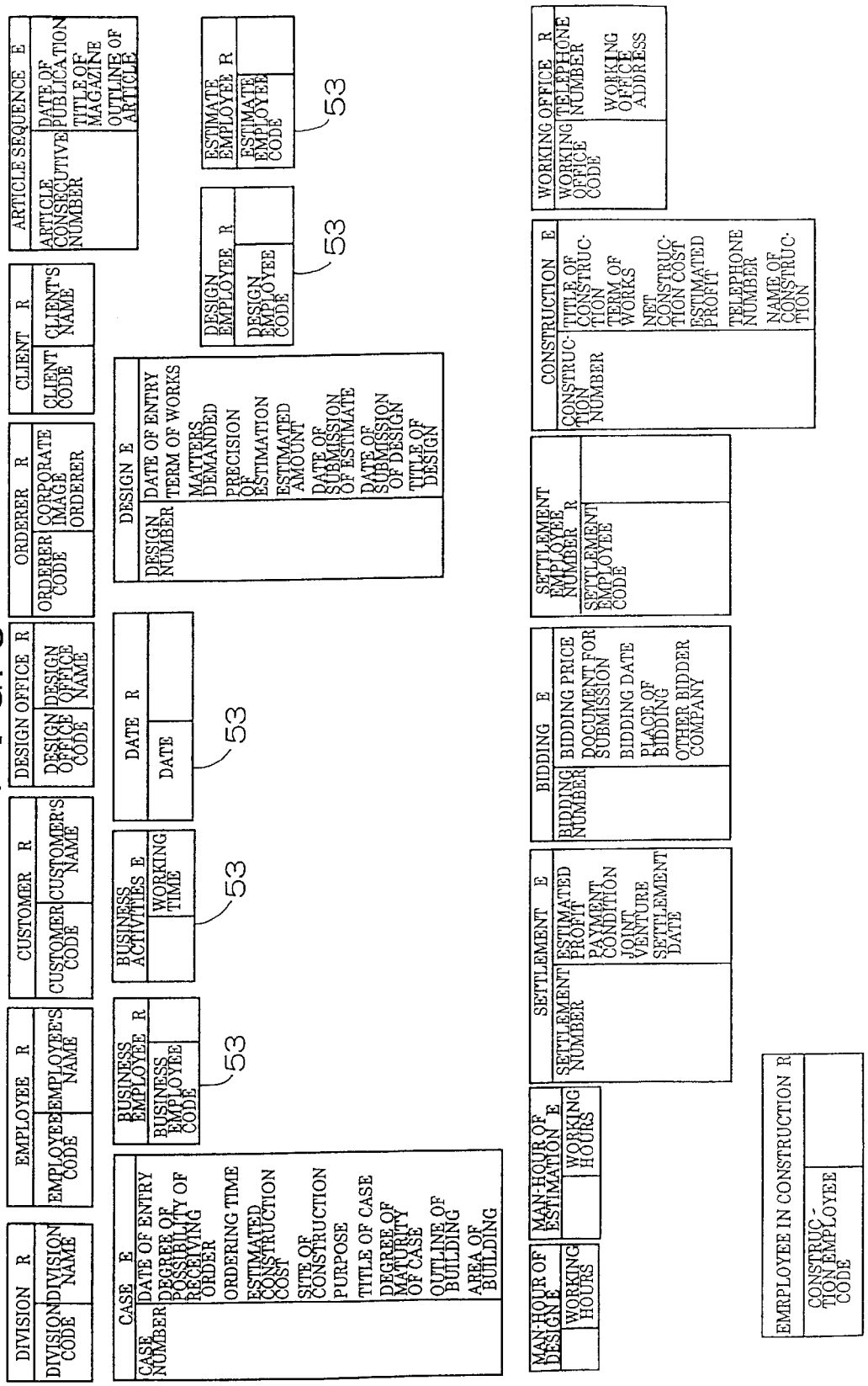
FIG. 8 is an example of an entity display frame which displays a normalized entity in an embodiment of the present invention.

The fourth normalization is: to make data including only data items, with no key definition data existing therein, into an entity. In the database design system 10, as shown in FIG. 8, a "business activities" entity, a "man-hour of design" entity, and a "man-hour of estimation" entity are created as entities including no key definition data.

The fifth normalization is to decompose, into three or more projections, the relationship between entities including associative dependency without causing a loss. In the above-described embodiments, execution of the fifth normalization is not required. In the database design system 10, A reference key is assigned between entities of resources at the time of creating the relationship, and therefore, the fifth normalization is automatically carried out if it is executable.

In the above, a description has been give for a case in which the E-R diagram, the integration E-R model diagram, the extraction E-R model diagram, or the partial E-R model diagram is modified based on additions, deletions or content changes in the screens/forms or function specification when there are additions, deletions or content changes in the screens/forms or function specification. However, the present invention is not limited to this case. Together with modifications of the E-R diagram, the integration E-R diagram, the extraction E-R diagram, or the partial E-R diagram, by changing the color of the modified parts or the like the user is informed of the difference in the modified parts (i.e., the E-R diagram, the integration E-R diagram, the extraction E-R. diagram, or the partial E-R diagram prior to modification (created the previous time)).

In particular, from the modified parts of the partial E-R diagram, the user can easily grasp the parts requiring modification in the program for constructing the DBMS, and also the content of those modifications. This is also effective when cases are handled in which the screens/forms are processed.

In the preceding, an example has been described in which unnecessary relationships are deleted one-by-one using the delete button 68 of the relationship matrix table screen 64. However, in order to create an even handier systems the following is also possible. As illustrated in FIG. 51, a column-deletion button 80, for the purpose of combining relationships at a column unit and deleting them, and a row-deletion button 82, for the purpose of combining relationships at a row unit and deleting them, may be provided so that a plurality of relationships may be combined at column or row units and deleted. Moreover, an initialization button 84 may be provided for the purpose of restoring relationships to the relationship matrix table 30 as it was at the time it was automatically created by the CPU 14 (i.e., an initial state), so that necessary relationships which have mistaken as unnecessary and thereby deleted can be restored to an initial state.

Further, in the above description, a case is described in which the form and data item display frame 50, the entity display frame 53, the correspondence matrix table screen 54, the detailed correspondence matrix screen 62, the relationship matrix table screen 64, and the E-R diagram 32 are all displayed independently of one another. However, the present invention is not limited to the same, and these screens may be displayed simultaneously in combination with one another.

In particular, when the form and data item display frame 50 and the entity display frame 53 ale displayed simultaneously, any one of the correspondence matrix table screen 54, the relationship matrix table screen 64 and the E-R diagram 32 (in particular, the partial E-R diagram) may be displayed. In this way, the user can easily carry out the operation of confirming whether the prepared corresponding matrix table 28, relationship matrix table 30 and E-R diagram 32 are appropriate.

Further, when the form and data item display frame 50 and the entity display frame 53 are displayed simultaneously, the frames may be divided into frames relating to the master and the frames relating to the transactions, such that the frames are displayed in state in which they are divided into groups. More specifically, the form and data item display frames 50 are displayed while being arranged in a designated arrangement or in the order of their form ID numbers, and the form and data item display frame 50 for which normalization entity registration processing is to be carried out is selected. The entity display frame 53 of the normalized entity which has been newly registered by the normalization entity registration processing is, in this registration processing, placed next to the form and data item display frame 50 which is the new object of processing.

In this way, for example, when a form ID is applied to each of the form and data item display frames 50, the form and data item display frames 50 (50M/50J/50H/50Z) are displayed in an arrangement in which they are automatically divided into groups (master/received order management/sent order management/stock management) by, as illustrated in FIG. 68, assigning the numbers 0 through 99 to the form and data item display frame 50M related to the master (the master registration including a large number of resources), the numbers from 100 to 199 to the form and data item display frame 50J relating to received order management, the numbers 200 through 299 to the form and data item display frame 50H related to sent order management, and the numbers 300 through 399 to the form data item display frame 50 relating to the stock management Z.

Note that the CPU 14 automatically divides the form and data item display frames 50 into groups. As described above, form ID numbers may be applied to the form and data item display frames 50, or the user may designate the form ID numbers to be applied to the form and data item display frames 50. Alternatively, by the user designating the positions at which the respective form and data item display frames 50 are to be disposed by using a mouse or the like, the form and data item display frames 50 may be displayed in a given arrangement.

By effecting display in this manner, it is easy to select, in units of groups, the form and data item display frames 50 for which normalization entity registration processing is to be carried out. The user first selects, as the object of processing, a form and data item display frame SOM which is related to the master, and carries out registration processing of the normalized entity. Then, the form and data item display frames 50M, 59J relating to the master and relating to the received order management are selected as the objects of processing, and registration processing of the normalized entities is carried out. Note that, at this time, the normalized entity which is extracted from the form and data item display frame 50M relating to the processed master is used as the master.

Next, the form and data item display frames 50M, 50J, 50H relating to the master and relating to the received order management and relating to the sent order management are selected as the objects of processing. Finally, the form and data item display frames 50M, 50J, 50H, 50Z relating to the master, relating to the received order, relating to the sent order, and relating to the stock are selected, and registration processing of the normalized entities is carried out in the same manner.

Figure 69:
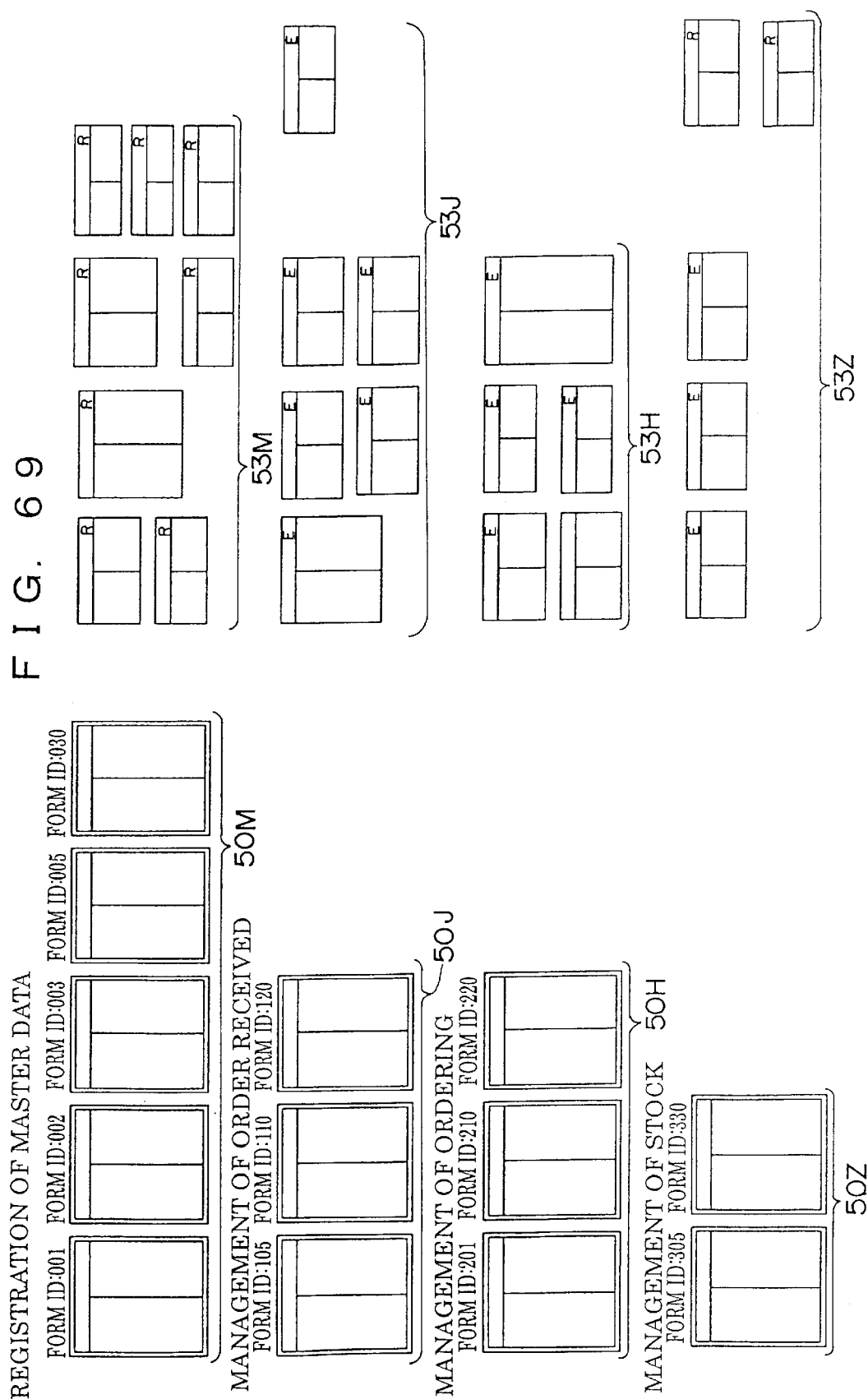
FIG. 69 is a diagram illustrating an example of a display in which the entity display frames, corresponding to the divided display of FIG. 68, are displayed in groups.

When the form and data items 50 are selected in the above-described order and registration processing of the normalized entities is carried out, as illustrated in FIG. 69, the entity display frame 53M, of the normalized entity extracted from the form and data item display frame 50M relating to the master, is displayed next to the form and data item display frame 50M. Similarly, the entity display frames 53J, 53H, 53Z of the normalized entities extracted from the form and data item display frames 50J, 50H, 50Z relating to received order management, relating to sent order management, and relating to stock management, are displayed next to the form and data item display frames 50J, 50H, 50Z, respectively.

In FIG. 69, when the entity display frames 53X, 53H, 53Z are displayed in an arrangement, they are divided (grouped) by entity type (event/resource). Of course, after the registration processing of the normalized entities has been carried out, the display within the form and data item display frames 50 is updated for each of the groups of normalized entities, and therefore, these frames are double-lined frames.

In this way, by displaying the form and data item display frames 50 and the entity display frames 53 in a manner in which they are divided into groups, each transaction can be confirmed. Further, the following processings can be carried out for each transaction.

The present invention may also turn combinations of the screens, forms, and function specification into objects to be processed. Further, the present invention may also be adapted so that data files in an ISAM or VSAM (Virtual Storage Access Method) format are made to correspond to the screens/forms.

Moreover, data in the data items of the screens/forms may be saved in a data saving area for the purpose of data resource management of the repository. By saving information in the repository, the thus-saved information can be used several days later and similar processing thereof can be effected.

In the preceding, various programs (programs 18, 20, 22, 24) for the data base design are read out from an FD, CD-ROM or the like and installed in the auxiliary recording device 12. However, the present invention is not limited to this. For example, the programs may be installed by being transmitted to a wired or wireless network by a transmitting means such as a telephone line. That is, the above programs can be circulated by at least one of a tangible recording medium and a transmitting means.

Further, the screen/form which is the object of processing may be directly inputted to a database designing system, or may be inputted by being transmitted by a, transmitting means such as a telephone line, or a wired or wireless network. Of course, the user may directly operate the database designing system, or may operate the system from a terminal connected to the system via a telephone line or a wired or wireless network.

The present invention has-excellent effects in that it can perform data base normalization design tasks of the RDB in correspondence with the screens/forms and the function specification, can perform efficiently and accurately deletions of the screens/forms and function specification to be processed after the database normalization design task and also integration and deletion of the E-R diagram, and can raise production rates and goods quality. Moreover, various data in the creation of an E-R diagram can effectively be displayed.

What is claimed is:

1. A database design system, utilizing an E-R model comprising:

a temporary entity creation section for creating a temporary entity by classifying a plurality of data including key definition data and data items corresponding to the key definition data into the key definition data and the data items corresponding to the key definition data, a normalized entity creation section for creating a normalized entity by aggregating the temporary entities, if any, which have a common key definition data therein, into one entity;

a setting section for setting an entity type for the normalized entity;

a first table creation section for creating a first matrix table showing the correspondence between the normalized entity created by said normalized entity creation section and the data;

a second table creation section for creating, for each of the data, a second matrix table showing the relationship between the normalized entities which belong to the data, on the basis of the first matrix table and the relationship between the normalized entities based on a preset entity type; and an E-R diagram creation section for creating an E-R diagram on the basis of the second matrix table created for each of the data by said second table creation section; and an altering section for altering at least one of the correspondence between the normalized entity in the first matrix table and the data, the relationship between the normalized entities in the second matrix table, the entity type of the normalized entity, and the correspondence between the key definition data and the data item which form the normalized entity.

2. A database design system according to claim 1, wherein said altering section comprises:

a first decision section for deciding, when a command to delete the data is entered, whether deletion of the normalized entity included in the target data to be deleted is possible or not; and a first deleting section for deleting the data when said first decision section decides that deletion of the normalized entity is impossible, arid for deleting the data and the normalized entity when said first decision section decides that deletion of the normalized entity is possible;

wherein said altering section alters the correspondence between the normalized entity in the first matrix table and the data when the data, or the data and the normalized entity are deleted by said first deleting section.

3. A database design system according to claim 2, wherein said first decision section decides that deletion of the normalized entity is possible when the normalized entity corresponding to the target data to be deleted corresponds only to the target data to be deleted.

4. A database design system according to claim 3, further comprising a first storage section for storing the number of data to which the normalized entity corresponds, wherein when a command to additionally input the data is entered, said first decision section increments the number, stored in said first storage section, of the normalized entity corresponding to the target data to be added, and when a command to delete the data is entered, said first decision section decrements the number, stored in said first storage section, of the normalized entity corresponding to the target data to be deleted, and said first decision section decides that deletion of the normalized entity is possible when the number becomes '0'.

5. A database design system according to claim 1, wherein said altering section comprises:

a second deleting section for deleting the relationship between the entities in the second matrix table when a command to delete the relationship between the entities in the data is entered, wherein the E-R diagram creation section comprises:

a second decision section for deciding whether deletion of a connecting line, which indicates the relationship between the entities deleted by said second deleting section, from the E-R diagram is possible or not; and a third deleting section for deleting the connecting line indicating the relationship between the entities from the E-R diagram when said second decision section decides that deletion of the connecting line is possible.

6. A database design system according to claim 5, wherein said second decision section decides that deletion of the connecting line indicating the relationship between the entities in the E-R diagram is possible/when the relationship between the entities deleted by said second deleting section exists only in the data related to the deleted relationship between the entities.

7. A database design system according to claim 6, further comprising a second storage section for storing the number of data to which the relationship between the entities belongs, wherein when a command to add the relationship between the entities is entered, said second decision section increments the number, stored in said second storage section, corresponding to the target relationship between the entities to be added, and when a command to delete the relationship between the entities is entered, said second decision section decrements the number, stored in said second storage section, corresponding to the target relationship between the entities to be deleted, and said second decision section decides that deletion of the connecting line indicating the relationship between the entities in the E-R diagram is possible when the number becomes '0'.

8. A database design system according to claim 1, wherein when a command to alter the entity type of the normalized entity is entered, said altering section alters the entity type of the normalized entity, retrieves data corresponding to the normalized entity from among the data by referring to the first matrix table, and alters, on the basis of the alteration of the entity type, the relationship between the normalized entities belonging to the retrieved data.

9. A database design system according to claim 1, wherein said altering section comprises:

a third decision section for deciding, when a command to delete the data is entered, whether deletion of at least one of the key definition data and the data item included in the target data to be deleted from the key definition data and the data item which form the normalized entity is possible or not; and a fourth deleting section for deleting said at least one of the key definition data and the data item included in the target data to be deleted when said third decision section decides that deletion is possible.

10. A database design system according to claim 9, wherein said third decision section decides that deletion of at least one of the key definition data and the data item is possible when said at least one of the key definition data and the data item included in the target data to be deleted is included only in the target data to be deleted.

11. A database design system according to claim 10, further comprising a third storage section for storing the number of data including the same key definition data, and the number of data including the same data item, wherein when a command to additionally input the data is entered, said third decision section increments the number, stored in said third storage section, of the key definition data and of the data item included in the target data to be added, and when a command to delete the data is entered, said third decision section decrements the number, stored in said third storage section, of the key definition data and of the data item included in the target data to be deleted, and said third decision section decides that deletion of the key definition data or the data item is possible when the number becomes '0'.

12. A database design system according to claim 1, wherein said temporary entity creation section creates a temporary entity by classifying unclassified data into the key definition data and the data items corresponding to the key definition data with reference to the existing normalized entity.

13. A database design system according to claim 12, wherein said normalized entity creation section aggregates a temporary entity, which has the same key definition data as that of the existing normalized entity into the existing normalized entity, and makes a temporary entity, which has a key definition data different from that of the existing normalized entity, into a new normalized entity.

14. A database design system according to claim 12, further comprising an automatic classification notification section for giving notice of temporary entities, which have been automatically classified with reference to the existing normalized entity, or a normalized entity into which the temporary entities are aggregated.

15. A database design system, utilizing an E-R model comprising:
   a temporary entity creation section for creating a temporary entity by classifying a plurality of data including key definition data and data items corresponding to the key definition data into the key definition data and the data items corresponding to the key definition data;
   a normalized entity creation section for creating a normalized entity by aggregating the temporary entities, if any, which have a common key definition data therein, into one entity;
   a setting section for setting an entity type for the normalized entity;
   a first table creation section for creating a first matrix table showing the correspondence between the normalized entity created by said normalized entity creation section and the data;
   a second table creation section for creating, for each of the data, a second matrix table showing the relationship between the normalized entities which belong to the data, on the basis of the first matrix table and the relationship between the normalized entities based on a preset entity type;
   an E-R diagram creation section for creating an E-R diagram on the basis of the second matrix table created for each of the data by said second table creation section; and
   a manual modification section for manually modifying the correspondence between the key definition data and the data item; and
   a history notification section for giving notice of a modification history provided by said manual modification section.

16. A database design system, utilizing an E-R model comprising:
   a temporary entity creation section for creating a temporary entity by classifying a plurality of data including key definition data and data items corresponding to the key definition data into the key definition data and the data items corresponding to the key definition data, a normalized entity creation section for creating a normalized entity by aggregating the temporary entities, if any, which have a common key definition data therein, into one entity; a setting section for setting an entity type for the normalized entity;
   a first table creation section for creating a first matrix table showing the correspondence between the normalized entity created by said normalized entity creation section and the data; a second table creation section for creating, for each of the data, a second matrix table showing the relationship between the normalized entities which belong to the data, on the basis of the first matrix table and the relationship between the normalized entities based on a preset entity type; an E-R diagram creation section for creating an E-R diagram on the basis of the second matrix table created for each of the data by said second table creation section; and
   a manual addition/deletion section which manually performs at least one of addition and deletion of at least one of the key definition data, the data items, included in the data, and the normalized entity;
   a consistency decision section for deciding, after the addition or deletion by said manual addition/deletion section, whether consistency between the data and the normalized entity is maintained; and
   an inconsistency notification section for, when inconsistency is detected by said consistency decision section, giving notice of the inconsistency.

17. A database design system, utilizing an E-R model comprising:
   a temporary entity creation section for creating a temporary entity by classifying a plurality of data including key definition data and data items corresponding to the key definition data into the key definition data and the data items corresponding to the key definition data;
   a normalized entity creation section for creating a normalized entity by aggregating the temporary entities, if any, which have a common key definition data therein, into one entity;
   a setting section for setting an entity type for the normalized entity;
   a first table creation section for creating a first matrix table showing the correspondence between the normalized entity created by said normalized entity creation section and the data;
   a second table creation section for creating, for each of the data, a second matrix table showing the relationship between the normalized entities which belong to the data, on the basis of the first matrix table and the relationship, between the normalized entities based on a preset entity type;
   an E-R diagram creation section for creating an E-R diagram on the basis of the second matrix table created for each of the data by said second table creation section; and
   a division/integration section which performs at least one of division and integration of the normalized entity.

18. A database design system utilizing an E-R model comprising:
   a temporary entity creation section for creating a temporary entity by classifying a plurality of data including key definition data and data items corresponding to the key definition data into the key definition data and the data items corresponding to the key definition data, a normalized entity creation section for creating a normalized entity by aggregating the temporary entities, if any, which have a common key definition data therein, into one entity;

a setting section for setting an entity type for the normalized entity a first table creation section for creating a first matrix table showing the correspondence between the normalized entity created by said normalized entity creation section and the data;

a second table creation section for creating, for each of the data, a second matrix table showing the relationship between the normalized entities which belong to the data, on the basis of the first matrix table and the relationship between the normalized entities based on a preset entity type, an E-R diagram creation section for creating an E-R diagram on the basis of the second matrix table created for each of the data by said second table creation section; and wherein said first matrix table creation section creates, in addition to the first matrix table, a third matrix table showing, for each of the normalized entities, the correspondence between the key definition data and data item which form the normalized entity, and the data.

19. A database design system, utilizing an E-R model comprising:

a temporary entity creation section for creating a temporary entity by classifying a plurality of data including key definition data and data items corresponding to the key definition data into the key definition data and the data items corresponding to the key definition data, a normalized entity creation section for creating a normalized entity by aggregating the temporary entities, if any, which have a common key definition data therein, into one entity, a setting section for setting an entity type for the normalized entity;

a first table creation section for creating a first matrix table showing the correspondence between the normalized entity created by said normalized entity creation section and the data;

a second table creation section for creating, for each of the data, a second matrix table showing the relationship between the normalized entities which belong to the data, on the basis of the first matrix table and the relationship between the normalized entities based on a preset entity type;

an E-R diagram creation section for creating an E-R diagram on the basis of the second matrix table created for each of the data by said second table creation section; and wherein said second table creation section classifies the normalized entity into a normalized entity for a header part and a normalized entity for a detail part in which repetitive items in the data are listed/and creates the second matrix table by determining the relationship between the normalized entities for the header parts, the relationship between the normalized entities for the detail parts/and the relationship between the header part and the detail part.

20. A database design system, utilizing an E-R model comprising:

a temporary entity creation section for creating a temporary entity by classifying a plurality of data including key definition data and data items corresponding to the key definition data into the key definition data and the data items corresponding to the key definition data;

a normalized entity creation section for creating a normalized entity by aggregating the temporary entities, if any, which have a common key definition data therein, into one entity; a setting section for setting an entity type for the normalized entity;

a first table creation section for creating a first matrix table showing the correspondence between the normalized entity created by said normalized entity creation section and the data;

a second table creation section for creating, for each of the data, a second matrix table showing the relationship between the normalized entities which belong to the data, on the basis of the first matrix table and the relationship between the normalized entities based on a preset entity type;

an E-R diagram creation section for creating an E-R diagram on the basis of the second matrix table created for each of the data by said second table creation section; and A database design system according to claim 1, further comprising a display control section for displaying at least one of the data, the normalized entity, the first matrix table, the second matrix table, and the E-R diagram.

21. A database design system according to claim 20, wherein said display control section displays, in addition to the data and the normalized entity, at least one of the first matrix table, the second matrix table, and the E-R diagram, which are each created by at least one of said first matrix table creation section, said second matrix table creation section, and said E-R diagram creation section.

22. A database design system according to claim 20, wherein said display control section allocates the data in order of identification numbers given for the data or allocates the data by classifying the data into predetermined groups, designates, from among the data, data to be processed by said normalized entity creation section/and locates a new normalized entity/into which the designated data is processed by said normalized entity creation section, adjacent to the data.

23. A database design system according to claim 20, wherein when the data is displayed, said display control section displays the key definition data and data items included in the data within one display frame set for each of the data, and also displays a title of the data adjacent to the display frame.

24. A database design system, utilizing an E-R model comprising:

a temporary entity creation section for creating a temporary entity by classifying a plurality of data including key definition data and data items corresponding to the key definition data into the key definition data and the data items corresponding to the key definition data;

a normalized entity creation section for creating a normalized entity by aggregating the temporary entities, if any, which have a common key definition data therein, into one entity;

a setting section for setting an entity type for the normalized entity;

a first table creation section for creating a first matrix table showing the correspondence between the normalized entity created by said normalized entity creation section and the data;

a second table creation section for creating, for each of the data, a second matrix table showing the relationship between the normalized entities which belong to the data, on the basis of the first matrix table and the relationship between the normalized entities based on a preset entity type;

an E-R diagram creation section for creating an E-R diagram on the basis of the second matrix table created for each of the data by said second table creation section; and A database design system according to claim 1, wherein the data axe data for a screen, a form or a functional specification.

25. A database design system, utilizing an E-R model comprising:

a temporary entity creation section for creating a temporary entity by classifying a plurality of data including key definition data and data items corresponding to the key definition data into the key definition data and the data items corresponding to the key definition data;

a normalized entity creation section for creating a normalized entity by aggregating the temporary entities, if any, which have a common key definition data therein, into one entity;

a setting section for setting an entity type for the normalized entity;

a first table creation section for creating a first matrix table showing the correspondence between the normalized entity created by said normalized entity creation section and the data;

a second table creation section for creating, for each of the data, a second matrix table showing the relationship between the normalized entities which belong to the data, on the basis of the first matrix table and the relationship between the normalized entities based on a preset entity type;

an E-R diagram creation section for creating an E-R diagram on the basis of the second matrix table created for each of the data by said second table creation section; and wherein said temporary entity creation section aggregates the same key definition data or the data items in each of the data into one data, and then creates a temporary entity.

26. A database design method utilizing an E-R model, comprising the steps of:

creating a temporary entity by classifying a plurality of data including key definition data and data items corresponding to the key definition data into the key definition data and the data items corresponding to the key definition data;

creating a normalized entity by aggregating the temporary entities, if any, which have a common key definition data therein, into one entity;

setting an entity type for the normalized entity;

creating a first matrix table showing the correspondence between the normalized entity and the data;

creating, for each data, a second matrix table showing the relationship between the normalized entities, which belong to the data, on the basis of the first matrix table and the relationship between the normalized entities based on a preset entity type;

creating an E-R diagram on the basis of the second matrix table created for each data; and wherein at least one of the correspondence between the normalized entity in the first matrix table and the data, the relationship between the normalized entities in the second matrix table, the entity type of the normalized entity, and the correspondence between the key definition data and the data item which form the normalized entity can be altered.

27. A computer readable recording medium on which a database design program for designing a database utilizing an E-R model has been recorded, wherein the database design program creates a temporary entity by classifying a plurality of data, which include key definition data and data items corresponding to the key definition data/into the key definition data and the data items corresponding to the key data, creates a normalized entity by aggregating the temporary entities, if any, which have a common key definition data therein, into one entity, sets an entity type for the normalized entity creates a first matrix table showing the correspondence between the normalized entity and the data, creates, for each data, a second matrix table showing the relationship between the normalized entities which belong to the data, on the basis of the first matrix table and the relationship between the normalized entities based on a preset entity type, creates an E-R diagram on the basis of the second matrix table created for each data; and wherein in the database design program, at least one of the correspondence between the normalized entity in the first matrix table and the data, the relationship between the normalized entities in the second matrix table, the entity type of the normalized entity, and the correspondence between the key definition data and the data item forming the normalized entity can be altered.

* * * * *